US012623155B1

(12) United States Patent
Stakenborg et al.

(10) Patent No.: US 12,623,155 B1
(45) **Date of Patent: *May 12, 2026**

(54) SYSTEMS AND METHODS FOR PROCESSING COMBINATION SELECTIONS INCLUDING PREDICTIONS AND FANTASY ENTRIES

(71) Applicant: Underdog Sports, LLC, Brooklyn, NY (US)

(72) Inventors: Brandon Alan Stakenborg, Brooklyn, NY (US); Dustin Tyler Cooper, Brooklyn, NY (US); Weston Lee Jossey, Newbury Park, CA (US); Samuel York Baker, Vancouver, WA (US); Nicholas Glenn Green, Charleston, SC (US)

(73) Assignee: Underdog Sports, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/315,470

(22) Filed: Aug. 29, 2025

(51) Int. Cl.
  *A63F 13/828*  (2014.01)
  *A63F 13/537*  (2014.01)

(52) U.S. Cl.
  CPC .......... *A63F 13/828* (2014.09); *A63F 13/537* (2014.09)

(58) Field of Classification Search
  None
  See application file for complete search history.

(56) References Cited

U.S. PATENT DOCUMENTS

| | | | |
|---|---|---|---|
| 7,740,539 B2 * | 6/2010 | Simon ..................... G07F 17/32 | |
| | | | 463/19 |
| 10,290,185 B2 | 5/2019 | Koustas et al. | |
| 10,360,767 B2 | 7/2019 | Russell et al. | |
| 10,424,164 B2 | 9/2019 | Kehoe | |
| 11,069,196 B2 | 7/2021 | Warren | |
| 11,113,929 B1 | 9/2021 | Reeder et al. | |
| 11,380,167 B2 * | 7/2022 | Davie ................. G07F 17/3244 | |
| 11,579,754 B2 * | 2/2023 | Morrison ............ G07F 17/3239 | |

(Continued)

OTHER PUBLICATIONS

U.S. Appl. No. 19/315,432, filed Aug. 29, 2025.

(Continued)

*Primary Examiner* — Tramar Harper
(74) *Attorney, Agent, or Firm* — Han K. Le; Michael D. Schmitt; Brian E. Reese

(57) ABSTRACT

Methods of processing a combination selections are disclosed. A method may include receiving, by a processor, a combination selection of a user, the combination selection comprising one or more prediction selections corresponding to one or more predictions and a fantasy entry selection corresponding to a fantasy entry. The method may include communicating, by the processor, with an externally controlled second computing device such that the user is entered into one or more event contracts corresponding to the one or more predictions via the second computing device. The method may include reserving, by the processor, the fantasy entry. The method may include determining, by the processor, a payout amount by which to update an account of the user based on an outcome of the one or more event contracts and the fantasy entry. Graphical user interfaces, and associated methods, for making combination selections are also disclosed.

15 Claims, 23 Drawing Sheets

(56) References Cited

U.S. PATENT DOCUMENTS

| | | | | |
|---|---|---|---|---|
| 12,106,634 | B2 | 10/2024 | Laster | |
| 12,444,273 | B2 * | 10/2025 | Warren | G06Q 50/34 |
| 2002/0151340 | A1 * | 10/2002 | Guinn | G07F 17/3288 |
| | | | | 463/16 |
| 2005/0171878 | A1 * | 8/2005 | Pennock | G06Q 40/04 |
| | | | | 705/35 |
| 2006/0247022 | A1 | 11/2006 | Greiner et al. | |
| 2007/0129956 | A1 * | 6/2007 | Stinski | G06Q 30/02 |
| | | | | 705/1.1 |
| 2008/0214288 | A1 | 9/2008 | Toneguzzo | |
| 2010/0100204 | A1 | 4/2010 | Ng et al. | |
| 2012/0329544 | A1 * | 12/2012 | Rubinsky | G06Q 40/04 |
| | | | | 463/18 |
| 2013/0217475 | A1 * | 8/2013 | Guan | G07F 17/3244 |
| | | | | 463/25 |
| 2014/0024435 | A1 | 1/2014 | Scott | |
| 2016/0035187 | A1 | 2/2016 | Swanson et al. | |
| 2016/0217652 | A1 * | 7/2016 | Wilder | G07F 17/3288 |
| 2016/0239904 | A1 | 8/2016 | Washington et al. | |
| 2016/0300425 | A1 * | 10/2016 | Devaraj | G07F 17/3204 |
| 2016/0300433 | A1 * | 10/2016 | Ortiz | G07F 17/32 |
| 2017/0098293 | A1 * | 4/2017 | Madison | G06Q 10/08 |
| 2017/0140605 | A1 * | 5/2017 | Lewski | G07F 17/3288 |
| 2017/0345256 | A1 * | 11/2017 | Cohen | G07F 17/3241 |
| 2018/0036641 | A1 | 2/2018 | Parisi | |
| 2018/0197172 | A1 | 7/2018 | Coburn et al. | |
| 2018/0232998 | A1 | 8/2018 | Cummings | |
| 2019/0122501 | A1 * | 4/2019 | Wilder | G07F 17/3288 |
| 2019/0130694 | A1 | 5/2019 | Saulino | |
| 2020/0027315 | A1 * | 1/2020 | Cotton | G06Q 20/08 |
| 2020/0302745 | A1 * | 9/2020 | Merati | G07F 17/3227 |
| 2021/0272228 | A1 | 9/2021 | Cullen | |
| 2021/0343122 | A1 | 11/2021 | Warren | |
| 2022/0005321 | A1 | 1/2022 | Wexler et al. | |
| 2022/0084368 | A1 | 3/2022 | Merati | |
| 2022/0122421 | A1 | 4/2022 | Huke et al. | |
| 2022/0143508 | A1 | 5/2022 | Maggio | |
| 2023/0108958 | A1 * | 4/2023 | Doctor | G06Q 30/0611 |
| | | | | 705/26.4 |
| 2023/0162561 | A1 * | 5/2023 | Dufty | G07F 17/3211 |
| | | | | 463/25 |
| 2023/0230444 | A1 * | 7/2023 | Inamdar | G07F 17/3288 |
| | | | | 463/25 |
| 2023/0394930 | A1 * | 12/2023 | Shore | G07F 17/3237 |
| 2025/0222360 | A1 | 7/2025 | Lake et al. | |

OTHER PUBLICATIONS

U.S. Appl. No. 19/315,437, filed Aug. 29, 2025.
U.S. Appl. No. 19/315,445, filed Aug. 29, 2025.
U.S. Appl. No. 19/315,424, filed Aug. 29, 2025.
U.S. Appl. No. 19/315,428, filed Aug. 29, 2025.
Betting Basics: Understanding the difference between Scorecast, Wincast and Timecast plus how to use them, 5 pages (2018).

* cited by examiner

121

Receiving a combination selection from a user, the combination selection comprising one or more prediction selections corresponding to one or more predictions and a fantasy entry selection corresponding to a fantasy entry

123

Processing the combination selection to determine an overall payout amount for the user

120

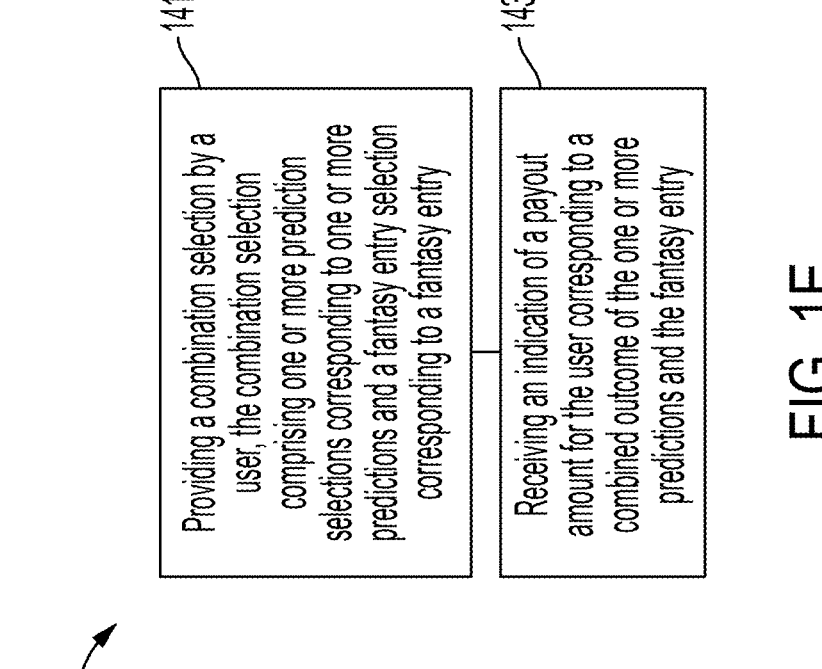

141

Providing a combination selection by a user, the combination selection comprising one or more prediction selections corresponding to one or more predictions and a fantasy entry selection corresponding to a fantasy entry

143

Receiving an indication of a payout amount for the user corresponding to a combined outcome of the one or more predictions and the fantasy entry

FROM

FROM

410

SYSTEMS AND METHODS FOR PROCESSING COMBINATION SELECTIONS INCLUDING PREDICTIONS AND FANTASY ENTRIES

BACKGROUND

Fantasy sports games (e.g., contests or competitions) (e.g., Pick 'Em style games) have existed for several years that allow users to win prizes, sometimes in the form of money, based on their skill in picking certain outcomes for athletes in sports games or events (e.g., tournaments). In some such fantasy sports games, users make fantasy entries that include a set of fantasy picks for two or more athletes. Such picks may correspond, for example, to one or more player stats for a particular player for a game. For example, a user may make a pick that a certain player will score more or fewer points than a preset amount of points during a particular game and/or may have more or fewer assists during the game. Fantasy picks for other player stats (e.g., sport-specific stats) may be available to include as a pick in a fantasy entry. Certain jurisdictions, such as in jurisdictions (e.g., states and/or federally) in the United States (U.S.), require that a fantasy entry has certain characteristics, such as that a fantasy entry includes picks for at least two athletes that are on different teams. More recently, prediction markets have begun allowing users to make predictions for outcomes of a variety of events, including certain sports games in terms of which team will win the game. In the U.S., these predictions are made via a type of futures contract referred to as an event contract. Some such event contracts are contracts, each of which is entered into by opposing parties (e.g., a user and a counter party) and pays an amount to each of the parties based on which team wins a sports game as determined in a manner specified in the contract, generally the final score subject to certain conditions; generally a value of the contract to is paid to the winning party and nothing is paid to the losing party. Prediction markets and event contracts are regulated in the U.S. by the Commodity Futures Trading Commission (CFTC). To date, fantasy games involving fantasy entries and prediction markets for sports games have been entirely separate. That is, these products have been offered to users by different entities (e.g., companies) using different apps and/or websites.

SUMMARY

The present disclosure includes the recognition that there is a desire by users to be able to make predictions and fantasy entries using a single interface and to obtain payouts for entry amounts where the payouts reflect the users' skill and accuracy in making combinations of predictions and fantasy picks. Moreover, the present disclosure recognizes that regulatory and legal hurdles that require specific handling for fantasy entries and prediction markets (e.g., event contracts processed thereon) can be addressed while providing a user with a "seamless" user experience to make a combination selection comprising one or more prediction selections and fantasy entry selection as a single submission if the combination selection is processed in an appropriate manner, using specific technical computing systems and methods disclosed herein.

Disclosed herein are, among other things, systems and methods for making and processing combination selections for users that include one or more prediction selections corresponding to one or more predictions and a fantasy entry selection corresponding to a fantasy entry that includes one or more fantasy picks. A combination selection may be used to, in parallel, enter a user into one or more event contracts corresponding to the one or more predictions and reserve the fantasy entry. In this way, one or more current characteristics of a fantasy entry (e.g., price corresponding to a particular fantasy pick) may be frozen when reserving the fantasy entry even if the one or more current characteristics would otherwise vary between (i) the reserving and (ii) resolution (e.g., grading and/or settlement) and/or if the fantasy entry were only made after resolving the one or more predictions. Reserving a fantasy entry can facilitate making a fantasy entry at a time when it is still possible to do so while using proceeds from a prediction to fund the fantasy entry whereas if one waited for a prediction corresponding to prediction selection to resolve and the underlying event contract(s) to settle before making the fantasy entry, it may be too late to make the fantasy entry at all, for example because one or more events corresponding to one or more fantasy picks in the fantasy entry have already begun. A reserved fantasy entry can be resolved (e.g., graded and/or settled) on a delay to allow time for one or more predictions to resolve and the underlying event contract(s) to settle to then provide funding to the fantasy entry for its subsequent settlement in a regulatorily compliant manner, that is, for proceeds of the event contract(s) to automatically fund the fantasy entry even though the fantasy entry would otherwise have been able to be settled earlier if not funded by proceeds from event contract(s). Such systems and methods (e.g., including such reservation mechanisms) can facilitate automatic, independent, and correctly ordered, settling of event contracts and fantasy entries for a combination selection while allowing a user to make the combination selection as a single submission (i.e., without having to make multiple different selections manually at different times).

Fantasy reservations mechanisms allow customers to combine prediction market predictions and fantasy entries into a single submission while maintaining regulatory and legal compliance. In some embodiments, reserving a fantasy entry allows a customer to "lock in" a particular fantasy entry, in some such embodiments via a reservation fee, up to a certain fantasy entry fee amount determined by an overall entry amount for a combination selection, and then uses an "if-this-then-that" allocation of their wallet funds to automatically transfer balances based on the outcome of their prediction(s). A maximum payout amount corresponding to a combination selection of a user with an overall entry amount requires that each prediction resolves in favor of the user and a fantasy entry also resolves in favor of the user (i.e., all fantasy picks for the fantasy entry must resolve in favor of the user). In certain embodiments, for a combination selection, if a prediction resolves against a user and the corresponding fantasy entry resolves against the user, a payout amount is zero. In certain embodiments, for a combination selection, because a fantasy entry is automatically funded by proceeds corresponding to prediction(s), if a prediction resolves in favor of a user and the corresponding fantasy entry resolves against the user (without first being cancelled, if permitted), a payout amount is zero. In certain embodiments, for a combination selection, if a prediction resolves against a user and the corresponding fantasy entry resolves in favor of the user, a payout amount is determined based on normal payout rules for the fantasy entry based on an amount by which the fantasy entry has been funded after and/or as part of being reserved (e.g., based on one or more user settings for funding and/or any minimum reservation fee), up to a maximum amount that is determined based on an overall entry amount for the combination selection and corresponding to a potential prediction payout for the one or more predictions selected with the combination selection.

Processing of the prediction selection(s), for example to enter the user into the one or more event contracts and subsequently settle the one or more event contracts may be handled by communicating with an externally controlled computing device, for example controlled by a designated contract market (DCM), for example to maintain compliance (e.g., with CFTC regulations). The fantasy entry may then be at least partially funded by the outcome of one or more event contracts. In some embodiments, a fantasy entry is automatically funded by a prediction payout amount received for one or more event contracts. In some embodiments, a user account is automatically updated to reflect funding of a fantasy entry by a prediction payout amount received from one or more event contracts (e.g., after having been updated by the prediction payout amount as proceeds from the one or more event contracts). Event contract(s) may settle in favor of the user and proceeds from the event contract(s) may automatically fund the reserved fantasy entry to a fully funded amount determined by an overall entry amount selected by a user when making the combination selection (e.g., an amount that would result in the user receiving a certain payout amount for the overall entry amount if both the one or more predictions and the fantasy entry corresponding to the combination selection resolve in favor of the user). Accordingly, the combination selection may pay out to the user an amount based on an outcome of the one or more predictions and the fantasy entry. In this way, a combination selection may be used to allow a user to together make one or more predictions (e.g., via one or more prediction markets) and a fantasy entry where a payout amount to the user is based on the outcome of both the prediction(s) and the fantasy entry while separately processing the event contract(s) underlying the prediction(s) and the fantasy entry such that the overall method and/or system is compliant with relevant law and regulation in one or more jurisdictions, for example are complaint with U.S. federal and/or U.S. state law and regulation (e.g., including CFTC regulations).

Reserving a fantasy entry can act as a form of automation similar to what may be referred to as "if this than that" in layman terms. In some embodiments, a method may be characterized as an automation where "if the outcome of my prediction is "YES", then I want you to allocate the proceeds to a fantasy entry in this fantasy contest." In prediction market (commodity trading) terms, these embodiments are analogous to strategy coordination using OTO (one triggers the other) orders or OCO (one cancels the other) orders. Automation that occurs as part of processing a combination selection of a user may facilitate the transfer of an account (e.g., a wallet) balance, or potential future account balance, based on a potential outcome. Certain embodiments disclosed herein may process one or more combination selections while at no point extending credit or margin to a user (e.g., by a fantasy sports entity), whereby the user could end up potentially with a negative fund balance based on a future outcome. In accordance with various embodiments, avoiding negative account balances (or potential negative account balances) may facilitate, or be required for, legal and regulatory compliance.

Such separate processing and/or fantasy reservation mechanisms as just described may have one or more additional advantages to a user in addition to allowing a user to combine one or more predictions and a fantasy entry as a single combination selection that will receive a single payout amount if resolved fully in favor of a user in a regulatorily compliant manner. For example, in some embodiments, a user may be given an option to "top up" funding of their fantasy entry up to a fully funded amount previously determined based on an overall entry amount by using additional funds from a user's account if one or more predictions selected (and accordingly a corresponding one or more event contracts) do not resolve in favor of the user. That is, in some embodiments, a user need not forfeit a desired fantasy entry due to one or more predictions selected resolving against the user. The user would effectively receive a smaller multiple of payout amount relative to amount entered (in this case initial overall entry amount plus "top up" funding) but receive the benefit of being able to proceed still with a fantasy entry as reserved at the time of combination selection submission (e.g., (i) that may no longer be available, for example due to one or more events or games corresponding to the fantasy entry having already started, and/or (ii) for which one or characteristics may have changed in an undesirable manner absent the reserving).

Similarly, because of separating processing and/or fantasy reservation mechanisms disclosed herein, a user may be able to cancel a reserved fantasy entry made from a combination selection independent of any event contract(s) that have not yet settled, for example because the user is no longer interested in the fantasy entry. Cancellation may involve forfeiting a reservation fee (e.g., of a minimum entry amount limit set for the fantasy entry) for the reserving (e.g., that otherwise would have been used to fund the fantasy entry).

Similarly, because of separating processing and/or fantasy reservation mechanisms disclosed herein, a user may cash out one or more event contracts prior to the one or more contracts settling [e.g., by selling (e.g., thereby assigning) the contract(s)] while preserving the fantasy entry, which may then be funded by an amount less than a fully funded amount (e.g., a maximum entry amount limit set for the fantasy entry), for example only by the proceeds of the cashout, or may be "topped up" by additional funds (e.g., up to a set maximum entry amount limit) from a user account.

Graphical user interfaces that facilitate users making combination selections as described are also disclosed. A graphical user interface may provide a user with selection widgets for inputting selections for one or more predictions and one or more fantasy picks for a fantasy entry. A set of possible picks that includes both one or more predictions and one or more fantasy picks may be provided (e.g., rendered and displayed) to a user together via a graphical user interface. Accordingly, graphical user interfaces disclosed herein may facilitate the seamless user experience by not requiring a user to view different screens in order to make a prediction and a fantasy pick, for example instead being able to view all possible picks for a particular sports game or event together on a single screen. In some embodiments, this single screen also displays pricing information for the combination selection(s) and/or the prediction(s) and fantasy pick(s). Selections made via selection widgets may be used to form a combination selection that may then be transmitted, for example to a first computing device, for example controlled by a fantasy sports entity for further processing.

Any two or more of the features described in this specification, including in this summary section, may be combined to form implementations of the disclosure, whether specifically expressly described as a separate combination in this specification or not.

BRIEF DESCRIPTION OF THE DRAWINGS

The present teachings described herein will be more fully understood from the following description of various illustrative embodiments, when read together with the accompanying drawings. It should be understood that the drawing described below is for illustration purposes only and is not intended to limit the scope of the present teachings in any way. The foregoing and other objects, aspects, features, and advantages of the disclosure will become more apparent and may be better understood by referring to the following description taken in conjunction with the accompanying drawings, in which:

FIGS. 2A-1 through 2B-2 illustrate payout amount determination workflows, according to illustrative embodiments of the present disclosure;

FIGS. 4B-1 through 4G are illustrations of a graphical user interface (GUI), according to illustrative embodiments of the present disclosure;

DETAILED DESCRIPTION OF CERTAIN EMBODIMENTS

Figures 1, 1A:
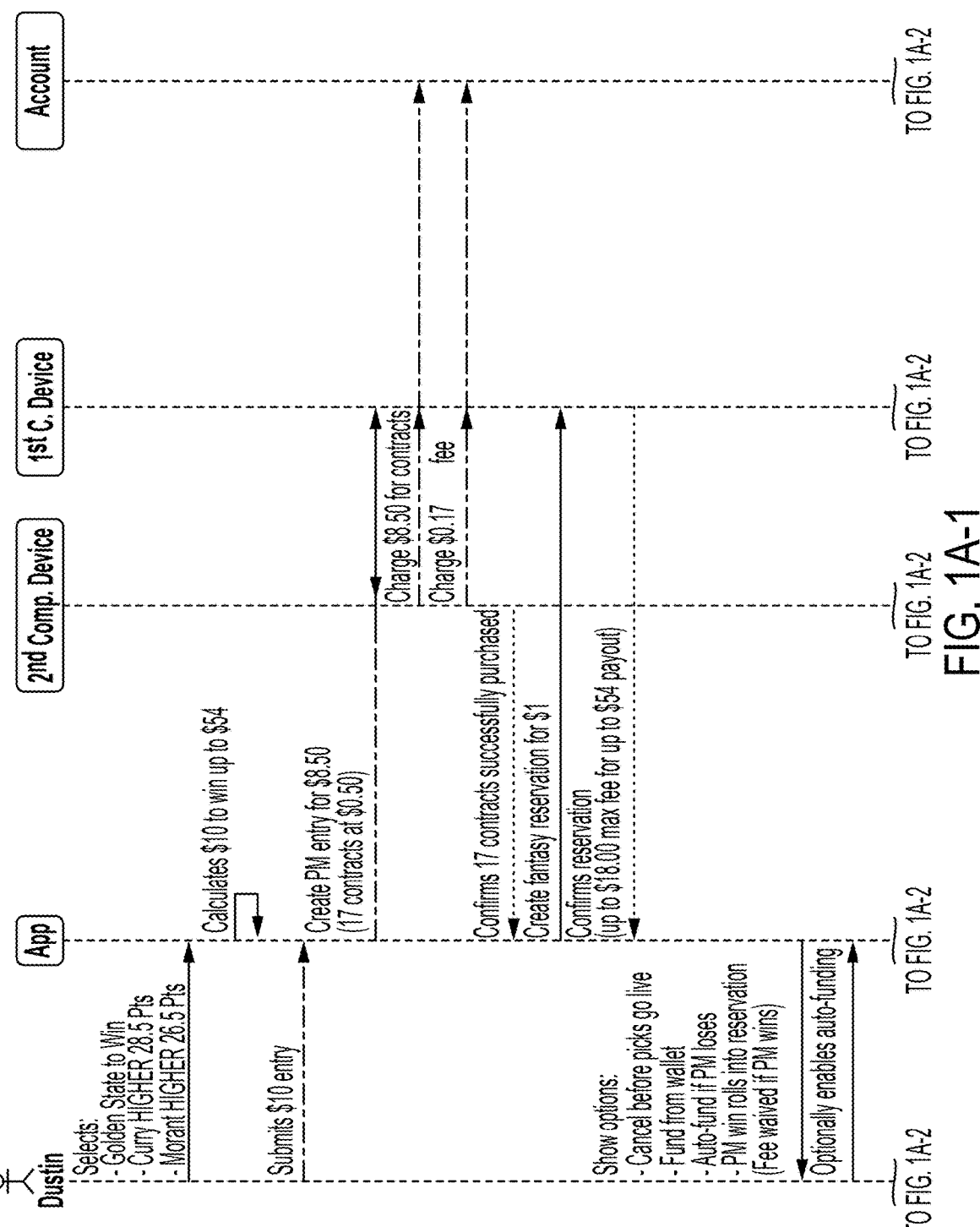
FIGS. 1A-1 through 1E illustrate process flow diagrams for methods of processing combination selections, according to illustrative embodiments of the present disclosure.

Disclosed herein are, among other things, systems and methods for processing combination selections of users where a combination selection comprises one or more prediction selections for one or more predictions and a fantasy entry selection for a fantasy entry. A method or system may be used to determine a payout amount to pay to a user, in an account of the user, based on an outcome corresponding to a combination selection. Combination selections as discussed herein and discussed further subsequently allow a user to make a type of single selection at a point in time that may actually be, for example for legal and regulatory compliance, processed as two separate selections (e.g., in parallel). In this way, it may appear to a user that the user is entering a single amount and potentially being paid out a single amount based on a combined outcome when actually any payout amount to a user is a net amount from two separate outcomes. From another perspective, a user may decide to make a combination selection for an overall entry amount based on a maximum payout amount that can be received if the user makes picks for a prediction and fantasy entry where the maximum payout amount is a net amount accrued from two separate selections (where an amount received for a first is used to fund the other) but appears to the user as if it is a combined payout for a single selection of prediction and fantasy picks together.

A method may include receiving, by a processor of a first computing device (e.g., a first server), a combination selection of a user, the combination selection comprising one or more prediction selections corresponding to one or more predictions and a fantasy entry selection corresponding to a fantasy entry. The method may include communicating, by the processor, with a (e.g., externally controlled) second computing device (e.g., an externally controlled second server) such that the user is entered into (e.g., buys) one or more event contracts corresponding to the one or more predictions. One or more event contracts may be entered into via the second computing device, for example a second computing device may handle all processing of event contracts in a method. The method may include reserving, by the processor, the fantasy entry. The method may include determining, by the processor, a payout amount by which to update an account of the user based on an outcome of the one or more event contracts and the fantasy entry. The method may include determining, by the processor, a payout amount by which to update an account of the user based on a resolution (e.g., settlement) of the one or more event contracts and the fantasy entry.

In some embodiments, a method is for processing a combination selection (e.g., pick) from a user that combines one or more predictions and a fantasy entry to determine a payout amount to the user. A method may include receiving a combination selection of a user, the combination selection comprising one or more prediction selections corresponding to one or more predictions and a fantasy entry selection corresponding to a fantasy entry. A method may include communicating with a third party such that the third party enters a user into one or more event contracts corresponding to one or more predictions. In some embodiments, a third party is a designated contract market (DCM). A method may include reserving a fantasy entry. A method may include determining a payout amount by which to update an account of a user based on an outcome of one or more event contracts and a fantasy entry. A method may include determining a payout amount by which to update an account of a user based on an outcome of one or more predictions and a fantasy entry. A method may include determining a payout amount by which to update an account of a user based on a resolution (e.g., settlement) of one or more event contracts and a fantasy entry. A method may include determining a payout amount by which to update an account of a user based on a resolution of one or more predictions and a fantasy entry.

In some embodiments, a fantasy entry is reserved before one or more predictions are resolved. In some embodiments, a fantasy entry is reserved before one or more event contracts settle. In some embodiments, a fantasy entry is resolved after one or more event contracts settle. In some embodiments, a fantasy entry is graded after one or more event contracts settle. In some embodiments, a fantasy entry is settled after one or more event contracts settle. In some embodiments, a fantasy entry is graded before one or more event contracts settle. A method may comprise grading a fantasy entry before one or more event contracts settle. A method may comprise settling a fantasy entry after one or more event contracts settle.

A method may comprise funding a fantasy entry with a prediction payout amount received from a third party for one or more event contracts. In some embodiments, funding a fantasy entry comprises updating an account with a prediction payout amount from a third party and subsequently automatically updating the account by the prediction payout amount. In some embodiments, updating an account (e.g., subsequently automatically updating an account) by a prediction payout amount comprises withdrawing the prediction payout amount. A method may comprise receiving a prediction payout amount for one or more event contracts from a third party. A method may comprise updating an account with a prediction payout amount before settling a fantasy entry. A method may comprise receiving from a third party a prediction payout amount for one or more event contracts. A method may comprise updating an account by a prediction payout amount. In some embodiments, updating an account by a prediction payout amount comprises crediting an account by a prediction payout amount. A method may comprise automatically updating (e.g., subsequently automatically updating), an account by a prediction payout amount in order to fund a fantasy entry (e.g., thereby funding a fantasy entry). In some embodiments, automatically updating an account comprises placing a hold on an account. In some embodiments, automatically updating an account comprises debiting an account. In some embodiments, automatically updating an account comprises temporarily debiting an account. In some embodiments, subsequently automatically updating an account by a prediction payout amount comprises subsequently automatically withdrawing a prediction payout amount from an account.

In some embodiments, a method is for processing a combination selection (e.g., pick) from a user that combines one or more predictions and a fantasy entry to determine a payout amount to the user. A method may comprise receiving a combination selection (e.g., pick) from a user, the combination selection comprising one or more prediction selections corresponding to one or more predictions and a fantasy entry selection corresponding to a fantasy entry. A method may comprise processing a combination selection to determine an payout amount for a user, wherein processing the combination selection comprises separately processing a portion of the combination selection corresponding to one or more predictions and a portion of the combination selection corresponding to a fantasy entry.

A method may comprise determining a prediction payout amount corresponding to one or more predictions. A method may comprise updating an account of a user with a prediction payout amount. A method may comprise subsequently determining a fantasy entry payout amount corresponding to a fantasy entry and updating an account of a user with a fantasy entry payout amount.

In some embodiments, processing a portion of a combination selection corresponding to one or more predictions comprises entering into one or more event contracts via a third party. In some embodiments, a third party is a designated contract market (DCM). In some embodiments, one or more event contracts are entered into in a manner compliant with regulations for futures contracts in one or more jurisdictions. In some embodiments, one or more event contracts are entered into in a CFTC-compliant manner. In some embodiments, one or more event contracts are processed by a third party.

In some embodiments, processing a portion of a combination selection corresponding to a fantasy entry comprises funding a fantasy entry at least partially with a payout amount corresponding to one or more predictions. In some embodiments, an payout amount is determined based on a combined outcome of one or more predictions and a fantasy entry. A method may comprise updating an account of a user with an payout amount. A method may be compliant with regulations for futures contracts in one or more jurisdictions (e.g., in a CFTC-compliant manner).

Fantasy entries are used in fantasy sports games. Fantasy entries are used in fantasy sports contests. Fantasy entries are used in games of skill for fantasy sports. A sweepstakes fantasy entry may be used in a fantasy sports sweepstakes.

A prediction may be a sports prediction, for example an outcome of a sports game or event (e.g., tournament). A prediction may be a non-sports prediction for a non-sports event, for example a prediction that is available to make on a DCM via one or more event contracts. A sports prediction may be a prediction of a team to win a sports game or an athlete to win a sports tournament. A fantasy entry may be for a fantasy sports game such as a pick'em (also written variously as pick 'em or pickem) or pick'em champions sports game. A sweepstakes fantasy entry may be for a sweepstakes style fantasy sports game.

Using separate computing devices that communicate with each other to process different parts of a combination selection, for example in parallel (e.g., simultaneously) may be preferable or required for legal and regulatory compliance. In some embodiments, a computing device is externally controlled relative to another computing device (e.g., a first computing device relative to a second computing device). An externally controlled computing device is externally controlled in that it is controlled by a separate legal entity from a legal entity controlling a second computing device, even if the two legal entities share stockholders, shareholders, owners, and/or a parent entity (e.g., company). For example, a first computing device may be controlled by a fantasy sports entity and a second computing device may be externally controlled by a designated contract market (DCM) regulated by the CFTC, even if the DCM and fantasy sports entity have the same parent entity (e.g., company). In some embodiments, a second computing device is a computing device of a designated contract market (DCM). In some embodiments, a second computing device is a computing device of a prediction market, for example a CFTC-regulated prediction market. In some embodiments, a second computing device is a computing device of an event contracts exchange, for example a CFTC-regulated exchange. In some embodiments, a first computing device is controlled by a fantasy sports entity (e.g., company or other organization). In some embodiments, an account of a user is an account (e.g., in-app account) controlled or custodied by a fantasy sports entity. In some embodiments, a first computing device is not controlled by a designated contract market (DCM). In some embodiments, a combination selection is received from a user controlled computing device [e.g., a phone (e.g., smart phone), smart watch, or computer or tablet]. In some embodiments, a combination selection is received from the user via a graphical user interface (e.g., on an app or website) (e.g., on a user controlled computing device). In some embodiments, one or more event contracts are entered into in a manner compliant with regulations for futures contracts in one or more jurisdictions (e.g., in a CFTC-compliant manner). In some embodiments, one or more event contracts are administered by a (e.g., the) DCM. In some embodiments, one or more event contracts are settled by a DCM. A DCM may process event contracts for sports and for non-sports events.

In certain embodiments, methods disclosed herein are compliant with regulations for futures contracts in one or more jurisdictions (e.g., may be performed in a CFTC-compliant manner). In certain embodiments, methods disclosed herein are compliant with laws and regulations for event contracts for one or more jurisdictions, for example federally and/or in one or more states, for example within the U.S. In certain embodiments, methods disclosed herein are compliant with laws and regulations for fantasy sports for one or more jurisdictions, for example federally and/or in one or more states, for example within the U.S. In certain embodiments, methods disclosed herein are compliant with fantasy sports laws for one or more jurisdictions, for example federally and/or in one or more states, for example within the U.S. In certain embodiments, methods disclosed herein are compliant with fantasy sports regulations for one or more jurisdictions, for example federally and/or in one or more states, for example within the U.S.

Figures 1, 1A, 2:
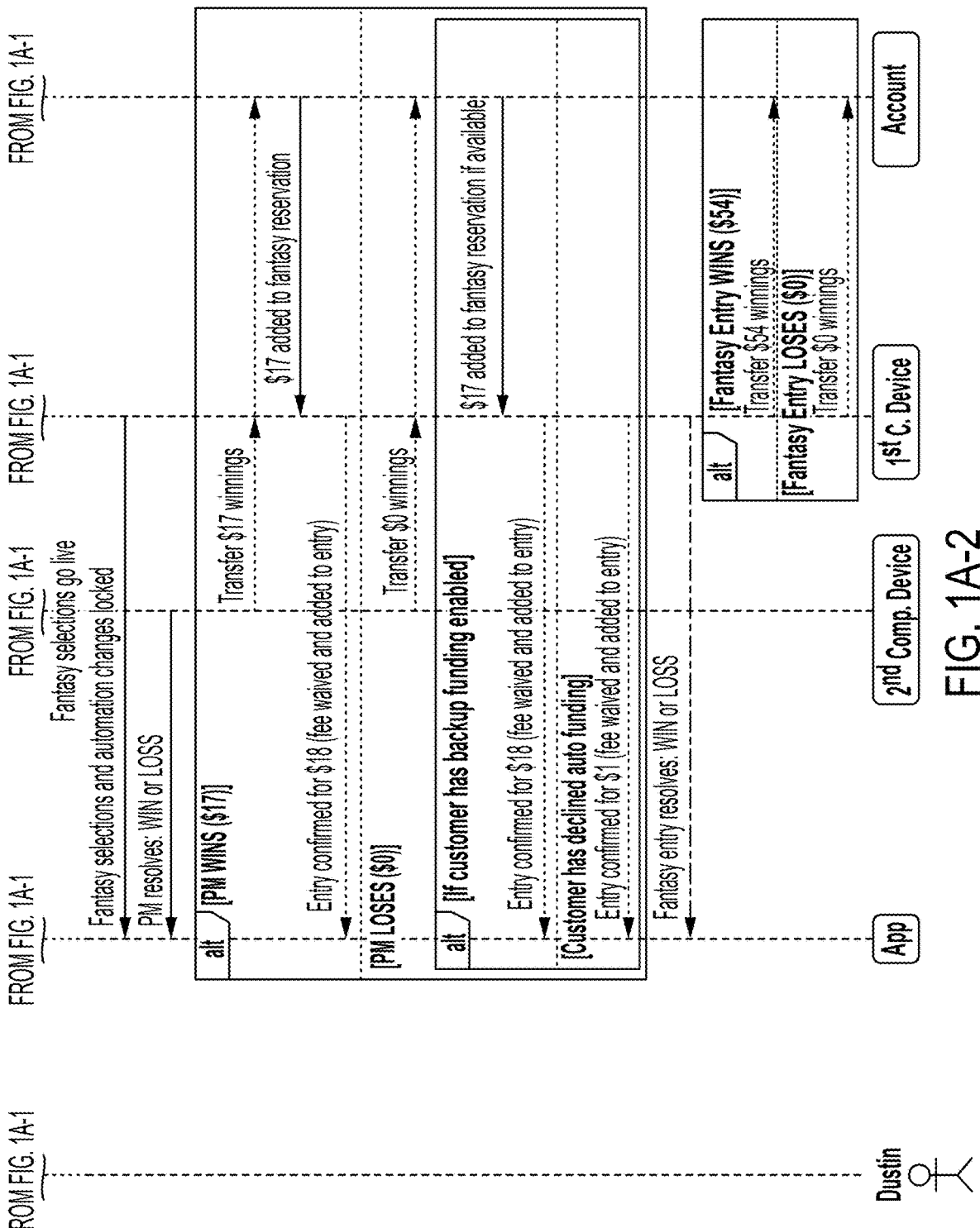

FIGS. 1A-1 and 1A-2 illustrate an example of one instance of a method according to illustrative embodiments of the present disclosure. Progress occurs generally top to bottom through this illustration. Initially, a user, Dustin, enters into an app on his user computing device a combination selection via a GUI. In the instance shown, Dustin picks the Golden State Warriors to win, Steph Curry to score higher than 28.5 points and Ja Morant to score higher than 26.5 points for his combination selection. Golden State Warriors to win is a prediction and the other two picks form a fantasy entry, which in this case is valid. Dustin's computing device (e.g., via the app) may validate the fantasy entry before submission and/or before allowing submission. In some embodiments, a first computing device that receives a combination selection, e.g., from a user computing device and/or an app or website, validates the fantasy entry. Dustin's computing device (e.g., via the app) determines that a $10 overall entry amount for this combination selection will have a $54 maximum payout amount and may show this to Dustin before submission (e.g., at a confirmation screen shown in the GUI before submission).

The combination selection is submitted to a first computing device (a fantasy sports entity computing device), which prompts creation of a prediction slip with the first computing device (indicated by "Create PM entry" arrow) that causes Dustin to be entered into 17 event contracts for $0.50 a piece for Golden State Warriors to win via a second computing device (a DCM computing device) in communication with the first computing device. Dustin's account is updated to charge $8.50 for the 17 contracts and a $0.17 fee paid to the DCM for facilitating the event contracts. A confirmation that the event contracts have been entered into may be sent to Dustin's app via communication of the second computing device with the first computing device, indicated by a simplified dashed arrow. In parallel, submission of the combination selection by Dustin causes Dustin's fantasy entry to be reserved. Submission of the combination selection by Dustin causes Dustin's fantasy to be reserved and, accordingly, a fantasy entry slip to be created for Dustin's fantasy entry. The fantasy entry slip has a minimum entry amount limit corresponding to a reservation fee for reserving the fantasy entry and a maximum entry amount limit corresponding to a maximum payout amount that had been determined for Dustin's combination selection based on an overall entry amount that Dustin chose (where the maximum limit is such that when the fantasy entry is funded to that limit, e.g., by a prediction payout amount received for one or more event contracts from Dustin's prediction(s) resolving in his favor, and if the fantasy entry resolves in Dustin's favor, then Dustin's account will be updated by the maximum payout amount). Reserving the fantasy entry in this illustration involves a reservation fee of $1 (a minimum entry amount limit) to be debited from Dustin's account; Dustin's account may be updated based on the reservation fee. The reserved fantasy entry may be funded to a maximum entry amount limit of $18 (which corresponds to $17 in prediction payout amount for the event contracts and the $1 reservation fee) and has a maximum payout amount of $54. A confirmation that the fantasy entry has been reserved may be sent to Dustin's app from the first computing device. One or more user settings for Dustin may be entered into the app and sent to the first computing device, for example auto-funding from Dustin's account if a prediction for Dustin's combination selection resolves against Dustin.

At some point in time, one or more of Dustin's fantasy picks go live and Dustin's fantasy entry becomes locked. At a later time (shown, though not necessarily true depending on the picks made for a combination selection), Dustin's prediction resolves and the underlying 17 event contracts are resolved (e.g., settled) as a win or loss. Possible outcomes of the prediction/event contracts are shown separately. It may be that Dustin's prediction resolves in his favor, resulting in a prediction payout amount of $17, which Dustin's account may be updated with, as indicated by the arrow. Dustin's fantasy entry would then be automatically funded to the maximum entry amount limit of $18 (since the fantasy entry is locked and therefore uncancellable, even if at one time cancellable), which may involve an automatic subsequent update to Dustin's account, for example withdrawing the $17 from the prediction payout amount. It may be that Dustin's prediction resolves against Dustin in which case the prediction payout amount is $0. If Dustin doesn't not have auto-funding enabled, then the fantasy entry is funded only by the minimum entry amount limit of the reservation fee of $1, which may result in an intermediate payout amount based on the partial funding (not shown in FIGS. 1A-1 and 1A-2, see FIGS. 2B-1 and 2B-2 described further subsequently). If Dustin does have auto-funding enabled, then the fantasy entry may be funded to a maximum entry amount limit regardless of prediction outcome, which may involve an update to Dustin's account based on the additional funding. Temporally, a fantasy entry may be resolvable (e.g., settleable) before one or more event contracts are but resolution may be delayed until after the one or more event contracts to allow funding to process appropriately. If the fantasy entry resolves against Dustin then the payout amount will be $0, regardless of funding level. If both the prediction and the fantasy entry resolve in favor of Dustin then the payout amount is the maximum payout amount of $54. Dustin's account is updated accordingly upon resolving (e.g., settling) of the fantasy entry.

In another example (not illustrated), a combination selection of a user may be treated as two completely independent entries when submitting the selection. On submission, the combination selection may reserve a fantasy entry that freezes in the current price of the fantasy picks. Additionally, the reserving may set a maximum entry amount limit for the fantasy entry, in some embodiments that allows for a user to contribute additional funds to the entry to make up for any adverse resolution to the selection. In parallel, the submission results in purchasing of one or more event contracts for a prediction selection for the combination selection, based on the current market prices, purchased through a DCM via a compliant CFTC based workflow. In this example, reserving the fantasy entry has a number of unique characteristics: (i) it allows a user to schedule an automatic transfer of proceeds from one or more event contracts to fund the fantasy entry; (ii) it allows a user to cancel the fantasy entry at any time up until the first pick for the entry goes live, with only a forfeit of a reservation fee (taken from the overall entry amount); (iii) it allows for a user to schedule an automatic transfer of an amount from the user account to contribute up to a maximum entry amount limit to fund the fantasy entry, in the event one or more predictions resolve against the user such that a prediction payout amount is less than the maximum entry amount limit for the fantasy entry, which may be determined at submission. An example of (iii) would be in essence that a user is saying "I want to still create this $20 fantasy entry, even if my prediction resolves to NO." Another example of (iii) would be that a user decides to close out their event contract(s) for their prediction early, and it would not fully (maximally) fund their fantasy entry. So, instead of $10 of event contracts paying $20, a prediction payout amount is only $5 due to the early cashout. The customer could choose to "top off" the remaining $15 from their account. In this example, in the event that a user does not have a sufficient amount in the user account to facilitate this automation, no automatic funding occurs. In this example, no user can enter into a negative balance with their account due to these transfers. These automation features give users the flexibility to route their funds, as they see fit, between predictions and fantasy entries, without the need for manual intervention.

The following is an example sequence according to some embodiments of the present disclosure. A user taps/clicks on the following selections in an app/website: a. Golden State Warriors to Win +100; b. Steph Curry HIGHER 28.5 Points; c. Ja Morant HIGHER 26.5 Points. Golden State Warriors to win is a prediction and the other two selections form a fantasy entry selection. The user enters an overall entry amount of $10 and, based on one or more predetermined rules, it is determined that the user can receive a maximum payout amount of $54.00 if everything resolves in favor of the user. The user is presented a screen in a GUI showing all of these selections and amounts and the user taps/clicks a submission widget. A prediction entry slip is created in order to cause an amount of one or more event contracts to be entered into for the user such that if the one or more event contracts and the fantasy entry resolve in favor of the user, the user will receive the $54. In this example, that may result in an $8.67 fee being transferred to a DCM to purchase $8.50 of event contract(s) that will pay $17.00 if the user prediction regarding Golden State Warriors winning is correct. A fee of $0.17 is paid to the DCM. The total contract value at time of purchase is 17 contracts for $8.50. In parallel, a fantasy reservation is created for a fantasy entry for a $1 reservation fee. This reservation creates a fantasy entry slip that has a maximum entry amount limit of $18 (i.e., the fantasy entry can be funded up to $18.00) and will result in the maximum payout amount of $54.00 if the fantasy entry is fully funded and resolves in favor of the user. The $18 is determined based on the $17 that can be received as a prediction payout amount for the event contracts and the $1 reservation fee, which will be put into the fantasy entry if not cancelled. In this example, the user may cancel the fantasy entry at any time up until one of the fantasy picks for the fantasy entry are live, and forfeit the reservation fee of $1. If the fantasy entry is cancelled, then any prediction payout amount is returned via an update to the user account. The user may also choose, via one or more user settings, to fund the fantasy entry in full from their user account if Golden State Warriors do not win, at any time prior to the first pick going live. By submitting the combination selection, the user has agreed to roll over event contract winnings into funding the fantasy entry, if Golden State Warriors win. In essence, the reservation fee is waived and included in the fantasy entry funding if they do. If a user has insufficient funds, auto-funding is cancelled, regardless of whether one or more predictions resolve in favor of the user or not. Thus, a method may include determining, by a processor, whether a user account has sufficient amount in order to fund a fantasy entry despite one or more predictions for a combination selection resolving against the user. In some embodiments, Customers can turn on "auto-funding" up until the first pick goes live. The 17 event contracts for the Golden State Warriors may be resolved (e.g., graded and/or settled) independently from the fantasy entry. Resolution of a fantasy entry may be delayed intentionally to provide time for resolution of event contracts and therefore appropriate funding. Thus, this may happen out of sequence, where each of the fantasy picks are no longer live, even though the prediction market outcome is yet to be decided.

Figure 1B:
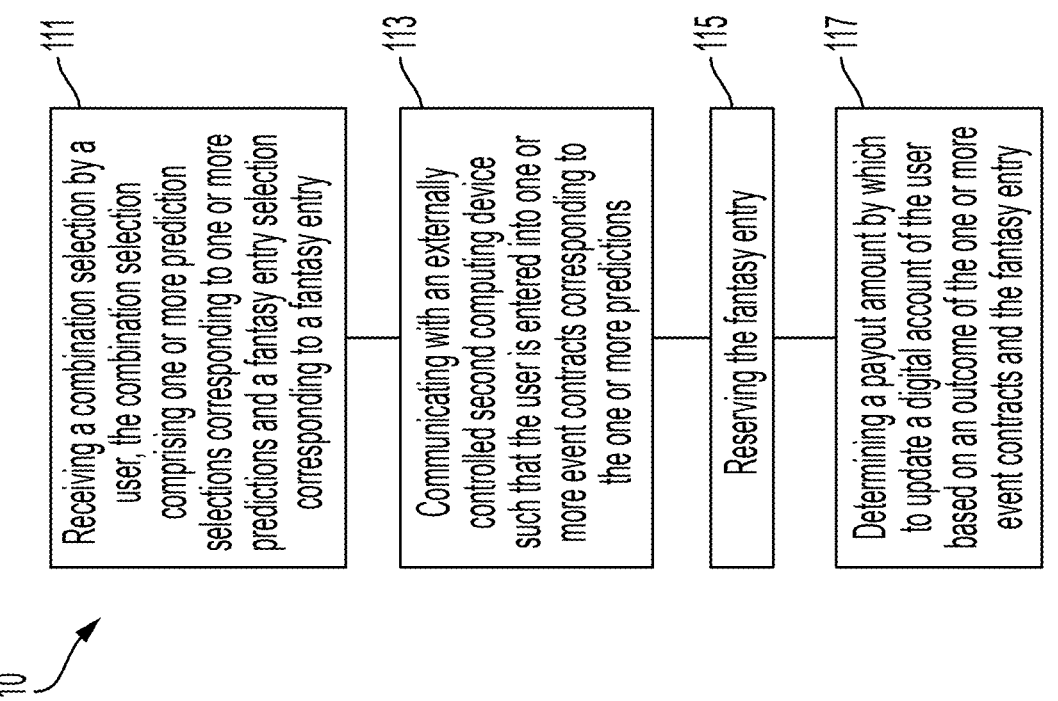
FIG. 1F illustrates a system for processing combination selections, according to illustrative embodiments of the present disclosure.

FIG. 1B shows a flow diagram of an illustrative method 110 of processing a combination selection (e.g., pick) from a user that combines one or more predictions and a fantasy entry to determine a payout amount to the user. At step 111, the method 110 comprises receiving, by a processor of a first computing device (e.g., a first server), a combination selection of a user. The combination selection may comprise one or more prediction selections corresponding to one or more predictions and a fantasy entry selection corresponding to a fantasy entry [e.g., a valid fantasy entry, e.g., valid in one or more jurisdictions (e.g., a jurisdiction of the user and/or a jurisdiction of the first computing device)]. At step 113, the processor communicates with an externally controlled second computing device (e.g., an externally controlled second server) such that the user is entered into one or more event contracts corresponding to the one or more predictions via the second computing device. At step 115, the method 110 comprises reserving the fantasy entry. Once the fantasy entry is reserved, at step 117, a payout amount (e.g., of money, of currency, of digital coins, of credits, or a combination thereof) is determined. An account (e.g., wallet) (e.g., an in-app account) of the user may be updated based on an outcome of the one or more event contracts and the fantasy entry. An account (e.g., wallet) (e.g., an in-app account) of the user may be updated based on a resolution (e.g., settlement) of the one or more event contracts and the fantasy entry. An account (e.g., wallet) (e.g., an in-app account) of the user may be updated based on an outcome of the one or more predictions and the fantasy entry. An account (e.g., wallet) (e.g., an in-app account) of the user may be updated based on a resolution of the one or more predictions and the fantasy entry.

Figure 1C:
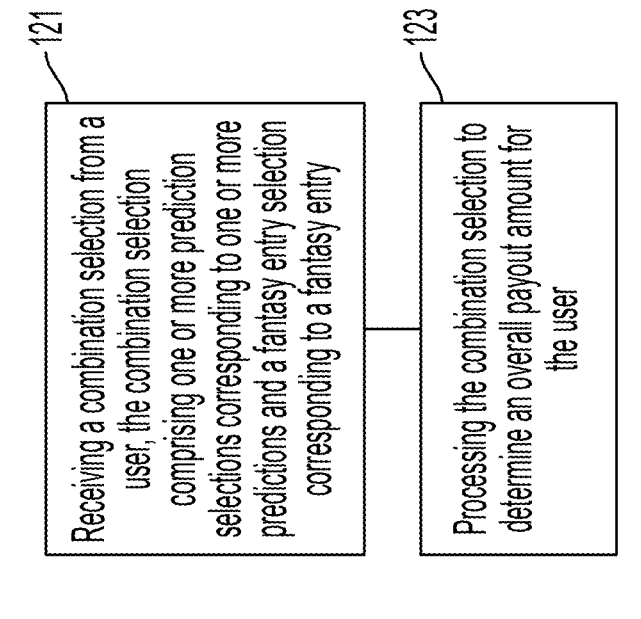

FIG. 1C shows a flow diagram of another illustrative method 120 of processing a combination selection (e.g., pick) from a user that combines one or more predictions and a fantasy entry to determine a payout amount to the user. The method 120 comprises, at step 121, receiving a combination selection (e.g., pick) from a user, the combination selection comprising one or more prediction selections corresponding to one or more predictions and a fantasy entry selection corresponding to a fantasy entry. At step 123, the method 120 proceeds to process the combination selection to determine an payout amount for the user. Processing the combination selection may comprise separately processing a portion of the combination selection corresponding to the one or more predictions and a portion of the combination selection corresponding to the fantasy entry.

Figure 1D:
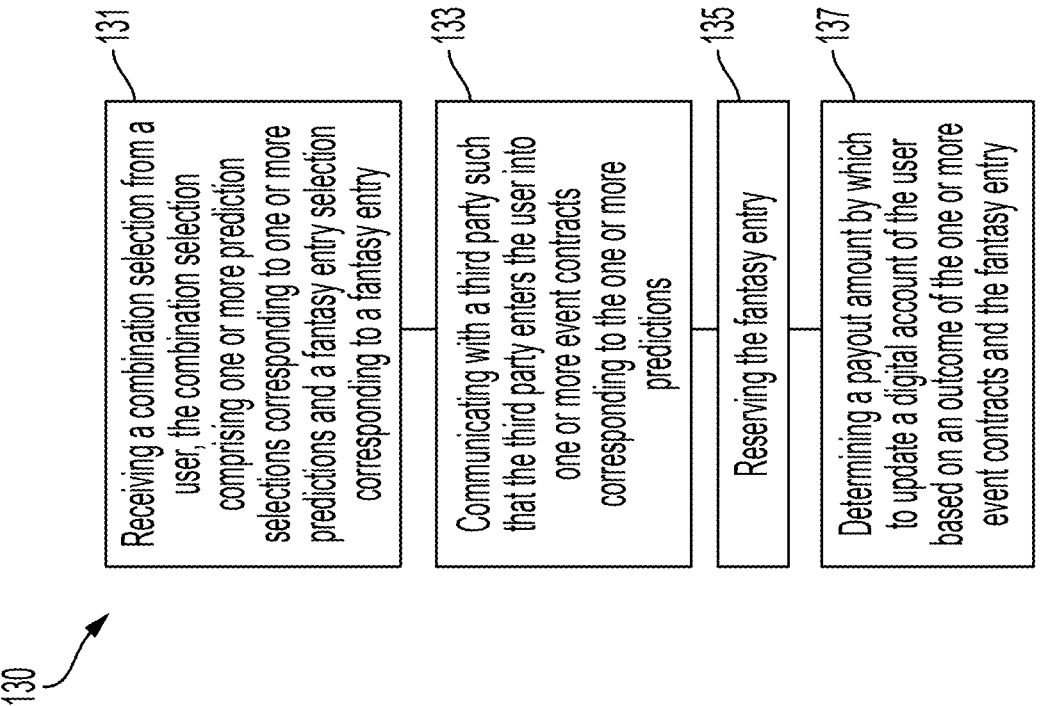

In certain embodiments, a method 130 of processing a combination selection (e.g., pick) from a user comprises the following steps as shown in FIG. 1D. At step 131, the method comprises receiving a combination selection (e.g., pick) from a user, the combination selection comprising one or more prediction selections corresponding to one or more predictions and a fantasy entry selection corresponding to a fantasy entry. At step 133, the method comprises communicating with a third party (e.g., a designated contract market (DCM)) such that the third party enters the user into one or more event contracts corresponding to the one or more predictions. At step 135, the method comprises reserving the fantasy entry. At step 137, the method comprises determining a payout amount by which to update an account of the user based on an outcome of the one or more event contracts and the fantasy entry.

FIG. 1E shows a flow diagram of an illustrative method 140 of facilitating a user making a combination selection (e.g., pick) that combines one or more predictions and a fantasy entry and receiving a payout amount for the combination selection. At step 141, the method comprises providing, by a processor of a computing device (e.g., a user phone or a user-accessible website), (e.g., via a graphical user interface) a combination selection (e.g., pick) by a user, the combination selection comprising one or more prediction selections corresponding to one or more predictions and a fantasy entry selection corresponding to a fantasy entry [e.g., a valid fantasy entry, e.g., valid in one or more jurisdictions (e.g., a jurisdiction of the user and/or a jurisdiction of the first computing device)]. At step 143, the method comprises receiving, by the processor, an indication (e.g., data) (e.g., notification) of a payout amount (e.g., of money, of currency, of digital coins, of credits, or a combination thereof) for the user corresponding to a combined outcome of the one or more predictions and the fantasy entry [e.g., by which an account (e.g., wallet) of the user will be updated].

Overall Entry Amounts, Payout Amounts and Maximum Payout Amounts

An overall entry amount may be provided by a user (e.g., debited or withdrawn from an account of the user) based on an overall entry amount selection for a combination selection. An overall entry amount may then be broken up into different uses, for example for prediction purposes, fantasy entry purposes, and fee purposes, on the backend. In this way, an overall entry amount is actually a composite of different amounts used for different purposes but appears to a user simply as a single unified entry amount made for a combination selection. A portion of an overall entry amount may be used to pay a fee to facilitate processing event contracts (e.g., paid to a DCM). A portion of an overall entry amount may be paid to a fantasy sports entity (e.g., for facilitating processing event contracts and/or other reasons). A portion of an overall entry amount may be used as a reservation fee for a fantasy entry (e.g., used to fund the fantasy entry if not cancelled or forfeited if cancelled). Fees may be governed by applicable law and regulation. A portion of an overall entry amount may be used to purchase one or more event contracts. An amount of an overall entry amount used to purchase one or more event contracts may be based on a prediction payout amount, at current market price, that will result in a user receiving a maximum payout amount for a combination selection and overall entry amount if all of one or more predictions (underlying one or more event contracts) and a fantasy entry resolve in favor of a user. A portion of an overall entry amount may be a remainder, for example based on a desire to have overall entry amounts be whole denomination amounts (e.g., whole dollars). A portion of an overall entry amount may be used as part of reserving a fantasy entry. A fantasy entry may be funded in part by a portion of an overall entry amount (e.g., in addition to a prediction payout amount received for one or more event contracts and/or an additional amount from a user account).

A method may include determining a payout amount corresponding to a combination selection. A method may include determining a payout amount based on an outcome of one or more predictions and a fantasy entry corresponding to a combination selection. A method may include determining a payout amount based on resolution (e.g., settling)

of one or more predictions and a fantasy entry corresponding to a combination selection. A method may include determining a payout amount based on an outcome of one or more event contracts and a fantasy entry corresponding to a combination selection. A method may include determining a payout amount based on resolution (e.g., settling) of one or more event contracts and a fantasy entry corresponding to a combination selection. A payout amount may be based on a prediction payout amount received for one or more event contracts and an outcome of a fantasy entry. A payout amount may be based on a prediction payout amount received for one or more event contracts and a resolution of a fantasy entry. A user may affect a payout amount received (or a payout amount relative to a total amount entered (e.g., an overall entry amount plus any subsequent amounts added)) by, for example, cashing out one or more event contracts before resolution, enabling auto-funding of a fantasy entry, and/or cancelling a fantasy entry. A payout amount may be a maximum payout amount. A payout amount may be less than a maximum payout amount. A payout amount may be zero. A user account may be updated (e.g., credited) with a payout amount.

A maximum payout amount that can be received for an overall entry amount for a combination selection may be determined based on one or more predictions and a fantasy entry (e.g., picks therein). A maximum payout amount that can be received for an overall entry amount for a combination selection may be determined using one or more preset rules. A preset rule may account for, for example, likelihood of one or more picks resolving in favor of a user. As a very basic example, a combination selection may correspond to a prediction and a fantasy entry of two fantasy picks, each may have a +100 likelihood (represented in American-style notation), which according to a rule may mean a maximum payout amount will be 6× an overall entry amount. Many preset rules exist and have been used in various fantasy sports contests. Here, where predictions are also included, such existing rules may be adapted to treat a prediction analogously to an additional fantasy pick in how a maximum payout amount is calculated. New rules may be used instead. In some embodiments, once a maximum payout amount is determined (e.g., calculated) based on an overall entry amount and one or more predictions and a fantasy entry selected in a combination selection, it may be determined, for example based on current market prices, an amount of one or more event contracts to enter into (e.g., purchase) in order that a prediction payout amount for the one or more event contracts if used to fund the fantasy entry (e.g., alongside a reservation fee) will result in a maximum payout amount being received by a user for the combination selection. In some embodiments, an amount of one or more event contracts to enter into (e.g., purchase) may be determined based on a likelihood of one or more predictions resolving in favor of a user (e.g., as reflected by current market price) in order that a prediction payout amount for the one or more event contracts if used to fund the fantasy entry (e.g., alongside a reservation fee) will result in a maximum payout amount being received by a user for the combination selection. Such determinations may involve communication between a first computing device and a second computing device. Such determinations of an amount of one or more event contracts may be made as part of determining a maximum payout amount.

Event contracts are normally purchasable in sub-dollar increments such that each contract pays $1 to the party would correctly predicts the binary outcome. For example, a $1 event contract may be purchased for $0.50 by a user (via a method disclosed herein) if there is a 50% likelihood that the user's prediction of outcome occurs. Market price for an event contract may fluctuate as a market for a particular event obtains more information and parties in the market assess differently the likelihood of each outcome for the event. In general, two parties to an event contract have different market prices as generally there are different likelihoods for each of two outcomes (e.g., which of two teams will win a sports game between the teams).

Figures 1, 2A:
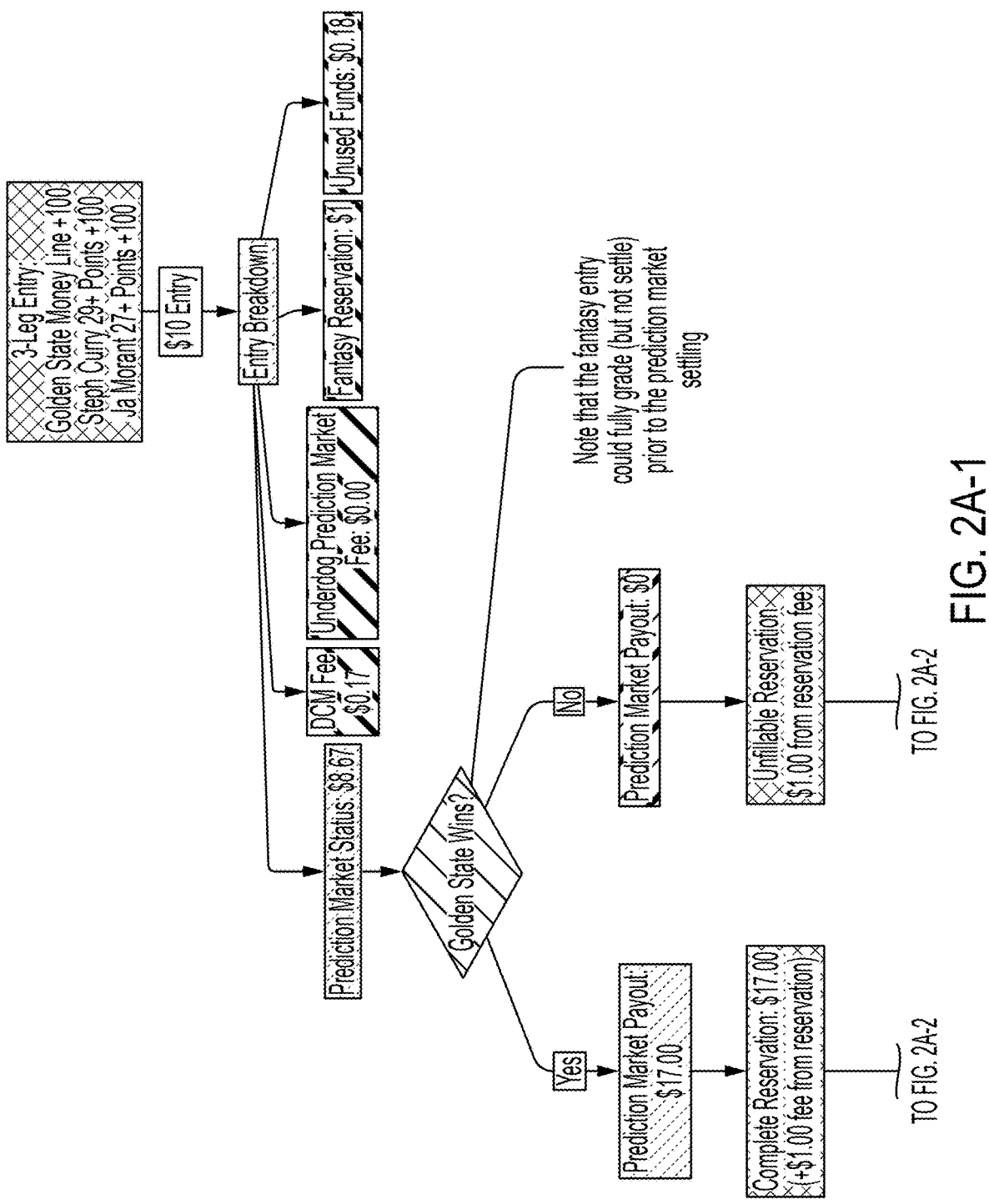
Figures 2, 2A:
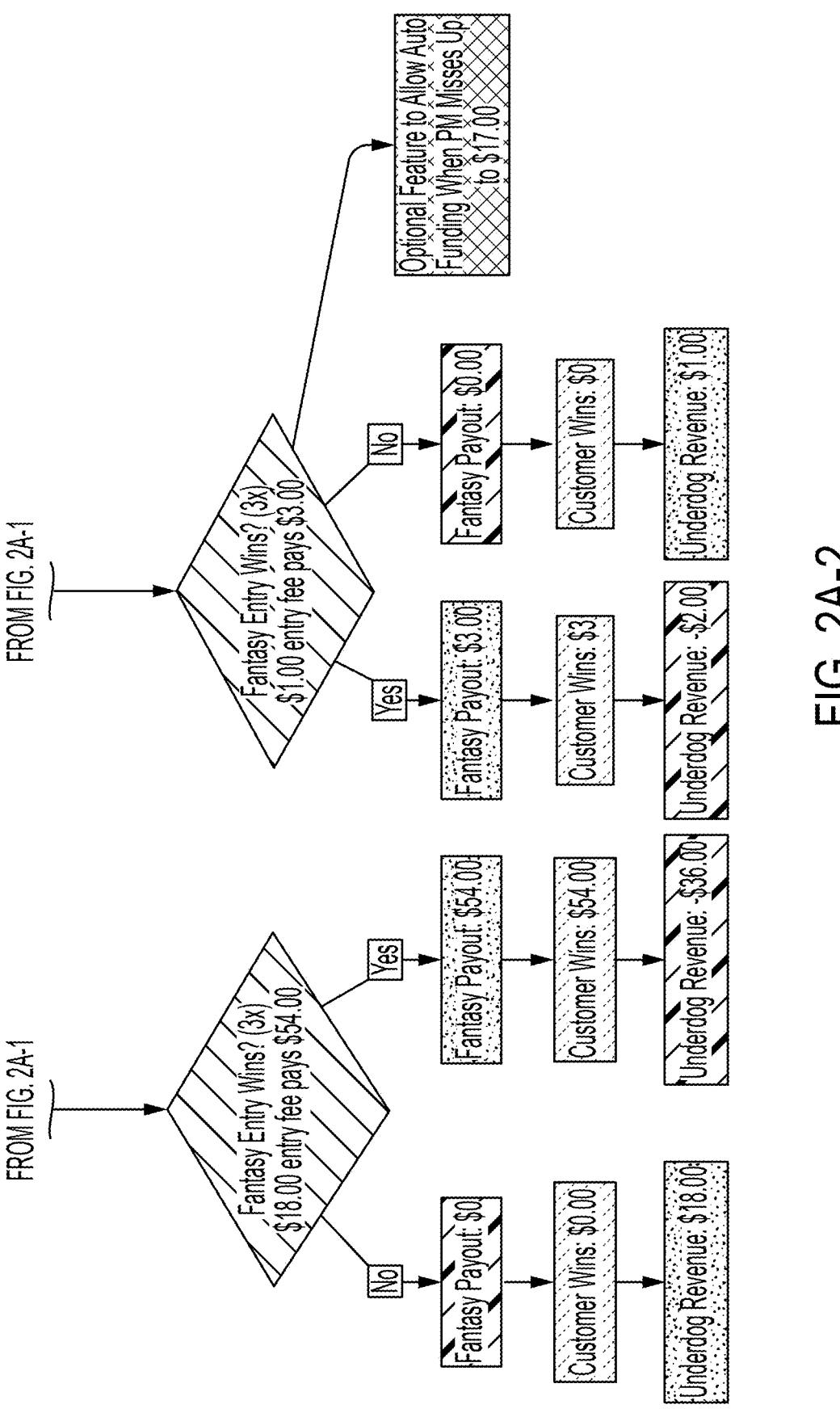
Figures 1, 2B:
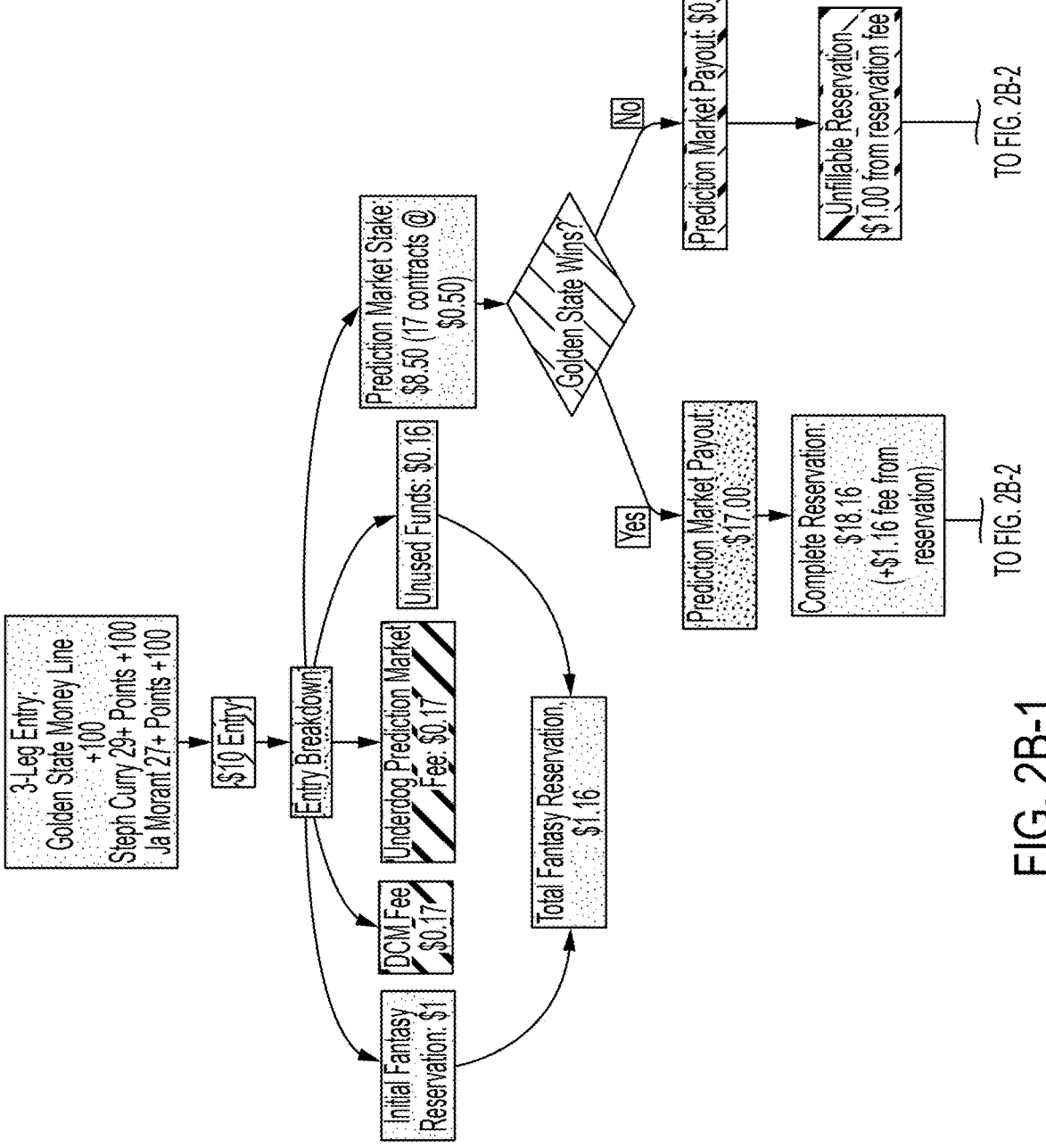
Figures 2, 2B:
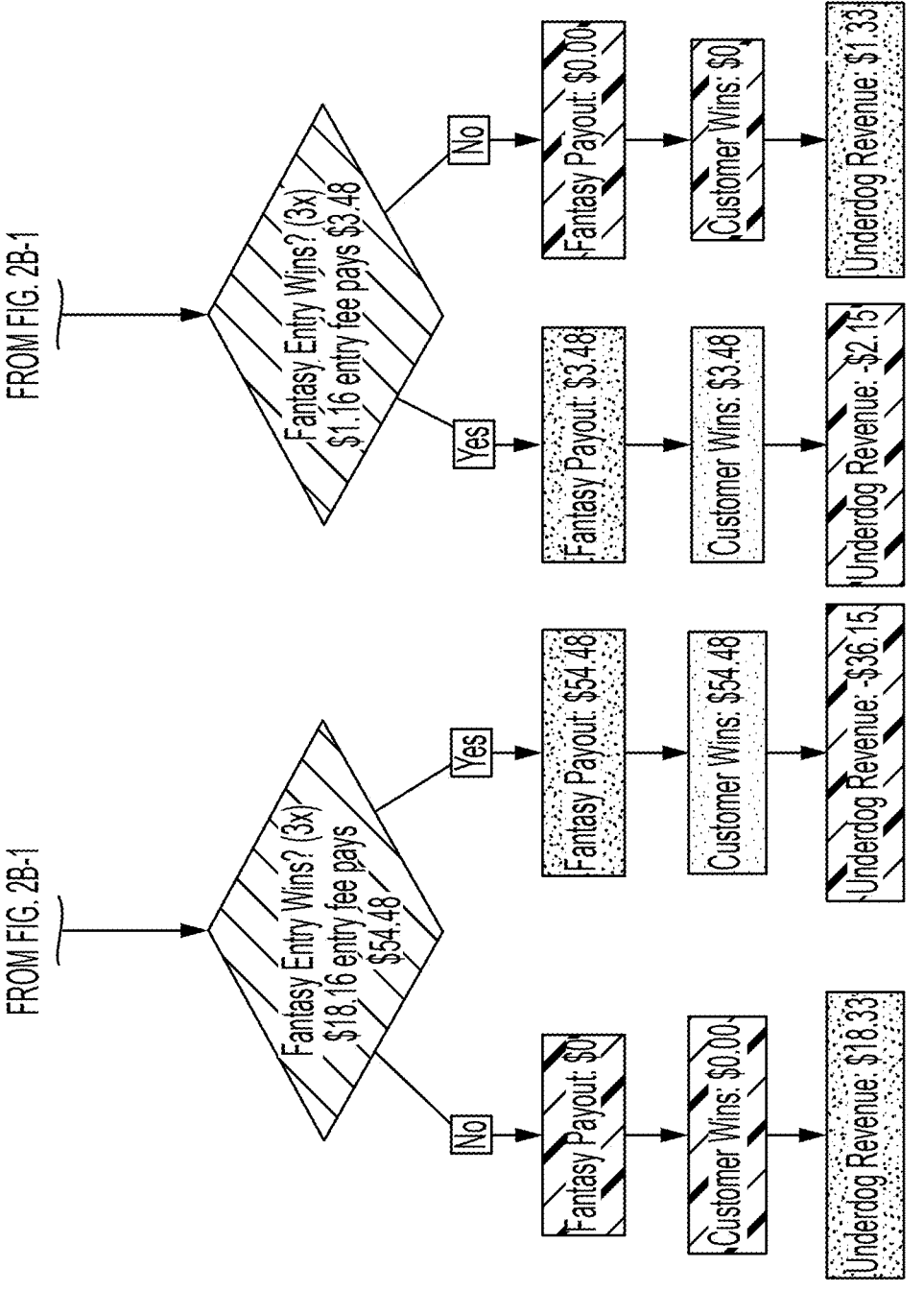

FIGS. 2A-1 through 2B-2 illustrate workflows of determining a payout amount for a user according to illustrative embodiments of the present disclosure. The workflow of FIGS. 2A-1 and 2A-2 corresponds to the instance of a method illustrated in FIGS. 1A-1 and 1A-2 while FIGS. 2A-1 and 2A-2 illustrate in more detail the possible payout amounts that may be determined based on outcomes for the prediction/event contracts and fantasy entry (indicated by amount won by the customer in the graphic). FIGS. 2A-1 and 2A-2 further illustrate a breakdown of the $10 overall entry fee in which the amount paid for the event contracts is $8.67 based on their current market price, the fee paid to the DCM for processing the event contracts is $0.17, an optional fee for the fantasy sports entity to process the event contracts is set at $0, a reservation fee of $1 for the fantasy entry (which may be used to fund the fantasy entry if it is not cancelled prior to locking in), and unused funds of $0.16 (e.g., which may, in certain embodiments, be kept by the fantasy sports entity as a transaction fee). In general, it may be preferred for overall entry amounts selected by users to be whole amounts (e.g., whole dollar amounts). FIGS. 2B-1 and 2B-2 illustrate an alternative payout determination to that made in FIGS. 2A-1 and 2A-2 where unused funds from the overall entry amount (in this case of $10) are rolled into a reservation fee for reserving the fantasy entry (and used to fund the fantasy entry), on top of the preset $1 minimum (resulting in minimum entry amount limit of $1.16 and funding of the fantasy entry of at least $1.16).

In some embodiments, a method comprises receiving, by a processor, from a second computing device, a resolution of one or more predictions, for example as data indicating one or more predictions have resolved and how. In some embodiments, resolution is in favor of a user and a method comprises updating (e.g., causing a hold to be placed on) [e.g., debiting (e.g., temporarily)], by a processor, an account of the user with a prediction payout amount corresponding to one or more predictions [e.g., before funding (e.g., further funding) a fantasy entry].

In some embodiments, a method comprises receiving, by a processor, from a second computing device, a prediction payout amount for one or more event contracts. In some embodiments, a method comprises updating (e.g., causing a hold to be placed on) [e.g., debiting (e.g., temporarily)], by a processor, an account of a user with a prediction payout amount for one or more event contracts [e.g., before funding (e.g., further funding) a fantasy entry].

In some embodiments, an overall entry amount selection has been received for a combination selection, a user can receive a maximum payout amount based on the overall entry amount selection [e.g., that has been predetermined (e.g., set)], one or more predictions and a fantasy entry have been resolved (e.g., settled and/or graded) in favor of a user, and determining a payout amount comprises determining that the payout amount is equal to the maximum payout amount. In some embodiments, one or more predictions (e.g., the one or more event contracts) have been resolved (e.g., settled) in favor of a user, a fantasy entry has been resolved (e.g., settled and/or graded) against a user and determining a payout amount comprises determining that the payout amount is zero. In some embodiments, a fantasy entry has been resolved (e.g., settled and/or graded) against a user (e.g., whether or not one or more predictions resolve for or against the user) and determining a payout amount comprises determining that the payout amount is zero. In some embodiments, an overall entry amount selection has been received for a combination selection, a user can receive a maximum payout amount based on the overall entry amount selection [e.g., that has been predetermined (e.g., set)], a fantasy entry has been funded by an amount less than an amount to receive the maximum payout amount, the fantasy entry resolved (e.g., settled and/or graded) in favor of the user (e.g., whether or not one or more predictions has been resolved for or against the user), and determining a payout amount comprises determining that the payout amount is between zero and the maximum payout amount. In some embodiments, a fantasy entry has been funded in an amount less than a maximum entry amount limit and at least a minimum entry amount limit, and determining a payout amount comprises determining that the payout amount is between zero and a maximum payout amount for a combination selection. In some embodiments, a fantasy entry has a minimum entry amount limit, a fantasy entry resolved (e.g., settled and/or graded) in favor of a user and one or more predictions resolved (e.g., settled) against the user, and determining a payout amount comprises determining that the payout amount is based on the minimum entry amount limit.

In some embodiments, communicating with a second computing device comprises causing, by a processor, purchase (e.g., buying) of one or more event contracts (e.g., via a DCM) for a user. In some embodiments, communicating with a second computing device comprises transmitting a fee amount to a DCM for facilitating a purchasing of one or more event contracts. In some embodiments, communicating with a second computing device comprises transmitting an event contract amount to a DCM for purchasing one or more event contracts.

In some embodiments, an overall entry amount selection has been received for a combination selection, a user can receive a maximum payout amount based on an overall entry amount selection, and an event contract amount is an amount that will result in a user receiving a maximum payout amount if one or more predictions and a fantasy entry resolve (e.g., settle and/or grade) in favor of a user. In some embodiments, an overall entry amount selection has been received for a combination selection, a user can receive a maximum payout amount based on an overall entry amount selection, and one or more event contracts are of a number and amount such that a user will receive a maximum payout amount if one or more predictions and a fantasy entry resolve (e.g., settle and/or grade) in favor of a user. In some embodiments, an overall entry amount selection has been predetermined. In some embodiments, an overall entry amount selection has been set.

In some embodiments, communicating with a second computing device is performed using an API (e.g., of a DCM). Communicating with a second computing device may comprise, in response to receiving a combination selection, receiving, by a processor, from an account of a user, a prediction payout amount for one or more event contracts. Communicating with a second computing device may comprise, in response to receiving a combination selection, receiving, by a processor, from an account of a user, a fee amount for facilitating (e.g., purchasing of) one or more event contracts. Communicating with a second computing device may comprise transmitting, by a processor, a prediction payout amount. Communicating with a second computing device may comprise transmitting, by a processor, a fee amount to a second computing device.

A method may comprise receiving, by a processor, a command from a user to terminate and/or sell at least one of one or more event contracts, wherein communicating with a second computing device comprises causing a termination and/or selling of at least one of one or more event contracts. A method may comprise receiving, by a processor, from a second computing device, a payout amount for at least one of one or more event contracts that is based on a termination and/or selling.

A method may comprise updating, by a processor, an account of a user by a payout amount. A method may comprise automatically updating (e.g., crediting), by a processor, an account of a user by a prediction payout amount for one or more event contracts upon settlement of the one or more event contracts. Settlement of one or more event contracts may be determined and/or received by communication, by a processor, with a second computing device. A method may comprise automatically updating (e.g., subsequently automatically updating), by a processor, an account of a user to fund a fantasy entry (e.g., to a maximum entry amount limit). In some embodiments, automatically updating an account comprises causing a hold to be placed on an account. In some embodiments, automatically updating an account comprises debiting an account. In some embodiments, automatically updating an account comprises temporarily debiting an account. In some embodiments, automatically updating an account comprises automatically updating and receiving an account.

A method may comprise automatically updating (e.g., crediting), by a processor, an account of a user by a prediction payout amount for one or more event contracts upon settlement of the one or more event contracts; and subsequently, automatically updating (e.g., causing a hold to be placed on) [e.g., debiting (e.g., temporarily)] (e.g., and receiving), by the processor, the account of the user to fund a fantasy entry (e.g., to a maximum entry amount limit). Settlement of one or more event contracts may be determined and/or received by communication, by a processor, with a second computing device.

In some embodiments, updating an account to fund a fantasy entry comprises updating an account by a prediction payout amount. In some embodiments, updating an account to fund a fantasy entry comprises updating an account by an amount of at least a prediction payout amount. A method may comprise receiving, by a processor, a prediction payout amount for one or more event contracts via a second computing device. A method may comprise automatically updating (e.g., crediting), by a processor, an account by a prediction payout amount.

A method may comprise settling, by a processor, a fantasy entry. Settling a fantasy entry may occur after receiving a prediction payout amount. Settling a fantasy entry may occur automatically upon updating an account by a prediction payout amount.

A method may comprise receiving, by a processor, a prediction payout amount for one or more event contracts via a second computing device. A method may comprise automatically updating (e.g., crediting), by a processor, an account with a prediction payout amount. A method may comprise subsequently automatically updating (e.g., causing a hold to be placed on) [e.g., debiting (e.g., temporarily)], by a processor, an account by a prediction payout amount in order to fund a fantasy entry.

A method may comprise receiving, by a processor, a prediction payout amount for one or more event contracts via a second computing device. A method may comprise automatically updating (e.g., crediting), by a processor, an account by a prediction payout amount before settling a fantasy entry. A method may comprise automatically updating (e.g., crediting), by a processor, an account by a prediction payout amount before a fantasy entry is funded).

A method may comprise receiving, by a processor, from a second computing device a prediction payout amount for one or more event contracts. A method may comprise updating (e.g., crediting), by a processor, an account by a prediction payout amount. A method may comprise subsequently automatically updating, by a processor, an account by a prediction payout amount in order to fund a fantasy entry (e.g., thereby funding a fantasy entry).

Reservation/Settling

A fantasy entry may be reserved, for example automatically upon receiving a combination selection (e.g., if there is a sufficient amount in a user account). A fantasy entry may freeze one or more current characteristics for a fantasy entry. Reserving a fantasy entry may include receiving a reservation fee (e.g., and accordingly updating a user account), which may, in some embodiments, be used to fund the fantasy entry or be forfeit (e.g., to a fantasy sports entity) if the fantasy entry is cancelled. Reserving a fantasy entry may include funding the fantasy entry by a minimum amount, which may be zero or some positive amount (e.g., $1) as part of reserving the fantasy. Reserving a fantasy entry may include setting a minimum entry amount limit and/or a maximum entry amount limit for the fantasy entry. For example, a maximum entry amount limit for a fantasy entry may be set based on a maximum payout amount for a combination selection and overall entry amount selection, such that a payout amount for a fantasy entry is the maximum payout amount if the fantasy entry is funded to the maximum entry amount limit and resolves in favor of a user. In some embodiments, a method comprises resolving (e.g., grading and/or settling), by a processor, a fantasy entry.

A fantasy entry may be reserved and, after a period of time, funded and/or resolved. It is possible that event contracts do not resolve (e.g., settle) until after a fantasy entry would otherwise be resolvable. Resolution of the fantasy entry may be intentionally delayed in order to give time for one or more event contracts to resolve (e.g., settle) since proceeds from such event contract(s) would be intended to fund the fantasy entry for a combination selection (or it would be unknown whether a further user account update need be made to fund the fantasy entry if the event contract(s) resolve unfavorably). A fantasy sports entity may include the possibility of this delay, and its control over its use and length, in its terms of service or user agreement. In some embodiments, resolution of the fantasy entry may only after one or more event contracts have been resolved (e.g., settled).

Methods disclosed herein may include resolving one or more predictions and/or resolving a fantasy entry and/or one or more actions or events occurring upon resolution of one or more predictions and/or resolution of a fantasy entry. Resolving of one or more event contracts and/or a fantasy entry may occur automatically (e.g., automatically upon one or more conditions, such as one or more funding conditions, being met). Resolving may include or be settling, for example of one or more event contracts and/or a fantasy entry. Resolving may include or be grading, for example of a fantasy entry. Settling may include transmitting (e.g., sending) an amount, for example as a payout, for example as proceeds. One or more predictions may be considered to be resolved as soon as the conditions necessary (e.g., contractually specified, e.g., in an event contract) for resolution are met. For example, a prediction that a certain team will win a particular game may be resolved, in some embodiments, as soon as a game has been completed, or, in other embodiments, as soon as one or more conditions corresponding to official verification of the result have been made (e.g., official league records have been updated). In some embodiments, a prediction may resolve on a delay, for example related to conditions underlying the specific prediction made (e.g., as specified in an underlying event contract). In some embodiments, resolution of a fantasy entry may be delayed, for example to allow for time for a prediction to resolve, for example to allow for time for one or more event contracts to resolve (e.g., settle).

In some embodiments, reserving a fantasy entry comprises freezing one or more current characteristics (e.g., price) of picks in the fantasy entry. A fantasy entry may be graded and/or settled at a subsequent time based on one or more characteristics as frozen even if the one or more current characteristics for a selection varied between (i) reserving and (ii) grading and/or settlement and/or if the fantasy entry were only made after resolving one or more predictions. In some embodiments, reserving a fantasy entry comprises setting, by a processor, a maximum entry amount limit for the fantasy entry and a minimum entry amount limit for the fantasy entry. A method may include creating, by a processor, a fantasy entry slip comprising a maximum entry amount limit and a minimum entry amount limit (e.g., wherein reserving a fantasy entry comprises the creating). In some embodiments, a minimum entry amount limit has been predetermined. In some embodiments, a minimum entry amount limit is fixed. In some embodiments, a minimum entry amount limit is set based on an overall entry amount selection for a combination selection. In some embodiments, reserving a fantasy entry comprises updating, by a processor, an account of a user by a reservation amount equal to a minimum entry amount limit for a fantasy entry. In some embodiments, updating an account comprises causing a hold to be placed on an account. In some embodiments, updating an account comprises debiting an account. In some embodiments, updating an account comprises temporarily debiting an account. In some embodiments, updating an account comprises updating and receiving an account.

In some embodiments, reserving a fantasy entry comprises updating (e.g., causing a hold to be placed on) [e.g., debiting (e.g., temporarily)] (e.g., and receiving), by a processor, an account of a user by a reservation amount of at least a minimum entry amount limit for a fantasy entry. In some embodiments, reserving a fantasy entry comprises updating (e.g., causing a hold to be placed on) [e.g., debiting (e.g., temporarily)] (e.g., and receiving), by a processor, an account of a user by a reservation amount of at least a minimum entry amount limit for a fantasy entry and any remainder amount of an overall entry amount selected in a combination selection. In some embodiments, a remainder amount is an amount remaining of an overall entry amount after accounting for any fee amounts, an event contract amount, and a minimum entry amount limit. A fee amount may be for entering into one or more event contracts and/or reserving a fantasy entry. In some embodiments, updating by a reservation amount is caused to occur automatically in response to receiving a combination selection.

In some embodiments, a maximum entry amount limit has been determined based on one or more predictions and a fantasy entry. A method may comprise determining, by a processor, a maximum entry amount limit based on one or more predictions and a fantasy entry. In some embodiments, an overall entry amount selection has been received for a combination selection and a method comprises determining, by a processor, a maximum entry amount limit based on an overall entry amount selection. In some embodiments, an overall entry amount selection has been received for a combination selection, a user can receive a maximum payout amount based on an overall entry amount selection [e.g., that has been predetermined (e.g., set)], and a maximum entry amount limit is an amount that will result in a user receiving a maximum payout amount if a fantasy entry resolves (e.g., settles and/or grades) in favor of the user. In some embodiments, one or more predictions resolve against a user and a method comprises, based on a user setting, automatically updating, by a processor, an account of a user by a fantasy entry amount such that a fantasy entry is funded to a maximum entry amount limit. In some embodiments, automatically updating an account comprises causing a hold to be placed on an account. In some embodiments, automatically updating an account comprises debiting an account. In some embodiments, automatically updating an account comprises temporarily debiting an account. In some embodiments, automatically updating an account comprises automatically updating and receiving an account. In some embodiments, a fantasy entry amount is equal to a maximum entry amount limit less a minimum entry amount limit.

In some embodiments, one or more predictions resolve against a user and a method comprises, based on a user setting, automatically updating (e.g., causing a hold to be placed on) [e.g., debiting (e.g., temporarily)] (e.g., and receiving), by a processor, an account of a user by a fantasy entry amount such that a fantasy entry is funded more than a minimum entry amount limit. In some embodiments, one or more predictions resolve against a user and a method comprises, based on a user setting, automatically updating (e.g., causing a hold to be placed on) [e.g., debiting (e.g., temporarily)] (e.g., and receiving), by a processor, an account of a user by a fantasy entry amount such that a fantasy entry is funded more than a minimum entry amount limit and less than a maximum entry amount limit.

In some embodiments, at least one of one or more event contracts have been terminated and/or sold by a user prior to resolving (e.g., settling) one or more event contracts and a method comprises, based on a user setting, updating (e.g., causing a hold to be placed on) [e.g., debiting (e.g., temporarily)] (e.g., and receiving), by a processor, an account of a user by a fantasy entry amount such that a fantasy entry is funded to a maximum entry amount limit.

In some embodiments, a fantasy entry amount is equal to a maximum entry amount limit less any payout amount received from a termination and/or selling of at least one of one or more event contracts.

A method may include determining, by a processor, based on a user setting, that an account of a user does not have a sufficient amount to additionally (e.g., fully) fund a fantasy entry and cancelling a fantasy entry. In some embodiments, an account of a user does not have a sufficient amount to additionally (e.g., fully) fund a fantasy entry due to one or more predictions resolving against a user. One or more predictions resolving against a user may be in favor of a counterparty to one or more event contracts.

In some embodiments, a user setting is received in a combination selection. In some embodiments, a user setting is specific to a combination selection. In some embodiments, a user setting is a default setting for all combination selections for a user. A default setting may be changeable.

In some embodiments, reserving a fantasy entry comprises updating (e.g., causing a hold to be placed on) [e.g., debiting (e.g., temporarily)], by a processor, a reservation amount from an account of a user.

In some embodiments, a fantasy entry is funded at least in part by a prediction payout amount for one or more event contracts. In some embodiments, a fantasy entry is funded at least in part by an account. In some embodiments, a fantasy entry is funded only by proceeds to a user from one or more event contracts. In some embodiments, one or more event contracts are resolved (e.g., settled) in favor of a counterparty to a user and a fantasy entry is funded only by an account. In some embodiments, one or more predictions are resolved in favor of a counterparty to a user and a fantasy entry is funded only by an account. In some embodiments, an account always has a non-negative balance.

In some embodiments, an overall entry amount selection has been received for a combination selection for an overall entry amount to be funded from an account of a user. In some embodiments, an overall entry amount selection has been received for a combination selection and a method comprises updating (e.g., causing a hold to be placed on) [e.g., debiting (e.g., temporarily)], by a processor, an account of a user by an overall entry amount corresponding to an overall entry amount selection upon receiving a combination selection. In some embodiments, an overall entry amount selection has been received for a combination selection and a method comprises receiving, by a processor, an overall entry amount corresponding to an overall entry amount selection from an account of a user.

In some embodiments, communicating and reserving occur in parallel (e.g., simultaneously). In some embodiments, communicating and reserving both occur automatically by a processor upon receiving a combination selection. In some embodiments, communicating and reserving are both automatically initiated by a processor upon receiving a combination selection.

A method may comprise settling, by a processor, a fantasy entry after one or more predictions have been resolved. In some embodiments, a fantasy entry has been graded before one or more predictions have been resolved. A method may comprise settling, by a processor, a fantasy entry after one or more event contracts have been settled. In some embodiments, a fantasy entry has been graded before one or more event contracts have been settled.

A method may comprise receiving, by a processor, from a second computing device, a resolution of one or more predictions; and subsequently, settling, by the processor, a fantasy entry. A method may comprise settling, by a processor, a fantasy entry after one or more event contracts have been settled. A method may comprise receiving, by a processor, from a second computing device, a prediction payout amount for one or more event contracts; and subsequently, settling, by the processor, a fantasy entry. A method may comprise updating, by a processor, an account of a user based on an outcome of one or more event contracts and a fantasy entry. A method may comprise crediting, by a processor, an account of a user based on an outcome of one or more event contracts and a fantasy entry. A method may comprise updating, by a processor, an account based on a payout amount. A method may comprise crediting, by a processor, an account based on a payout amount. A method may comprise receiving, by a processor, from a second computing device, a prediction payout amount for one or more event contracts as a result of one or more event contracts resolving (e.g., settling) in favor of a user.

Fantasy Entry and Prediction Data Structures

A combination selection may be transmitted and/or received as one or more data elements (e.g., in a data packet). Such data element(s) may include data for one or more settings and/or data for an overall entry amount selection. An overall entry amount selection may be transmitted (e.g., sent) as a separate data element and associated with one or more combination selection data elements. A user setting selection may be transmitted (e.g., sent) as a separate data element and associated with one or more combination selection data elements. Combination selection data element(s) may include entirely separate elements for prediction selection(s) and fantasy entry selection, for example to ensure regulatory and legal compliance and/or to facilitate workflow and/or transaction auditing.

In some embodiments, a method comprises creating, by a processor, a prediction slip for one or more prediction selections of a combination selection and a fantasy entry slip for a fantasy entry selection of the combination selection, for example (e.g., automatically) upon receiving a combination selection (e.g., from a user computing device). A prediction slip is a data structure and a fantasy entry slip is a data structure, used to process one or more prediction selections and a fantasy entry selection, respectively. A prediction slip or data therein or therefrom may be communicated to a second computing device for the purposes of processing one or more event contracts (e.g., entering a user into one or more event contracts). A prediction slip and a fantasy entry slip may be entirely separate data structures. A prediction slip and a fantasy entry slip may be separately processed. Using such separate data structures and/or separately processing such data structures may facilitate and/or ensure regulatory and legal compliance and/or to facilitate workflow and/or transaction auditing.

In some embodiments, a fantasy entry slip is created automatically. In some embodiments, reserving a fantasy entry comprises creating a fantasy entry slip. In some embodiments, a fantasy entry slip comprises a maximum entry amount limit and a minimum entry amount limit. In some embodiments, a fantasy entry slip comprises data (e.g., a variable) indicative of a current funding amount (e.g., an absolute or relative amount, e.g., relative to a maximum entry amount limit) for the fantasy entry. Such data may be updated as a method proceeds, for example based on an outcome of one or more predictions, based on a prediction payout amount received, and/or based on one or more user settings.

In some embodiments, a method includes automatically updating, by a processor, a fantasy entry slip to fund (e.g., fully fund) a fantasy entry upon resolution of one or more predictions based on communication, by the processor, with a second computing device. In some embodiments, a method includes automatically updating, by a processor, a fantasy entry slip to fund (e.g., fully fund) a fantasy entry upon settlement of one or more event contracts based on communication, by the processor, with the second computing device (e.g., based on receiving a prediction payout amount from the second computing device as proceeds for the one or more event contracts). In some embodiments, a prediction slip is processed independently of a fantasy entry slip. In some embodiments, no data related to one or more predictions is present in a fantasy entry slip. In some embodiments, a prediction slip is processed before a fantasy entry slip.

Fantasy Entries

A fantasy entry may be required by law and/or regulation to have certain characteristics to be a valid fantasy entry, e.g., valid in one or more jurisdictions, such as a jurisdiction of a user making a combination selection and/or a jurisdiction in which a computing device processing a combination selection is located. In some embodiments, a fantasy entry comprises two picks corresponding to different athletes on different teams. In some embodiments, a fantasy entry selection comprises two selections, one for each of two athletes on different teams. In some embodiments, a fantasy entry comprises two or more fantasy picks (e.g., three, four, five, six, seven, or eight fantasy picks). A fantasy entry selected with a fantasy entry selection may be for a (e.g., full) fantasy roster. In some embodiments, a method includes automatically validating, by a processor (e.g., of a user controlled computing device or of a first computing device, e.g., controlled by a fantasy sports entity), a fantasy entry. Validating may occur before transmission and/or submission of a combination selection (e.g., at a user controlled computing device). Validating may occur after receiving a combination selection and prior to reserving a fantasy entry (e.g., and prior to communicating with an externally controlled second computing device). Validating may include checking the fantasy entry for a number of players, a number of teams, duplicate projections (e.g., taking a main and alt line for a same appearance), a number of picks per appearance, one or more fee characteristics, one or more pool characteristics, or a combination thereof.

A fantasy entry may be locked at a point in time, generally once a first event in which a fantasy pick for the fantasy entry begins, at which point the fantasy entry may not be changed, for example may not be cancelled and/or may not be set to be differently funded. For example, due to timing differences a fantasy entry may not actually be funded until later, prior to settlement, for example because one or more event contracts have not yet settled, but an amount by which a user desires to fund a fantasy entry may still be locked in that the user can no longer change whether the user desires to provide additional funding from an account if one or more predictions for a combination selection resolve against the user. In some embodiments, a method comprises locking, by a processor, a fantasy entry (e.g., by locking a fantasy entry slip thereby prohibiting any further changes). In some embodiments, locking of a fantasy entry occurs automatically upon an earliest initiation of any event corresponding to picks in the fantasy entry. In some embodiments, locking of the fantasy entry occurs automatically upon a temporally first pick in the fantasy entry going live. In some embodiments, a fantasy entry becomes uncancellable automatically upon an earliest initiation of any event corresponding to picks in the fantasy entry. In some embodiments, a fantasy entry becomes uncancellable automatically upon a temporally first pick in the fantasy entry going live. In some embodiments, a method includes receiving, by a processor, a fantasy entry cancellation request from a user (e.g., prior to an earliest initiation of any event corresponding to picks in the fantasy entry) (e.g., prior to a temporally first pick in the fantasy entry going live); and cancelling, by the processor, the fantasy entry [e.g., in which case no value may be assigned for the fantasy entry (e.g., and a reservation amount for the fantasy entry is forfeited)]. In some embodiments, a fantasy entry is cancelled when proceeds to a user from an outcome of one or more event contracts are less than an amount to fund the fantasy entry (e.g., based on user input received) (e.g., automatically and unavoidably).

Correlations

Picks corresponding to prediction selections and picks corresponding to fantasy entry selections can be correlated, for example if a prediction selection corresponds to a first team winning a game and a fantasy entry selection corresponds to fantasy picks of which one or more is on the team predicted to win. Such correlation may mean that a payout amount for a user to be paid if all picks resolve in favor of the user should be appropriately lowered. For example, an overall entry amount may result in a multiple (e.g., $6\times$, as an example) payout amount corresponding to a combination selection corresponding to fully uncorrelated picks but a sub-multiple (e.g., sub-$6\times$, respectively) payout amount corresponding to a combination selection corresponding to correlated picks. Thus, payout shifting, or correlation blocking, may be implemented for correlated picks. The present disclosure recognizes that for combination selections, prediction payout amounts paid out for event contracts are fixed and cannot be altered. Therefore, in determining a maximum payout amount that can be paid out to a user if all picks resolve in favor of the user, where a combination selection includes selections for correlated picks, if the maximum payout amount is to account for correlation (e.g., be lowered), then the adjustment must be reflected in a fantasy amount to paid out for if a fantasy entry resolves if favor of the user. That is, the adjustment cannot be split between one or more event contracts and a fantasy entry. This may be, as one reason, because processing event contracts is performed by an externally controlled computing device.

As an example, it may be determined that there is a 50% shift needed for a combination selection based on predetermined correlation rules on what would normally be a $6\times$ payout amount (relative to an overall entry amount) for three picks (one prediction and two fantasy picks making a fantasy entry), each +100, using American-style likelihood notation. Event contract(s) underlying the prediction may pay out a prediction payout amount at $2\times$ a portion of an overall entry amount used for the combination selection. This ratio cannot be altered because the contract(s) are fixed and separately processed. Therefore, to account for the 50% shift from $6\times$ to $3\times$ to reflect the correlation, the 50% shift must be applied to a fantasy payout amount for the fantasy entry, which in this case would normally be $3\times$ absent correlation but would by shifted to $1.5\times$ to reflect the correlation. This shift may have an impact on a payout amount determined for based on an outcome of the one or more event contracts and the fantasy entry depending on how the prediction and fantasy entry resolve. For example, while a maximum payout amount is shifted when correlated, no difference would be observed for payout amount determined and received between correlated or uncorrelated scenarios if a user cancels the fantasy entry since it would only be based on prediction payout amount for the prediction selection(s).

Fantasy Entry Slip and Prediction Slip Data Structures

A combination selection may be transmitted and/or received as one or more data elements (e.g., in a data packet). Such data element(s) may include data for one or more settings and/or data for an overall entry amount selection. An overall entry amount selection may be transmitted (e.g., sent) as a separate data element and associated with one or more combination selection data elements. A user setting selection may be transmitted (e.g., sent) as a separate data element and associated with one or more combination selection data elements. Combination selection data element(s) may include entirely separate elements for prediction selection(s) and fantasy entry selection, for example to ensure regulatory and legal compliance and/or to facilitate workflow and/or transaction auditing.

In some embodiments, a method comprises creating, by a processor, a prediction slip for one or more prediction selections of a combination selection and a fantasy entry slip for a fantasy entry selection of the combination selection. A prediction slip is a data structure and a fantasy entry slip is a data structure, used to process one or more prediction selections and a fantasy entry, respectively. A prediction slip and a fantasy entry slip may be separate data structures. A prediction slip and a fantasy entry slip may be separately processed. Using such separate data structures and/or separately processing such data structures may facilitate and/or ensure regulatory and legal compliance and/or to facilitate workflow and/or transaction auditing.

In some embodiments, reserving a fantasy entry comprises creating a fantasy entry slip. In some embodiments, a fantasy entry slip comprises a maximum entry amount limit and a minimum entry amount limit. In some embodiments, a fantasy entry slip comprises data (e.g., a variable) indicative of a current funding amount (e.g., an absolute or relative amount, e.g., relative to a maximum entry amount limit) for the fantasy entry.

In some embodiments, a method includes automatically updating, by a processor, a fantasy entry slip to fund (e.g., fully fund) a fantasy entry upon resolution of one or more predictions based on communication, by the processor, with a second computing device. In some embodiments, a method includes automatically updating, by a processor, a fantasy entry slip to fund (e.g., fully fund) a fantasy entry upon settlement of one or more event contracts based on communication, by the processor, with the second computing device (e.g., based on receiving a prediction payout amount from the second computing device as proceeds for the one or more event contracts). In some embodiments, a prediction slip is processed independently of a fantasy entry slip. In some embodiments, no data related to one or more predictions is present in a fantasy entry slip. In some embodiments, a prediction slip is processed before a fantasy entry slip.

Illustrative Systems

A system according to the present disclosure may include multiple computing devices which may be separately controlled, for example a user computing device (e.g., phone, smartphone, smart watch, tablet, or computer), a first computing device (e.g., controlled by a fantasy sports entity), and a second computing device [e.g., externally controlled relative to the first computing device (e.g., by a DCM)].

A system may include one or more user computing devices for making combination selections, the combination selections each comprising one or more respective prediction selections for one or more respective predictions and a respective fantasy entry selection for a respective fantasy entry. A system may include a first computing device (e.g., a fantasy sports entity computing device) (e.g., server). A first computing device may be for (i) receiving combination selections from one or more user computing devices, (ii) communicating with a second (e.g., externally controlled) computing device to process event contracts via the second computing device (e.g., one or more respective event contracts for the one or more respective predictions), (iii) processing fantasy entries (e.g., the respective fantasy entry), or a combination thereof. A first computing device may be operable to (i) receive combination selections from one or more user computing devices, (ii) communicate with a second (e.g., externally controlled) computing device to process event contracts via the second computing device (e.g., one or more respective event contracts for the one or more respective predictions), (iii) process fantasy entries (e.g., the respective fantasy entry), or a combination thereof.

A system may include an app stored in a memory of each of one or more user computing devices for making combination selections, the combination selections each comprising one or more respective prediction selections for one or more respective predictions and a respective fantasy entry selection for a respective fantasy entry. A system may include a first computing device (e.g., a fantasy sports entity computing device) (e.g., server). A first computing device may be for (i) receiving combination selections from one or more user computing devices, (ii) communicating with a second (e.g., externally controlled) computing device to process event contracts via the second computing device (e.g., one or more respective event contracts for the one or more respective predictions), (iii) processing fantasy entries (e.g., the respective fantasy entry), or a combination thereof. A first computing device may be operable to (i) receive combination selections from one or more user computing devices, (ii) communicate with a second (e.g., externally controlled) computing device to process event contracts via the second computing device (e.g., one or more respective event contracts for the one or more respective predictions), (iii) process fantasy entries (e.g., the respective fantasy entry), or a combination thereof.

In some embodiments, processing comprises entering into (e.g., purchasing), selling, settling, or a combination thereof one or more event contracts. In some embodiments, a first (e.g., fantasy sports entity) computing device does not process event contracts. In some embodiments, a second (e.g., externally controlled) computing device is controlled by a DCM. In some embodiments, for each combination selection of a plurality of combination selections, a first (e.g., fantasy sports entity) computing device is operable to update an account of a respective user who made the combination selection based on an outcome of one or more predictions and a fantasy entry for the combination selection. In some embodiments, for each combination selection of a plurality of combination selections, a first (e.g., fantasy sports entity) computing device is operable to update an account of a respective user who made the combination selection based on an outcome of one or more event contracts and a fantasy entry for the combination selection. In some embodiments, processing a respective fantasy entry comprises reserving the respective fantasy entry. In some embodiments, a system is operable to reserve a respective fantasy entry before one or more respective predictions are resolved and/or before one or more respective event contracts corresponding to the respective prediction(s) settle. In some embodiments, a system is operable to resolve (e.g., grade and/or settle) a fantasy entry after one or more event contracts settle. In some embodiments, a respective fantasy entry is graded before one or more respective event contracts settle. In some embodiments, a system is operable to grade a respective fantasy entry before one or more respective event contracts settle. In some embodiments, a respective fantasy entry is settled after one or more respective event contracts settle. In some embodiments, a system is operable to settle a respective fantasy entry after one or more respective event contracts settle. In some embodiments, a system is operable to fund a respective fantasy entry with a prediction payout amount received from a second computing device for one or more respective event contracts. In some embodiments, funding a respective fantasy entry comprises updating an account with a prediction payout amount from a second computing device and subsequently automatically updating the account by the prediction payout amount (e.g., withdrawing the prediction payout amount). In some embodiments, a system is operable to receive a prediction payout amount for the one or more respective event contracts from a second computing device and update the account with the prediction payout amount before settling a respective fantasy entry. In some embodiments, a system is operable to receive from a second computing device a prediction payout amount for one or more respective event contracts; update (e.g., credit) an account by the prediction payout amount; and subsequently automatically update (e.g., place a hold on) [e.g., debit (e.g., temporarily)] the account by the prediction payout amount (e.g., subsequently automatically withdraw the prediction payout amount from the account) in order to fund a fantasy entry (e.g., thereby funding the respective fantasy entry). In some embodiments, a system is compliant with regulations for futures contracts for one or more jurisdictions (e.g., is CFTC-compliant). In some embodiments, one or more user computing devices, a first (e.g., fantasy sports entity) computing device, and a second (e.g., externally controlled) computing device are communicatively coupled to perform a method disclosed herein.

Figure 1F:
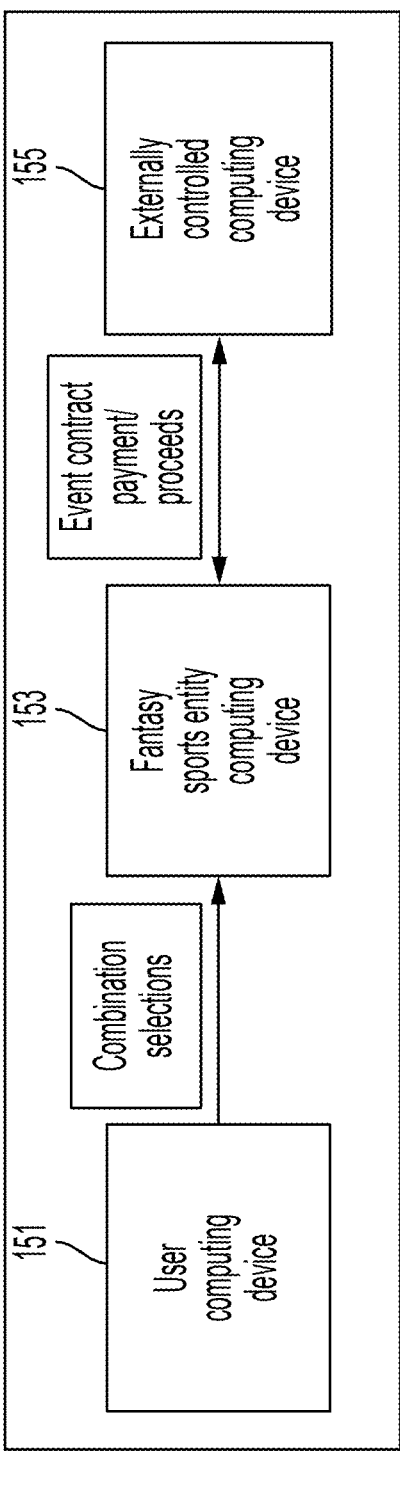

FIG. 1F is a schematic of an illustrative system 150. The system 150 comprises one or more user computing devices 151 for making combination selections. The combination selections each comprises one or more respective prediction selections for one or more respective predictions and a respective fantasy entry selection for a respective fantasy entry [e.g., a valid fantasy entry, e.g., valid in one or more jurisdictions (e.g., a jurisdiction of the user and/or a jurisdiction of the one or more user computing devices)]. The system 150 also comprises a fantasy sports entity computing device 153 (e.g., server). The fantasy sports entity computing device 153 (e.g., server) may receive and process the combination selections from the one or more user devices. The fantasy sports entity computing device 153 (e.g., server) may communicate with an externally controlled computing device 155 to process one or more respective event contracts for the one or more respective predictions. The fantasy sports entity computing device 153 (e.g., server) may process the respective fantasy entry. The processing performed by the externally controlled computing device 155 may comprise entering into (e.g., purchasing), selling, settling, or a combination thereof the one or more respective event contracts. The fantasy sports entity computing device 153 may not process event contracts. The externally controlled computing device 155 may be controlled by a designated contract market (DCM). For each combination selection of the combination selections, the fantasy sports entity computing device 153 may be operable to update an account of a respective user who made the combination selection based on an outcome of the respective one or more predictions and the respective fantasy entry for the combination selection. Processing the respective fantasy entry may comprises reserving the respective fantasy entry.

Graphical User Interfaces (GUIs) for Combination Selections and Illustrative User Computing Devices A graphical user interface may be used to provide a user with the ability to provide input of a combination selection selected from possible picks. A graphical user interface may provide selection widgets (e.g., buttons) (e.g., selectable icons) through which to select picks and provide input. In this way, a single screen presented to a user may provide both one or more predictions and one or more fantasy picks for making a fantasy entry together, which provides a more seamless user experience, whether the user chooses to make a combination selection or simply to browse available picks and make one or more individual picks (e.g., one or more individual predictions and/or one or more fantasy entries comprising fantasy picks). In contrast, prior to the present disclosure, predictions were conventionally made using one app or website run by a prediction market and fantasy entries were made with another app or website controlled by a fantasy sports entry. Thus, graphical user interfaces as disclosed herein provide an advantage in that they simplify user experience. In some embodiments, a user may not be able to readily tell which selection widgets correspond to a prediction or fantasy pick merely based on the selection widget. Even if a user can tell which picks are for predictions and which are for fantasy entries, a benefit of using a common (e.g., integrated) graphical user interface for predictions and fantasy picks is still achieved for the user.

A user may be able to browse via a graphical user interface between sports games or events (e.g., tournaments) (or a non-sports event) or teams to see what picks are available in a convenient and easy to understand manner. For example, a first set of possible picks shown to a user via a graphical user interface may correspond to a first upcoming game between two teams (e.g., a basketball game) and a second set of possible picks may correspond to a second game (or event) with different team(s) or athlete(s). A user may make selections of picks as desired by browsing between multiple such screens until a final selection is made, which may be a combination selection that includes one or more prediction selections corresponding to one or more predictions and a fantasy entry selection corresponding to a fantasy entry comprising one or more fantasy picks. While making picks via such a graphical user interface or after making such picks, a user may input via an overall entry amount selection widget an overall entry amount that the user wishes to enter for the combination selection. A corresponding maximum payout amount based on the current selection and the current overall entry amount may be provided (e.g., rendered and displayed) so that a user may understand what the maximum payout amount will be for the overall entry amount (i.e., if all picks resolve in favor of the user). A maximum payout amount shown to a user via a graphical user interface may be shown as a rounded amount (e.g., down to the nearest dollar) to simplify representation to the user. Determination of the maximum payout amount may be performed locally on the user computing device, for example based on a pre-established set of rules and/or the nature of the pick(s) being made (e.g., their likelihood of resolving in favor of the user). Such a determination may alternatively be performed by a computing device and transmitted to a user computing device for provision (e.g., rendering and displaying) to the user. Such determinations may update (e.g., live) based on new pick(s) made by a user and/or removal of pick(s) by the user and/or changing of an overall entry amount, as input using corresponding widgets of a graphical user interface, which provides a desirable responsive user experience. A user may use this information to make a decision about whether to submit the combination selection or not.

A user may also have the option of entering one or more user settings, for example via one or more user setting widgets, that relate to one or more combination selections for the user. For example, a user setting may be used to indicate that a user wishes to provide additional funding to a fantasy entry for a combination selection if one or more predictions selected do not resolve in favor of the user. A user setting may be specific to a combination selection being made. A user may select a user setting on a selection by selection basis. A user setting may instead by a "global" setting that applies to all selections (e.g., combination selections) made by a user and, in some embodiments, can be changed at any time but will act as a "default."

A combination selection confirmation screen of a graphical user interface may be provided to allow a user to easily view which picks have been made, the selected overall entry amount, and the possible maximum payout amount before confirming submission (e.g., via a confirm submission widget) of a combination selection.

In some embodiments, a user using a graphical user interface will see a standard "lobby," with prediction markets and fantasy markets commingled. In some embodiments, a user can make (e.g., via selection widgets) fantasy selections (e.g., for a player) and one or more prediction selections in combination or may just make fantasy picks or a prediction. Another screen may be provided that summarizes the selection(s) of one or more fantasy and/or predictions made, and a customer may be able to then submit the selection(s) (e.g., combination selection) with one widget (e.g., a submission widget) (e.g., with one tap). Having a separate confirmation screen may facilitate a user in understanding a combination selection being submitted prior to final submission.

Figure 3B:
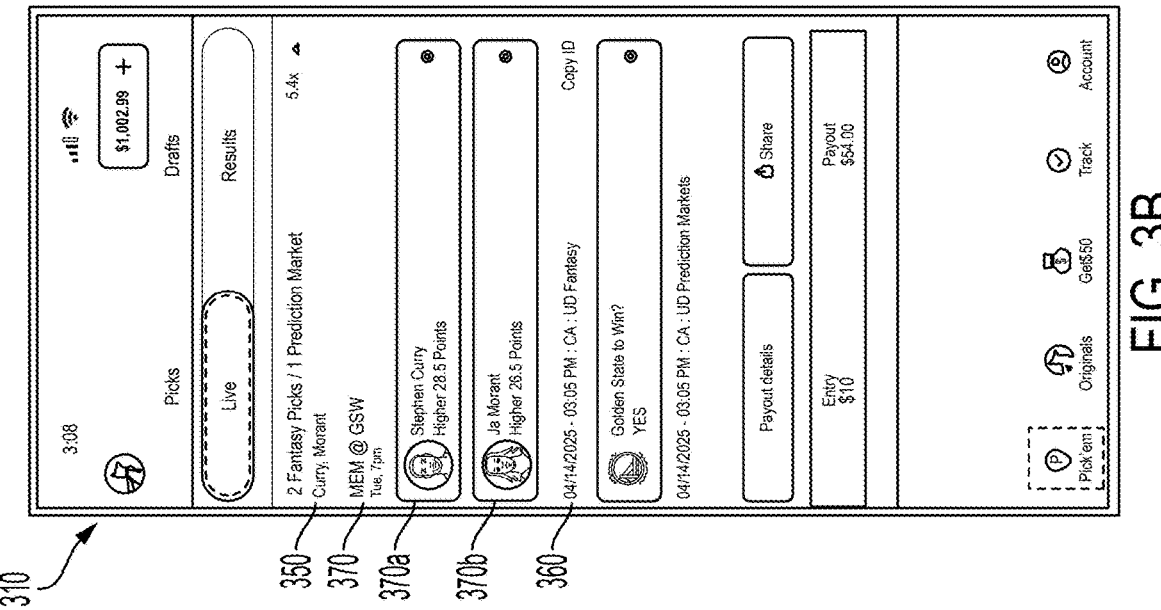
FIGS. 3A-3B illustrate views of a graphical user interface (GUI), according to illustrative embodiments of the present disclosure.
Figure 3A:
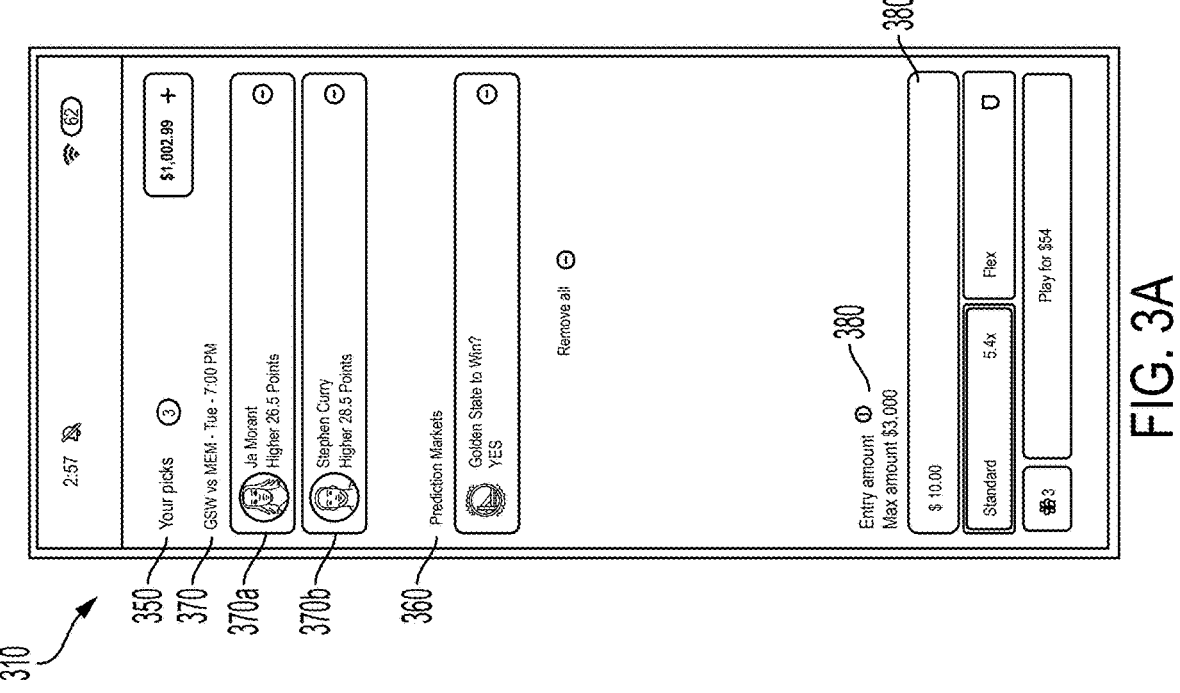

FIG. 3A is an illustration of a graphical user interface (GUI) 310 for facilitating a combination selection of a user that combines one or more predictions and a fantasy entry. A GUI 310 comprises a combination selection 350. The combination selection 350 may comprise one or more prediction selections 360 corresponding to one or more predictions, e.g., 360a, and a fantasy entry selection 370 corresponding to a fantasy entry, e.g., 370a, of a plurality of fantasy picks [e.g., a valid fantasy entry, e.g., valid in one or more jurisdictions (e.g., a jurisdiction of the user and/or a jurisdiction of the first computing device)]. The GUI 310 comprises an overall entry amount selection widget 380. The overall entry amount selection widget 380 may be used to input an overall entry amount selection, e.g., 380a, corresponding to a combination selection 350. The overall entry amount selection widget 380 may allow a user to adjust a multiple (e.g., of an overall entry amount selection, e.g., 380a), for example according to certain rules for a fantasy contest. The overall entry amount selection widget 380 may include a freestyle text entry, a drop-down menu, a radio button list, or other graphical user interface element/widget with one or more predetermined entries presented for user selection. The overall entry amount selection widget 380 may indicate an overall entry amount selection. The overall entry amount selection widget 380 may prompt a user to submit the payout amount (indicated as $54 in FIG. 3A). FIG. 3B also shows another example of a graphical user interface (GUI) 310 comprises a combination selection 350 that is currently live. The combination selection 350 may comprise one or more prediction selections 360 corresponding to one or more predictions, e.g., 360a, and a fantasy entry selection 370 corresponding to a fantasy entry, e.g., 370a, of a plurality of fantasy picks. A GUI 310 may include an entry amount and/or a maximum payout amount. In some embodiments, a GUI 310 comprises a widget that allows a user to share the live combination selection 350 with other users (e.g., prospective users). In some embodiments, a GUI 310 comprises a widget that displays payout details, for example a maximum payout amount that may be received for a given overall entry amount and combination selection.

Figure 4A:
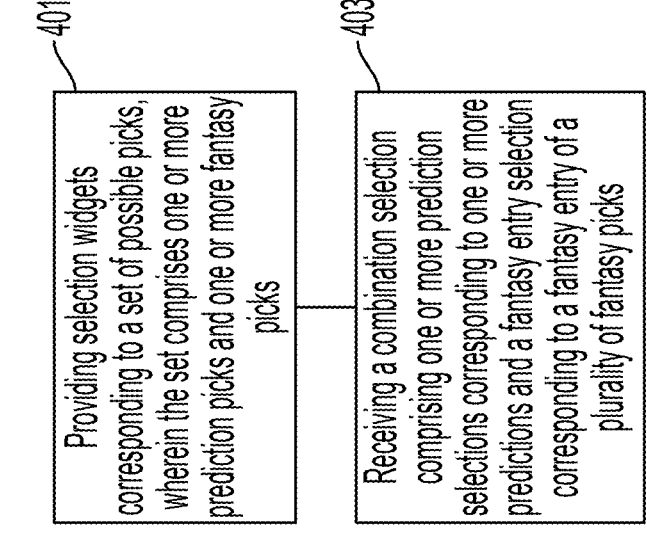
FIG. 4A is a process flow diagram for a method of making a combination selection using a graphical user interface, according to illustrative embodiments of the present disclosure.
Figure 4A:
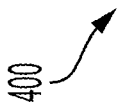
Figures 1, 4B:
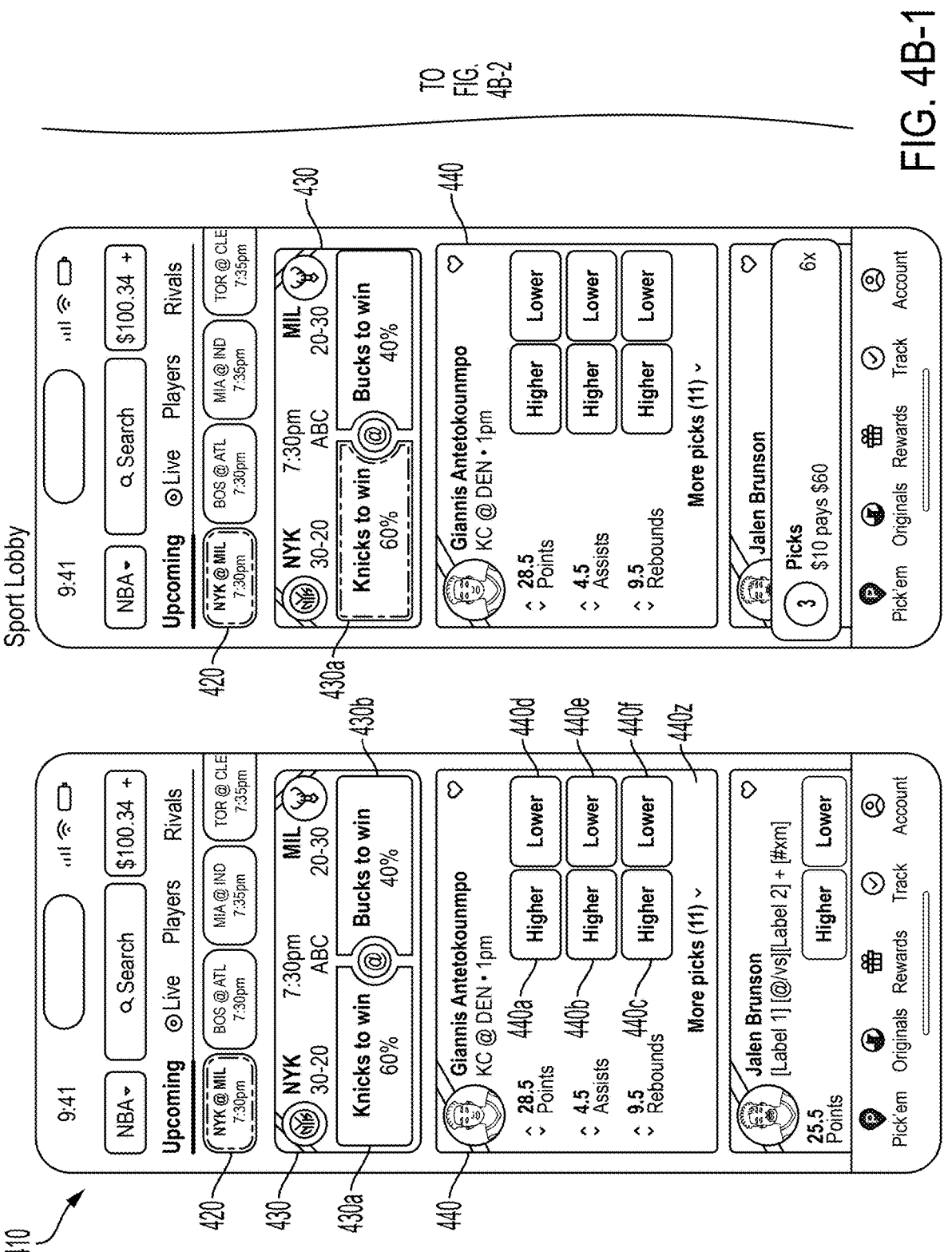
Figures 1, 2, 4B:
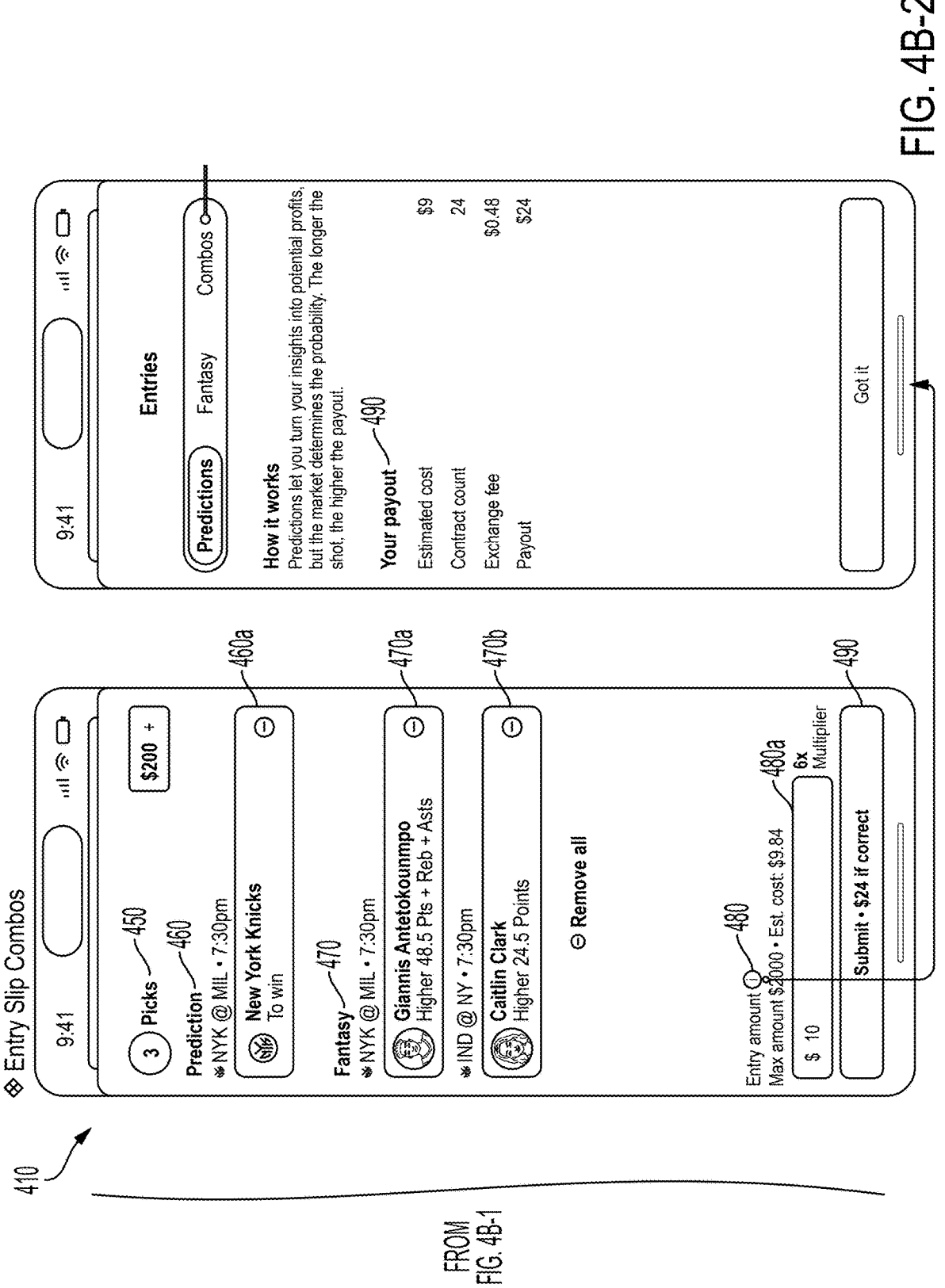
Figure 4C:
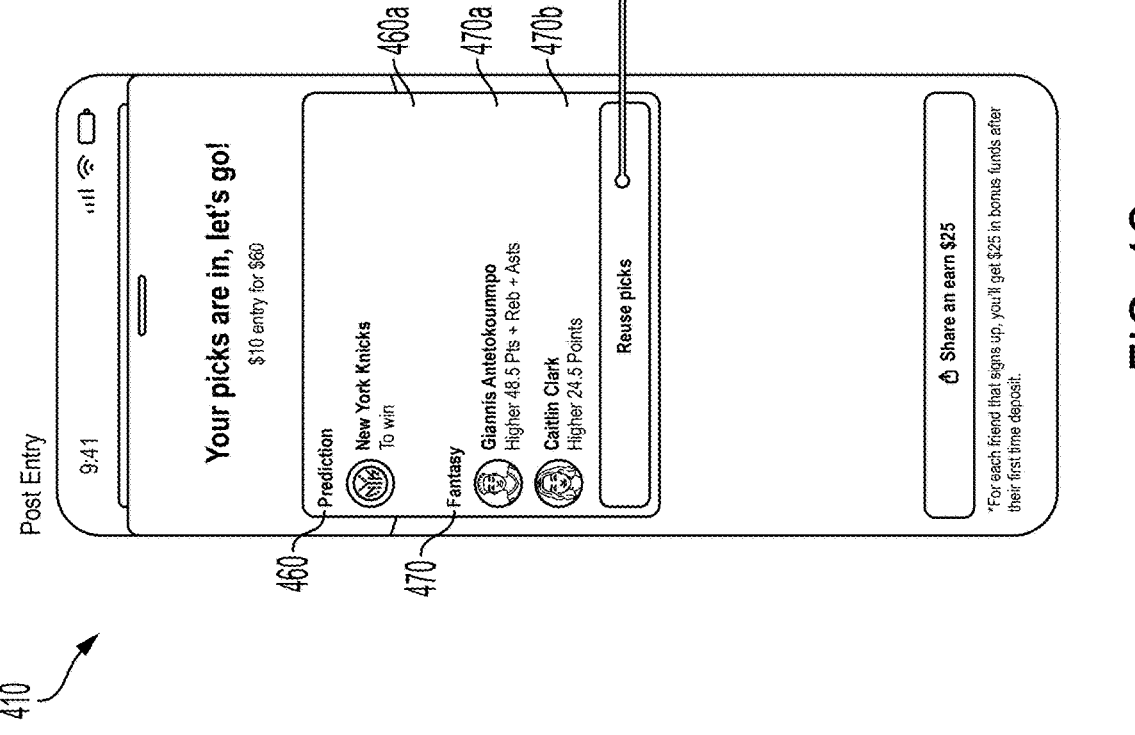
Figures 1, 4D:
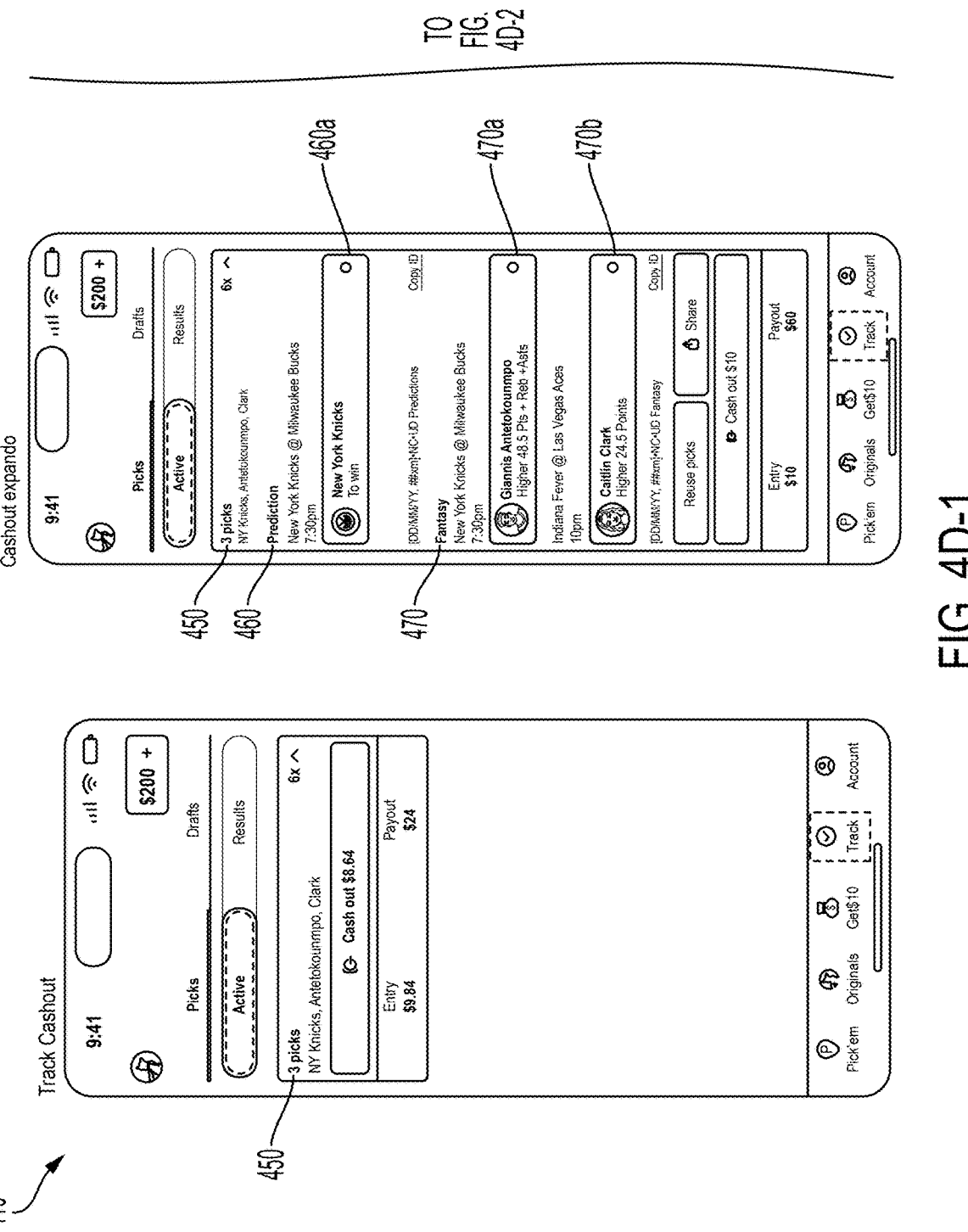
Figures 1, 2, 4D:
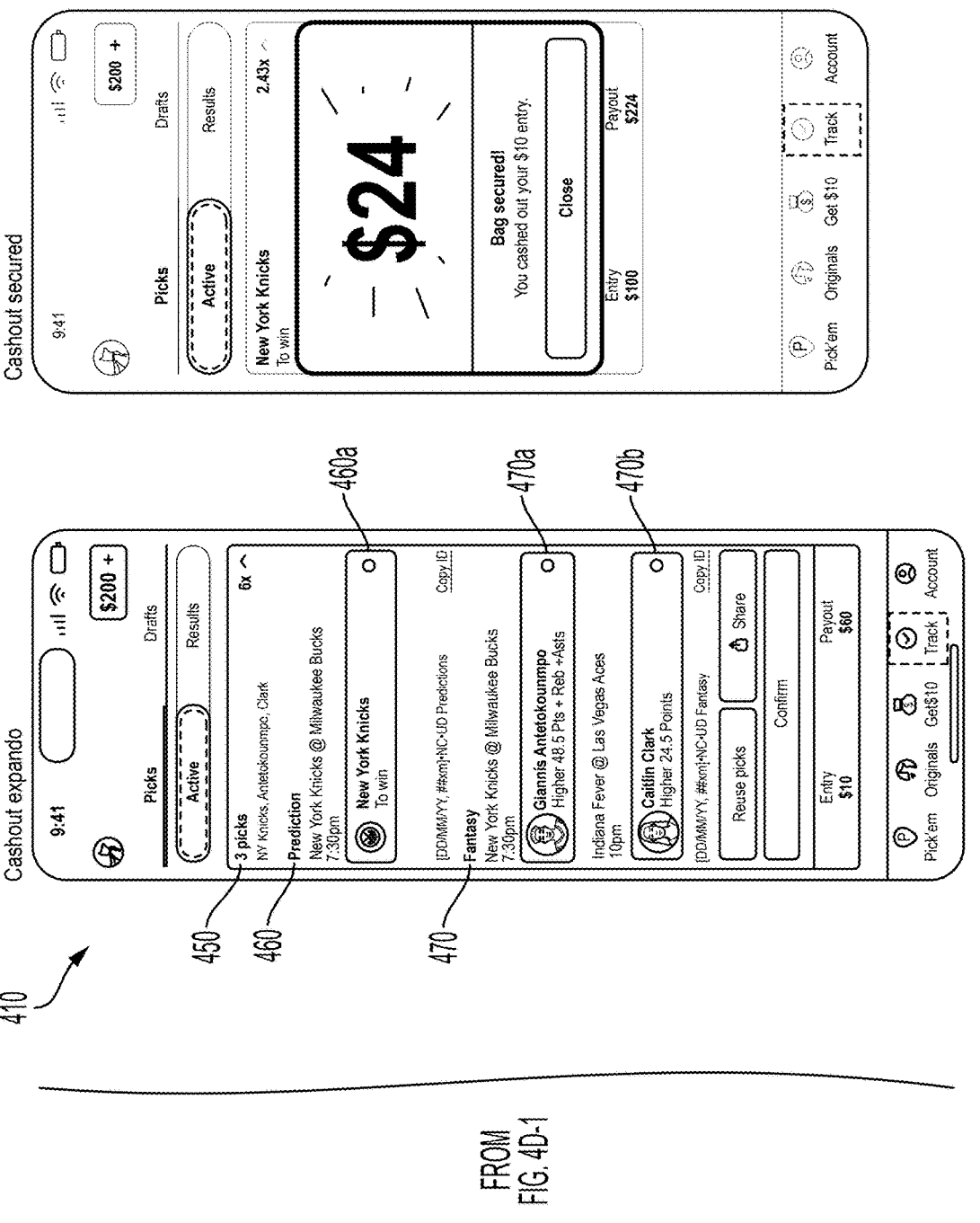
Figure 4E:
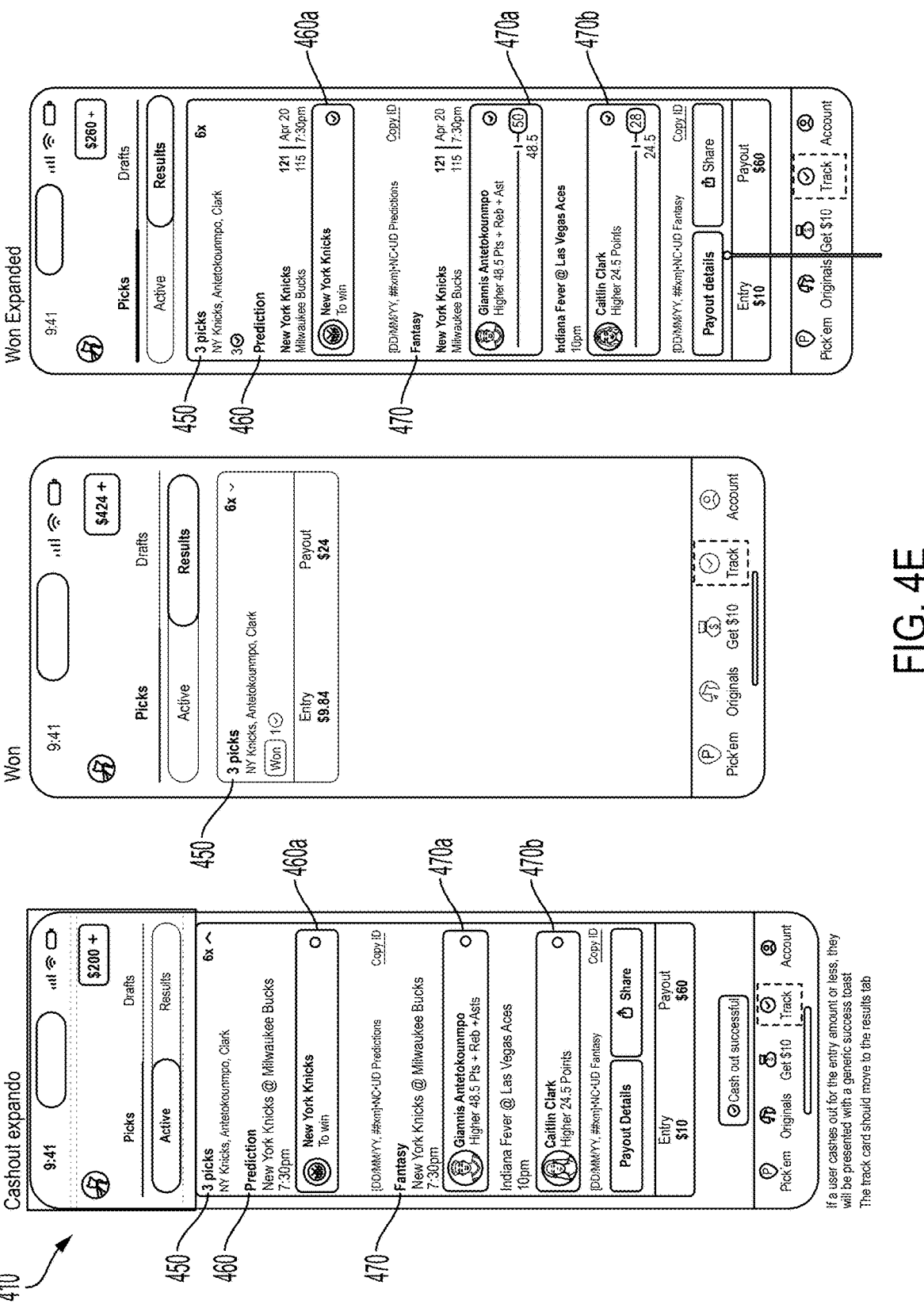
Figure 4F:
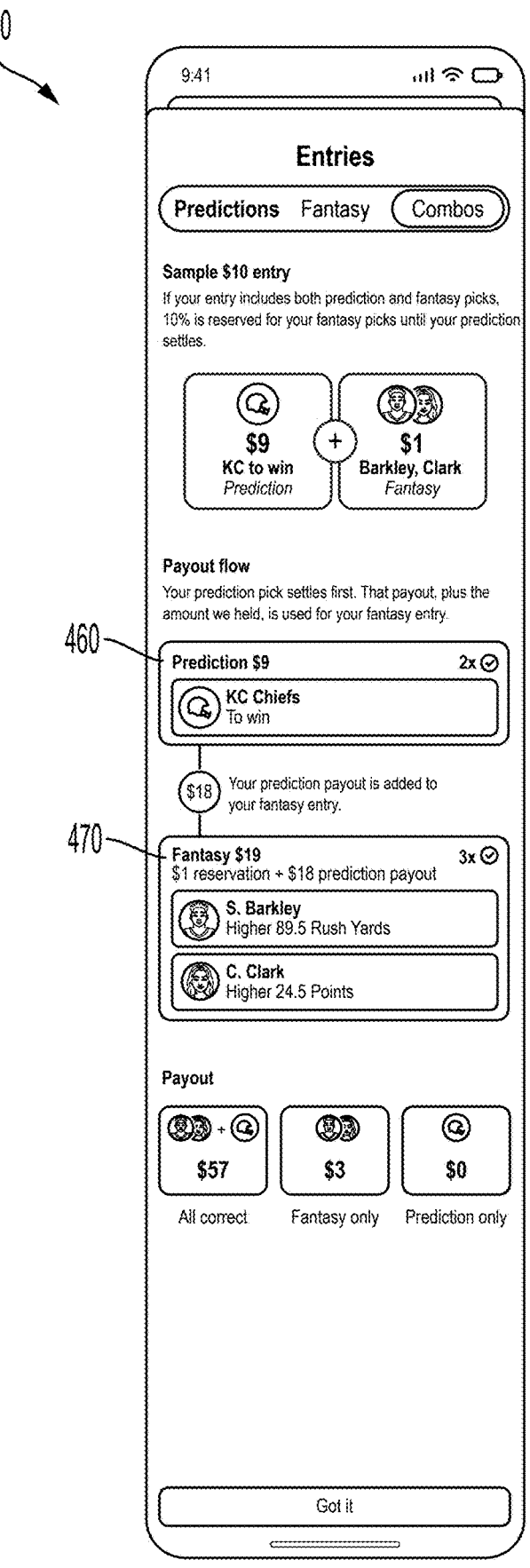

FIG. 4A illustrates a process flow diagram for a method of making a combination selection using a graphical user interface as disclosed herein and FIGS. 4B-1 through 4F are illustrations of an illustrative graphical user interface that may be used in performance of the method illustrated in FIG. 4A, or other methods disclosed herein.

FIG. 4A shows a flow diagram of an illustrative method 400 of facilitating a combination selection of a user that combines one or more predictions and a fantasy entry using a common graphical user interface, according to illustrative embodiments of the present invention. In some embodiments, the method 400 comprises, at step 401, providing selection widgets corresponding to a set of possible picks, wherein the set comprises one or more predictions and one or more fantasy picks. At step 402, the method 400 comprises receiving a combination selection comprising one or more prediction selections corresponding to one or more predictions and a fantasy entry selection corresponding to a fantasy entry of a plurality of fantasy picks.

FIGS. 4B-1 and 4B-2 are illustrations of graphical user interfaces (GUIs) 410 for facilitating a combination selection of a user that combines one or more predictions and a fantasy entry. In some embodiments, a GUI 410 comprises selection widgets 420 (e.g., buttons) (e.g., selectable icons). The selection widgets 420 may include a prediction widget 430 and a fantasy pick widget 440. The selection widgets 420 may correspond to a set of possible picks, wherein the set comprises one or more predictions, e.g., 430a, and one or more fantasy picks, e.g., 440a. The set of possible picks may correspond to a common one sports team or two sports team [e.g., that are to next play each other (e.g., before playing any other team)] (e.g., correspond to athletes on the team(s)). The set of possible picks may correspond to a common single sports game or event (e.g., tournament) (e.g., correspond to athletes on the team(s) playing in the game). For example, predictions 430a and 430b may allow a user to adjust a percentage of winning of two sports team that are to next play each other. For example, a fantasy pick, e.g., 440a, may allow a user to adjust (e.g., increase and/or decrease) one or more statistics (e.g., the number of points, assists, rebounds, and/or other statistics) of an athlete on a sports team. The statistics may be adjusted via, for example, a button, a toggle control, a text entry, a slider, or a drop-down menu. The selection widgets 420 may also allow a user to select an upcoming sports game or event (e.g., tournament). A GUI 410 may include one or more filtering tools [e.g., by sports leagues (e.g., NBA)]. A GUI 410 may include a search bar. A GUI 410 may include one or more tabs displaying live events, each event corresponding to a set of possible picks. A GUI 410 may include one or more tabs displaying athletes (e.g., players) and/or rivals playing in a sports game or event (e.g., tournament).

A GUI 410 may also comprise a combination selection 450. The combination selection 450 may comprise one or more prediction selections 460 corresponding to one or more predictions, e.g., 460a, and a fantasy entry selection 470 corresponding to a fantasy entry, e.g., 470a, of a plurality of fantasy picks [e.g., a valid fantasy entry, e.g., valid in one or more jurisdictions (e.g., a jurisdiction of the user and/or a jurisdiction of the first computing device)], wherein the one or more prediction selections 460 and/or the fantasy entry selection 470 comprises one or more selections corresponding to the set of possible picks, e.g., 430a, 440a.

In some embodiments, a GUI 410 comprises an overall entry amount selection widget 480. The overall entry amount selection widget 480 may be used to input an overall entry amount selection, e.g., 480a, corresponding to a combination selection 450. The overall entry amount selection widget 480 may include a freestyle text entry, a drop-down menu, a radio button list, or other graphical user interface element/widget with one or more predetermined entries presented for user selection. A GUI 410 may provide indication of a maximum payout amount 490 for the combination selection 450 based on a current overall entry amount selection, e.g., 480a (e.g., currently input via the overall entry amount selection widget 480) (e.g., that has been input via the overall entry amount selection widget 480). A GUI

410 may prompt a user to review and confirm the combination selection and overall entry amount prior to submission. A user may receive a maximum payout amount based on the overall entry amount selection, e.g., 480a, [e.g., that has been predetermined (e.g., set)].

The overall entry amount selection widget 480 may provide a detailed breakdown of a combination selection and an overall entry amount and/or a corresponding maximum payout amount. The overall entry amount selection widget 480 may expand a panel [e.g., a secondary panel (e.g., an "Entries" panel as shown in FIG. 4B-2)] showing a detailed breakdown of a combination selection and an overall entry amount and/or a corresponding maximum payout amount that may be received. The panel may be expanded, for example, via a selectable icon (e.g., a "More Info" icon) or a button. In some embodiments, the panel presents a detailed breakdown of an entry amount for a fantasy entry selection 470. In some embodiments, the panel presents a detailed breakdown of an entry amount for a prediction selection 460. For example, the breakdown of an entry amount may show an estimated cost, a reservation amount (e.g., reservation fee), an exchange fee, or any applicable discounts or promotions. In some embodiments, the panel presents a detailed breakdown of a payout amount that can be received for a fantasy entry selection 470. In some embodiments, the panel presents a detailed breakdown of a payout amount that can be received for a prediction selection 460. As shown in FIG. 4F, the panel may present a detailed breakdown of an entry amount and a payout amount corresponding to a combination selection 450. The combination selection 450 may comprise one or more prediction selections 460 corresponding to one or more predictions, e.g., 460a, and a fantasy entry selection 470 corresponding to a fantasy entry, e.g., 470a, of a plurality of fantasy picks [e.g., a valid fantasy entry, e.g., valid in one or more jurisdictions (e.g., a jurisdiction of the user and/or a jurisdiction of the first computing device)]. In some embodiments, the panel may display a payout flow from one or more prediction selections 460 to a fantasy entry selection 470. In certain embodiments, a GUI 410 comprises an interface with a panel for prediction selection, a panel for fantasy entry selection, and a panel for combination selection that allows a user to toggle between the three categories.

In some embodiments, a GUI 410 comprises a widget that allows a user to reuse one or more picks [e.g., one or more prior picks (e.g., one or more prior predictions and/or one or more prior fantasy picks), one or more active picks, or one or more draft picks]. The widget may list one or more picks [e.g., one or more prior picks (e.g., one or more prior predictions and/or one or more prior fantasy picks), one or more active picks, or one or more draft picks]. For each of the one or more picks, the widget may allow a user to select (e.g., via a checkable list) one or more picks to a new combination selection. In some embodiments, the widget may allow a user to update an entry amount and/or one or more picks (e.g., statistics). In some embodiments, the widget may allow a user to reuse one or more picks in one single click. In some embodiments, a GUI 410 comprises a widget that allows a user to share (e.g., access, one or more prior picks, one or more active picks, or one or more draft picks) with other users (e.g., prospective users). This widget may interact (e.g., directly) with other applications (e.g., social media platforms or messaging applications). This widget may generate a QR code, a shareable link, or a message. This widget may present an incentive to the user (e.g., a referral incentive and/or a sharing incentive). The incentive may be a monetary reward, a bonus fund, or other rewards. For example, the widget may specify that if a referred prospective user signs up and meets a condition (e.g., deposit for the first time), the user can get a bonus fund. FIGS. 4C, 4D-1, and 4D-2 show illustrations of such a GUI.

As shown in FIGS. 4D-1, 4D-2, and 4E, a GUI 410 may comprise an interface that displays one or more active picks. Each of the one or more active picks may include information about an associated sports game or event (e.g., tournament) (e.g., correspond to athletes on the team(s) playing in the game) and/or statistics (e.g., live statistics). A GUI 410 may comprise an interface that displays one or more completed picks (e.g., outcomes, final statistics, or a payout associated with one or more completed picks). A GUI 410 may comprise an interface that displays one or more draft picks (e.g., picks that have not been submitted). The interface may allow the user to save the one or more draft picks for later submission. The one or more draft picks may be adjustable [e.g., via selection widgets 420 (e.g., buttons) (e.g., selectable icons)]. The interface (e.g., that displays one or more active picks, one or more completed picks, or one or more draft picks) may include an entry amount and/or a payout amount.

FIGS. 4D-1, 4D-2, and 4E also illustrate a GUI 410 that includes a widget that allows a user to receive a payout amount on an active pick. The widget may display a cash-out value. The widget may display a notification (e.g., a success toast) that the user has cashed out upon user confirmation. The widget may update a user's account (e.g., wallet) (e.g., an in-app account) balance by the cash-out value.

Figure 4G:
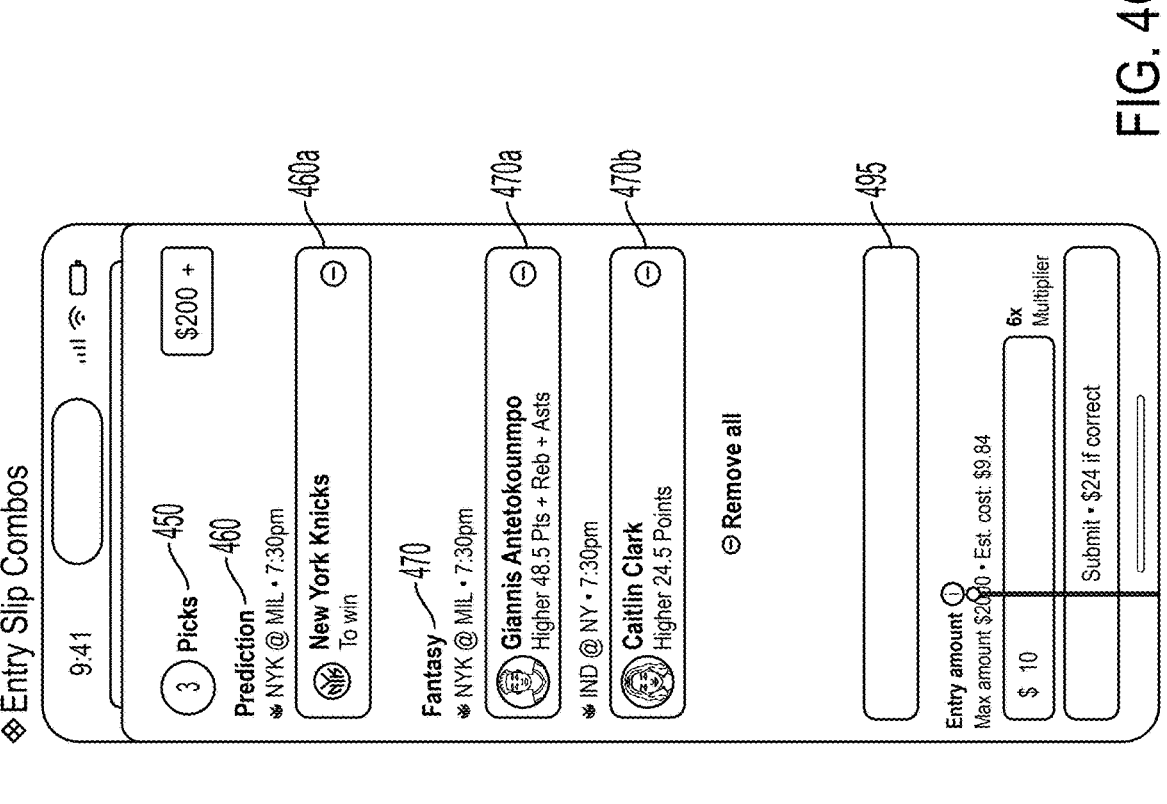

In some embodiments, a GUI 410 comprises one or more user setting widgets 495 (e.g., button(s)) (e.g., selectable icon(s)) for selecting one or more user settings applicable to the combination selection. The user setting widget 495 may allow a user to select and/or adjust a user setting corresponding to a funding rule for the fantasy entry. The user setting widget 495 may allow a user to additionally fund the fantasy entry depending on an outcome of one or more predictions corresponding to the one or more prediction selections. For example, as shown in FIG. 4G, the user setting widget 495 correspond to a button that allows a user to top off funds. The user setting widget 495 may update a user's account (e.g., wallet) (e.g., an in-app account) balance by a fantasy entry amount. The user setting widget 495 may allow a user to conditionally cancel the fantasy entry. The user setting may be specific to the combination selection. The user setting may be a (e.g., changeable) default setting for all combination selections for the user.

In some embodiments, a method is for facilitating making a combination selection comprising one or more prediction selections and a fantasy entry selection by a user using a graphical user interface. A method may include providing, by a processor of a computing device, via a graphical user interface, selection widgets corresponding to a set of possible picks, wherein the set comprises one or more predictions and one or more fantasy picks. Selection widgets for one or more predictions picks and one or more fantasy picks of a set of possible picks may be provided at a same time. Selection widgets for one or more predictions picks and one or more fantasy picks of a set of possible picks may be provided at a same time such that a user can view the prediction(s) and fantasy pick(s) simultaneously. Selection widgets for one or more predictions picks and one or more fantasy picks of a set of possible picks may be provided together. Selection widgets for one or more predictions picks and one or more fantasy picks of a set of possible picks may be provided together such that a user can view the prediction (s) and fantasy pick(s) simultaneously. Providing selection widgets may include rendering and/or displaying selection widgets via a graphical user interface. Selection widgets may be buttons. Selection widgets may be selectable icons. A computing device used to provide selection widgets to a user may be a user phone (e.g., smart phone) or computer (e.g., desktop or laptop) or tablet or smart watch, for example. Selection widgets may be provided on a computer via a website. A graphical user interface may be an app (e.g., installed on a user's smart phone).

A method may include receiving, by a processor, from a user, via a graphical user interface (e.g., via selection widgets of the graphical user interface), a combination selection comprising one or more prediction selections corresponding to one or more predictions and a fantasy entry selection corresponding to a fantasy entry comprising a plurality of fantasy picks, wherein the one or more prediction selections and/or the fantasy entry selection comprises one or more selections corresponding to a set of possible picks. A method may include receiving, by a processor, from a user, via a graphical user interface (e.g., via selection widgets of the graphical user interface), a selection comprising (i) one or more prediction selections corresponding to one or more predictions from to a set of possible picks or (ii) a fantasy entry selection corresponding to a fantasy entry comprising (e.g., of) a plurality of fantasy picks from the set of possible picks. A method may include receiving, by a processor, from a user, via a graphical user interface (e.g., via selection widgets of the graphical user interface), a selection comprising (i) one or more prediction selections corresponding to one or more predictions from to the set of possible picks and (ii) a fantasy entry selection corresponding to a fantasy entry comprising (e.g., of) a plurality of fantasy picks from the set of possible picks. A method may include receiving, by a processor, from a user, via a graphical user interface, a combination selection comprising at least one prediction selection corresponding to at least prediction and at least one fantasy entry selection corresponding to a fantasy entry, for example from a set of possible picks provided via the graphical user interface (e.g., across one or more screens of the graphical user interface).

In some embodiments, a set of possible picks correspond to a common one sports team or two sports teams [e.g., that are to next play each other (e.g., before playing any other team)] (e.g., correspond to athletes on the team(s)). In some embodiments, a set of possible picks correspond to a common single sports game or event (e.g., tournament) (e.g., correspond to athletes on the team(s) playing in the game).

In some embodiments, a method comprises providing (e.g., rendering and displaying), by a processor, via a graphical user interface, second selection widgets (e.g., buttons) (e.g., selectable icons) corresponding to a second set of possible picks different from a first set of possible picks previously provided, wherein the second set comprises one or more predictions and one or more fantasy picks. In some embodiments, a second set of possible picks correspond to a common one sports team or two sports teams [e.g., that are to next play each other (e.g., before playing any other team)] (e.g., correspond to athletes on the team(s)) different from a common one sports team or two sports teams for a first set of possible picks. In some embodiments, a second set of possible picks correspond to a common single sports game or event (e.g., tournament) (e.g., correspond to athletes on the team(s) playing in the game) different from a common single sports game or event (e.g., tournament) for a first set of possible picks. In some embodiments, a combination selection comprises one or more selections corresponding to a second set of possible picks. In some embodiments, one or more prediction selections and/or a fantasy entry selection of a combination selection comprises one or more selections corresponding to a second set of possible picks.

In some embodiments, a method comprises transmitting, by a processor, a combination selection to a second computing device, such as a server, for example a device (e.g., server) controlled by a fantasy sports entity (e.g., company or organization).

In some embodiments, a method includes providing (e.g., rendering and displaying), by a processor, via a graphical user interface, one or more user setting widgets for selecting one or more user settings applicable to a combination selection, for example as described previously herein. User setting widget(s) may be button(s). User setting widget(s) may be selectable icon(s).

In some embodiments, a method comprises transmitting, by a processor, a user setting selection corresponding to a funding rule for a fantasy entry. A funding rule may be, for example, to additionally fund a fantasy entry depending on an outcome of one or more predictions corresponding to one or more prediction selections. A funding rule may be, for example, to additionally fund a fantasy entry depending on an outcome of one or more predictions corresponding to one or more prediction selections. In some embodiments, a method comprises transmitting, by a processor, a user setting selection corresponding to a rule to conditionally cancel a fantasy entry. In some embodiments, a user setting is transmitted in a combination selection. In some embodiments, a user setting is specific to a combination selection. In some embodiments, a user setting is a (e.g., changeable) default setting for all combination selections for a user. In some embodiments, a method comprises receiving, by a processor, via a graphical user interface, a selection of a user setting, for example via one or more user setting widgets of the graphical user interface. A user setting may be transmitted based, at least in part, on a user selection of a setting made via one or more user setting widgets of a graphical user interface.

In some embodiments, a method comprises providing (e.g., rendering and displaying), via a graphical user interface, an overall entry amount selection widget for inputting an overall entry amount selection corresponding to a combination selection. In some embodiments, a method comprises receiving, via a graphical user interface, an overall entry amount selection, for example via an overall entry amount selection widget of the graphical user interface. In some embodiments, a method comprises transmitting, by a processor, (e.g., to the fantasy sports entity controlled computing device) an overall entry amount selection in a combination selection.

In some embodiments, a method comprises providing (e.g., rendering and displaying), by a processor, indication of a payout amount corresponding to a combination selection based on a current overall entry amount selection. A current overall entry amount selection may be that which is currently input via an overall entry amount selection widget. A current overall entry amount selection may have been input (e.g., by a user) via an overall entry amount selection widget. In some embodiments, a method comprises determining (e.g., calculating), by a processor of a user computing device, a payout amount.

In some embodiments, a method comprising providing (e.g., rendering and displaying), by a processor, via a graphical user interface, a summary of selections received via selection widgets and an overall entry amount selected via an overall entry amount selection widget and a submission widget (e.g., button) (e.g., selectable icon) that submits the selections (e.g., submits a combination selection comprising one or more prediction selections and a fantasy entry selection) when selected. In some embodiments, a submission widget is disabled if a set of fantasy entry selections cannot be used to form a fantasy entry (e.g., only includes players from a single team). In some embodiments, a computing device that is providing a graphical user interface determines whether a fantasy entry is valid. In some embodiments, selecting a submission widget causes automatic transmission, by a processor, of a combination selection (e.g., to a computing device controlled by a fantasy sports entity).

Such methods using graphical user interfaces just described may be a method that is compliant with regulations for futures contracts in one or more jurisdictions (e.g., in a CFTC-compliant manner).

In some embodiments, a method is for facilitating a user making a combination selection (e.g., pick) that combines one or more predictions and a fantasy entry and receiving a payout amount for the combination selection. A method may provide, by a processor of a computing device (e.g., via a graphical user interface) a combination selection (e.g., pick) by a user, the combination selection comprising one or more prediction selections corresponding to one or more predictions and a fantasy entry selection corresponding to a fantasy entry. In some embodiments, a computing device may be a user phone. In some embodiments, a computing device may be a user-accessible website. In some embodiments, a fantasy entry comprises a valid fantasy entry. A fantasy entry may be valid in one or more jurisdictions. In some embodiments, one or more jurisdictions comprises a jurisdiction of a user. In some embodiments, one or more jurisdictions comprises a jurisdiction of a first computing device. A method may comprise receiving, by a processor, an indication of a payout amount for a user corresponding to a combined outcome of one or more predictions and a fantasy entry [e.g., by which an account (e.g., wallet) of the user will be updated]. An indication may be data. An indication may be a notification. A payout amount may be an amount of money, of currency, of digital coins, of credits, or a combination thereof.

In some embodiments, a method comprises transmitting, by a processor, a combination selection to a second computing device (e.g., a second server). In some embodiments, a method comprises initiating, by a processor, a transfer of a transfer amount corresponding to a payout amount to a user controlled second account. Such an account may be a bank account, a crypto account, or an investment (e.g., brokerage) account. In some embodiments, an account is a first account for an app by which a user makes a combination selection. In some embodiments, a second account is a bank account, a crypto account, or an investment (e.g., brokerage) account. In some embodiments, a transfer amount is denominated in a currency. A currency may be, for example, a fiat currency or a cryptocurrency.

In some embodiments, a method comprises providing, by a processor, a user setting indicative of a user desire that, if one or more predictions resolve against a user, a fantasy entry will be funded to a maximum entry amount limit for the fantasy entry. Providing may comprise providing with a combination selection. Providing may be to a second computing device. A second computing device may be controlled by a fantasy sports entity (e.g., a company). In some embodiments, an account of a user will be automatically updated (e.g., causing a hold to be placed on) [e.g., debiting (e.g., temporarily)] (e.g., and receiving), by a processor, by a fantasy entry amount such that a fantasy entry is funded to a maximum entry amount limit.

In some embodiments, a method comprises providing, by a processor, a user setting indicative of a user desire that, if one or more predictions resolve against a user, a fantasy entry will be funded more than a minimum entry amount limit for the fantasy entry. Providing may comprise providing with a combination selection. Providing may be to a second computing device. A second computing device may be controlled by a fantasy sports entity (e.g., a company). In some embodiments, an account of a user will be automatically updated (e.g., causing a hold to be placed on) [e.g., debiting (e.g., temporarily)] (e.g., and receiving), by a processor, by a fantasy entry amount such that a fantasy entry is funded more than a minimum entry amount limit.

In some embodiments, at least one of one or more event contracts have been terminated and/or sold by a user prior to resolving (e.g., settling) one or more event contracts. A method may comprise providing, by a processor, a user setting indicative of a user desire that, if one or more predictions resolve against a user, a fantasy entry will be funded to a maximum entry amount limit for the fantasy entry. Providing may comprise providing with a combination selection. Providing may be to a second computing device. A second computing device may be controlled by a fantasy sports entity (e.g., a company). In some embodiments, an account of a user will be automatically updated (e.g., causing a hold to be placed on) [e.g., debiting (e.g., temporarily)] (e.g., and receiving), by a processor, by a fantasy entry amount such that a fantasy entry is funded to a maximum entry amount limit.

In some embodiments, at least one of one or more event contracts have been terminated and/or sold by a user prior to resolving (e.g., settling) one or more event contracts and a method comprises providing, by a processor, a user setting indicative of a user desire that, if one or more predictions resolve against a user, a fantasy entry will be funded to a maximum entry amount limit for the fantasy entry. Providing may comprise providing with a combination selection. Providing may be to a second computing device. A second computing device may be controlled by a fantasy sports entity (e.g., a company). In some embodiments, an account of a user will be automatically updated (e.g., causing a hold to be placed on) [e.g., debiting (e.g., temporarily)] (e.g., and receiving), by a processor, by a fantasy entry amount such that a fantasy entry is funded to a maximum entry amount limit.

In some embodiments, a fantasy entry is funded by an amount equal to a maximum entry amount limit less any payout amount received from a termination and/or selling of at least one of one or more event contracts.

A method may comprise providing, by a processor, a user setting such that if an account of a user does not have a sufficient amount to additionally (e.g., fully) fund a fantasy entry, the fantasy entry is automatically cancelled. In some embodiments, an account of a user does not have a sufficient amount to additionally (e.g., fully) fund a fantasy entry due to one or more predictions resolving against the user. One or more predictions resolving against a user may be in favor of a counterparty to one or more event contracts.

In some embodiments, a user setting is provided in a combination selection. In some embodiments, a user setting is specific to a combination selection. In some embodiments, a user setting is a default setting for all combination selections for a user. A default setting may be changeable. In some embodiments, a method comprises providing, by a processor, a fantasy entry cancellation request from a user, wherein a payout amount is based on a cancellation of a fantasy entry. A method may comprise providing, by a processor, a fantasy entry cancellation request from a user prior to an earliest initiation of any event corresponding to selections (e.g., picks) in a fantasy entry. A method may comprise providing, by a processor, a fantasy entry cancellation request from a user prior to a temporally first pick in a fantasy entry going live.

In some embodiments, a method comprises providing, by a processor, a fantasy entry cancellation request from a user. In some embodiments, a method comprises receiving, by a processor, an indication that a fantasy entry has become uncancellable. In some embodiments, a method comprises providing, by a processor, a fantasy entry cancellation request from a user; and receiving, by the processor, in response, an indication that the fantasy entry has become uncancellable. An indication may be data. An indication may be a notification. In some embodiments, a fantasy entry has become uncancellable automatically upon an earliest initiation of any event corresponding to selections (e.g., picks) in the fantasy entry. In some embodiments, a fantasy entry has become uncancellable automatically upon a temporally first pick in the fantasy entry going live.

In some embodiments, a payout amount has been determined using a method disclosed herein.

Amounts and Accounts

Systems and methods may use amounts denominated in various ways to buy, sell, payout, pay, transmit value, receive value or a combination thereof. One or more amounts used in a method or system be amount(s) of money. One or more amounts used in a method or system be amount(s) of currency. One or more amounts used in a method or system be amount(s) of digital coins. One or more amounts used in a method or system be amount(s) of credits. An amount may be a fantasy-entity-specific denominated amount, for example of digital coins or credits. For example, in some embodiments, a method or system uses fantasy-entity-specific denominated amounts, which may or may not have a value outside the context of the fantasy entity (e.g., may or may not be redeemable, for example by bank transfer, for currency, such as U.S. dollars). An amount may be a non-fantasy-entity-specific denominated amount, for example of currency, such as U.S. dollars. In general, it is preferred to use amounts denominated in widely accepted (e.g., jurisdictionally local) currency, for example U.S. dollars for users based in the U.S.; custody and settlement may be easier to facilitate in this way. There may be legal and/or regulatory reasons to use fantasy-entity-specific denominated amounts in a method or system.

An account of a user may be updated (e.g., credited and/or debited) in one or more steps of a method disclosed herein. An account may be updated by an amount by placing a hold on the account for the amount, for example thereby prohibiting a user for that account from using the amount placed on hold, at least temporarily. For example, the amount may not be transferred (e.g., credited or debited) (e.g., withdrawn) yet, for example due to settlement timing, but the account may nonetheless may be updated in real time. An amount may be credited to an account, for example automatically based on one or more events or actions occurring. An amount may be withdrawn from an account, for example automatically based on one or more events or actions occurring. An amount may be debited from an account, for example automatically based on one or more events or actions occurring. Debiting or crediting of an account may be temporary (e.g., occurring as part of an automatic set of steps). An account may be updated temporarily, for example as part of an automatic process (e.g., set of steps). An account may be a wallet.

In some embodiments, an account of a user may be updated based on an amount being transferred to or from the account. In some embodiments, an account of a user may be updated based on an amount to be transferred (e.g., credited or debited) (e.g., withdrawn) to or from the account for the user and which has transferred to or from, respectively, one or more reserve accounts (e.g., for a fantasy sports entity), which may expedite processing (e.g., settlement), for example by utilizing intrabank transfers and/or not requiring interbank transfers to proceed with processing (e.g., settlement). Thus, in some embodiments, an amount or amounts in a user account may be custodied in one or more bank accounts while appearing to a user (e.g., via a graphical user interface as disclosed herein) as a central unified account. In some embodiments, proceeds from one or more event contracts may be paid to a reserve account and, automatically, an equivalent amount from a different reserve account may be used to update a user account, for example to facilitate faster processing (e.g., settlement). A user account may provide an accurate account of amounts currently available to a user but not currently available for withdrawal from the account to a separate user-controlled account (e.g., bank account). An account may include or use a ledger to track amounts for a user across different accounts. An account of a user may be an in-app account. In some embodiments, an account for a user may track only non-fantasy-entity-specific denominated amount amounts, for example of a currency, such as U.S. dollars. In some embodiments, an account for a user may track fantasy-entity-specific denominated amounts and non-fantasy-entity-specific denominated amounts, for example of credits or digital coins and of a currency, respectively. An account may be an in-app and/or fantasy sports entity associated account or another account maintained by a user, for example a digital bank account or a crypto wallet.

In some embodiments, an account of a user may always have a non-negative balance (have a balance of no less than zero, e.g., $0). An account of a user may be prohibited from having a negative balance, for example for legal and regulatory compliance. In some embodiments, an account may not use margin, for example for legal and regulatory compliance. In some embodiments, a fantasy sports entity may not extend credit to an account, for example for legal and regulatory compliance. It may be necessary to first update a user account to reflect a prediction payout amount received for one or more event contracts before subsequently updating the user account for further action (e.g., related to fantasy entry funding), for example for legal and regulatory compliance. Systems and methods disclosed herein can function as intended with such accounts, for example based on funding mechanisms for fantasy entries and event contract processing processes. For example, if one or more event contracts are only purchased if there is a sufficient amount in a user account and a fantasy entry is funded subsequently, sufficient funds can exist throughout the process. A method may include (e.g., automatically) determining, by a processor, whether a user account has sufficient amount for a given action prior to taking the action, for example as described elsewhere herein. A method may include (e.g., automatically) verifying, by a processor, a user account has sufficient amount for a given action prior to taking the action, for example as described elsewhere herein. For example, an automatic verification may be performed upon receiving a combination selection, before communicating with a second computing device to enter a user into one or more event contracts, before reserving a fantasy entry, and/or before funding a fantasy entry (e.g., by updating a user account). Where a user has selected a user setting to enable a "top up" of fantasy entry funding, a verification can be performed to prohibit a negative balance from developing (e.g., and cancel additional funding). In some embodiments, a method includes, as part of automatically funding a fantasy entry, determining, by a processor, whether a user account has a sufficient amount to fund the fantasy entry (e.g., based on a prediction payout amount from one or more event contracts). In some embodiments, while a user may lose an entire amount of an overall entry amount, the user may never lose more than originally entered while also complying with any requirement for event contracts to be bought in full.

A user account may be updated (e.g., to have a hold placed on it) for an overall entry amount and/or an amount corresponding to a maximum entry amount limit (e.g., less any reservation fee) while a fantasy entry for a combination selection remains pending (unresolved) to prevent a negative balance for the user, for example upon receiving a combination selection. An account may be further updated as a method proceeds and more or less amount may be needed from a user account. For example, if a user cancels a fantasy entry, a hold placed on a user account may be updated, in some embodiments.

Funding a fantasy entry and/or funding one or more event contracts may include transferring one or more amounts to and/or from a user account (e.g., to and/or from a fantasy sports entity and/or a DCM). Funding a fantasy entry and/or funding one or more event contracts may include updating a user account by one or more amounts. Funding a fantasy entry and/or funding one or more event contracts may include updating a data structure, such as a fantasy entry slip and/or a prediction slip. Funding a fantasy entry may include updating, by a processor, a user account and may include transferring an amount from the user account to another non-user account, for example controlled by a fantasy sports entity. Funding a fantasy entry by transferring an amount may occur automatically, for example upon receiving a prediction payout amount for one or more event contracts.

Fantasy Sweepstakes

Disclosed herein are numerous embodiments that describe systems and methods that include and/or use fantasy entries corresponding to combination selections by users. In certain cases, sweepstakes style fantasy games are used instead of non-sweepstakes style fantasy games, for example for regulatory and legal reasons. Analogous embodiments to those described herein that use and/or are for fantasy entries (e.g., for a pick'em or pick'em champions style fantasy game) are expressly contemplated that use and/or are for sweepstakes fantasy entries, where a sweepstakes fantasy entry is for a sweepstakes style fantasy game.

Methods and systems disclosed herein may be used for sweepstakes fantasy entries in a sweepstakes style fantasy game. In some embodiments, a method is for processing a combination selection (e.g., pick) from a user that combines one or more predictions and a sweepstakes fantasy entry to determine a payout amount to the user. A method may comprise receiving, by a processor of a first computing device (e.g., a first server), a combination selection (e.g., pick) by a user, the combination selection comprising one or more prediction selections corresponding to one or more predictions and a sweepstakes fantasy entry selection corresponding to a sweepstakes fantasy entry. In some embodiments, a sweepstakes fantasy entry comprises a valid sweepstakes fantasy entry. A sweepstakes fantasy entry may be valid in one or more jurisdictions. In some embodiments, one or more jurisdictions comprises a jurisdiction of a user. In some embodiments, one or more jurisdictions comprises a jurisdiction of a first computing device. A method may comprise communicating, by a processor, with an externally controlled second computing device such that a user is entered into one or more event contracts corresponding to one or more predictions via the second computing device. An externally controlled second computing device may be an externally controlled second server. A method may comprise reserving, by a processor, a sweepstakes fantasy entry. A method may comprise determining, by a processor, an payout amount by which to update an account of a user based on an outcome of one or more event contracts and a sweepstakes fantasy entry. An payout amount may be an amount of money, of currency, of digital coins, of credits, or a combination thereof. An account of a user may be a wallet of a user.

In some embodiments, a payout amount is an amount in a fantasy-entity-specific denominated amount. A payout amount may be an amount of credits or digital coins specific to a fantasy sports entity. A fantasy sports entity may be a company or organization. In some embodiments, one or more event contracts settle in a non-fantasy-entity-specific denominated amount (e.g., of a currency). A method may comprise, upon settling of one or more event contracts, receiving, by a processor, a prediction payout amount for one or more event contracts via a seconding computing device. A method may comprise updating, by a processor, an account of a user by a prediction payout amount. An account of a user may be an account for an payout amount. An account of a user may be a different account of the user. A method may comprise automatically purchasing, by a processor, an amount, wherein the amount is fantasy-sports-entity-specific denominated [e.g., is an amount of credits or digital coins specific to a fantasy sports entity (e.g., company or other organization)].

In some embodiments, a sweepstakes fantasy is funded in a fantasy-entity-specific denominated amount. In some embodiments, a prediction payout amount is a non-fantasy-sports-entity-specific denominated amount (e.g., of a currency). In some embodiments, a method comprises funding a sweepstakes fantasy entry using a fantasy-sports-entity-specific denominated amount.

Illustrative Computing Devices, Systems, and Methods

Illustrative embodiments of systems and methods disclosed herein were described above with reference to computations performed locally by a computing device, such as a server. A server may be a hardware server or a software server. A server may refer to a computing device that at least communicates (e.g., using one-way or two-way communication) with one or more other computing devices (e.g., one or more externally controlled computing devices, e.g., servers, and/or one or more user computing devices (e.g., smartphone(s), laptop(s), desktop(s), smart watch(es), or tablet(s)). A server may be responsive to commands received by another computing device. A server may send commands to another computing device (e.g., another server). A server may process data received from a computing device and/or generate data (e.g., based on one or more events occurring) and/or transmit data to another computing device. A method may include communication between different computing devices, such as, for example combination of two or more of a user computing device, a first computing device (e.g., controlled by a fantasy sports entity), and an externally controlled second computing device (e.g., controlled by DCM). A user may provide input used (e.g., processed, e.g., by a user computing device or another computing device, such as one controlled by a fantasy sports entity) in a method disclosed herein using a GUI of a user computing device, for example as rendered and displayed on a website accessed by the user on the user computing device or on an app (e.g., a smartphone app) installed on the user computing device (e.g., smartphone, desktop, laptop, or tablet). Computations performed over a network are also contemplated. Methods of the present disclosure, or portions thereof, may be performed using a processor. The processor may be a part of a computing device and/or computing system.

Systems of the present disclosure may include a processor and/or a memory. The memory may store one or more programs that include instructions that when executed by a processor cause at least a portion of a method disclosed herein to be performed. The system may further include a machine-learned model. Additionally or alternatively, a remotely stored and/or operated machine-learned model may be accessed by a (e.g., the) processor. The processor and/or memory may be a part of a computing device and/or computing system.

One or non-transitory computer readable media may store one or more programs that include instructions that when executed by a (e.g., the) processor cause at least a portion of a method disclosed herein to be performed.

At least part of the methods and systems described in this specification may be controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the methods, systems, and techniques described in this specification may be controlled using a computing system including one or more processing devices and memory storing instructions that are executable by the one or more processing devices to perform various control operations.

Figure 5:
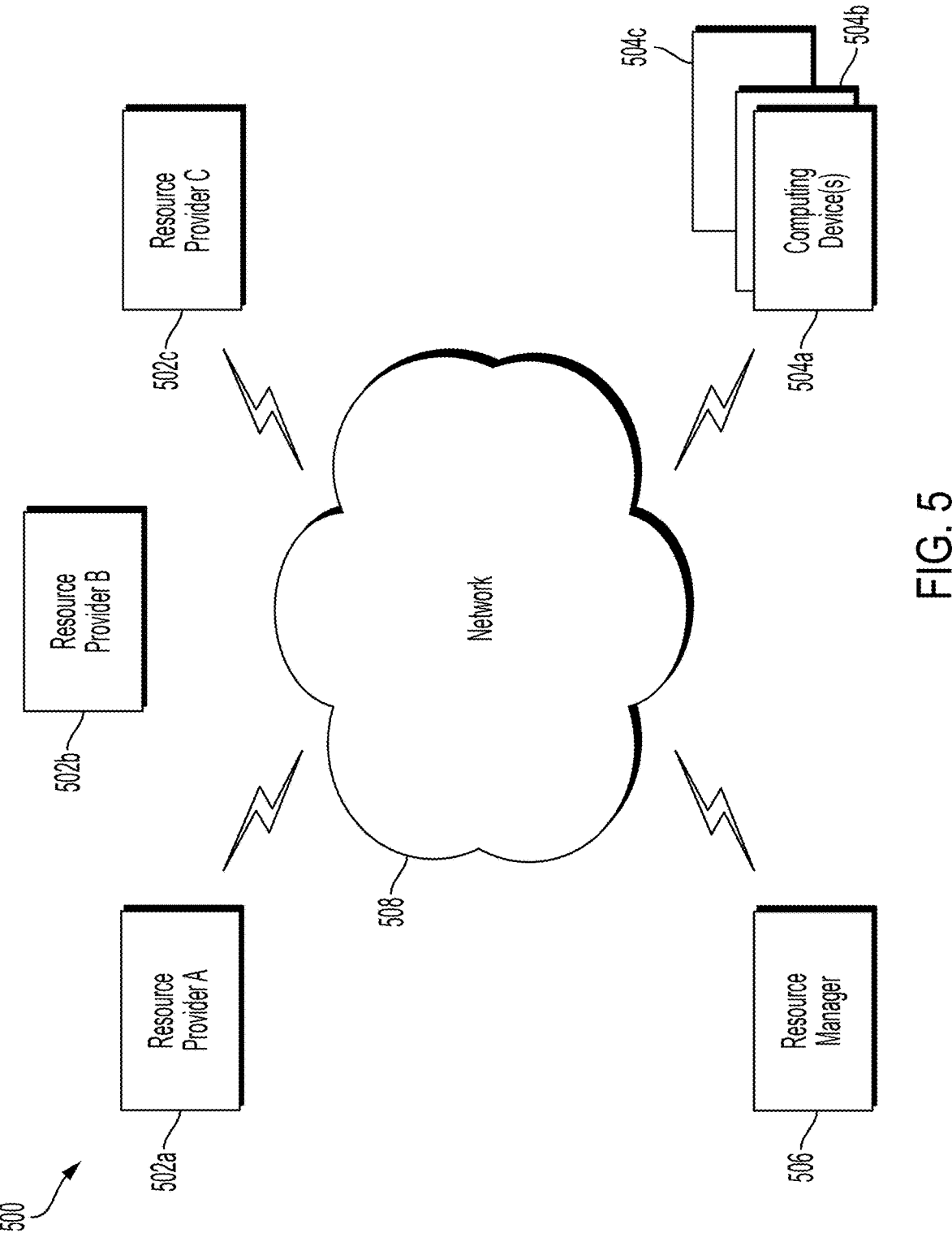
FIG. 5 is a block diagram of an example network environment for use in the methods and systems described herein, according to illustrative embodiments of the present disclosure.

FIG. 5 shows an illustrative network environment 500 for use in the methods and systems described herein. In brief overview, referring now to FIG. 5, a block diagram of an illustrative cloud computing environment 500 is shown and described. The cloud computing environment 500 may include one or more resource providers 502a, 502b, 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, illustrative computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
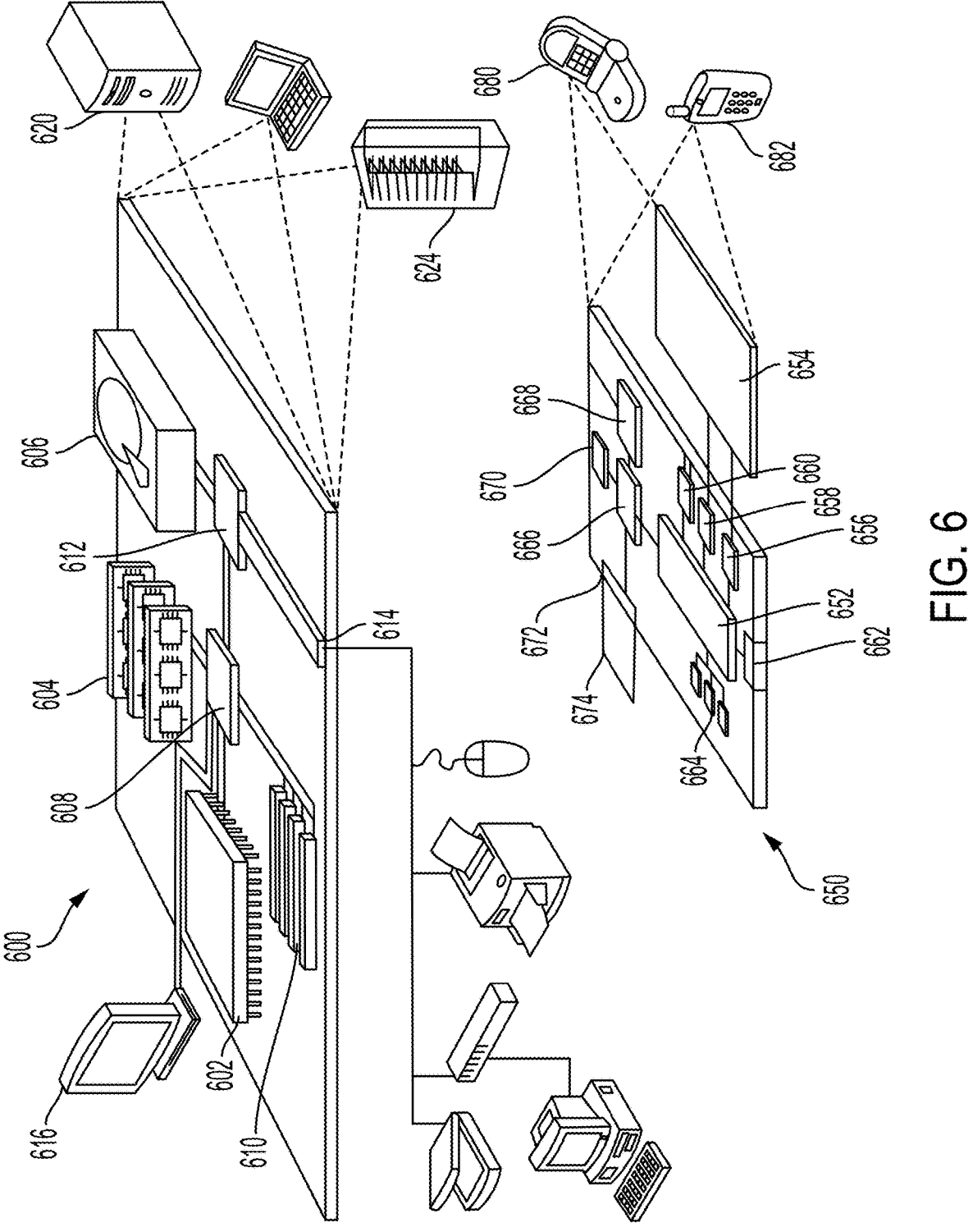
FIG. 6 is a block diagram of an example computing device and an example mobile computing device, for use in illustrative embodiments of the present disclosure.

FIG. 6 shows an example of a computing device 600 and a mobile computing device 650 that can be used in the methods and systems described in this disclosure. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (e.g., one or more processors) of any number of computing devices (e.g., one or more computing devices). "A computing device" may refer to one or more computing devices, for example under common control, e.g., by a single entity. Furthermore, where a function is described as being performed by "a processor", this encompasses embodiments wherein the function is performed by any number of processors (e.g., one or more processors) of any number of computing devices (e.g., one or more computing devices) (e.g., in a distributed computing system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a hard disk device, an optical disk device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Enumerated Embodiments

Without limitation to the foregoing description, the following is an enumerated list of non-limiting exemplary embodiments included in the present disclosure. Those of ordinary skill in the art will appreciate that one or more features discussed above may be included with or incorporated into any of the following numbered embodiments to form additional embodiments.

1. A method of processing a combination selection comprising one or more prediction selections and a fantasy entry selection from a user to determine a payout amount to the user, the method comprising:

receiving, by a processor of a first computing device (e.g., a first server), a combination selection of a user, the combination selection comprising one or more prediction selections corresponding to one or more predictions and a fantasy entry selection corresponding to a fantasy entry;

communicating, by the processor, with a (e.g., externally controlled) second computing device (e.g., an externally controlled second server) such that the user is entered into one or more event contracts corresponding to the one or more predictions via the second computing device;

reserving, by the processor, the fantasy entry; and determining, by the processor, a payout amount (e.g., of money, of currency, of digital coins, of credits) by which to update an account (e.g., wallet) (e.g., an in-app account) of the user based on an outcome of the one or more event contracts and the fantasy entry.

2. The method of embodiment 1, wherein the second computing device is a computing device of a designated contract market (DCM).

3. The method of any one of the preceding embodiments, wherein the first computing device is controlled by a fantasy sports entity (e.g., company or other organization) (e.g., wherein the account is an in-app account controlled or custodied by the fantasy sports entity).

4. The method of any one of the preceding embodiments, wherein the first computing device is not controlled by a designated contract market (DCM).

5. The method of any one of the preceding embodiments, wherein the combination selection is received from a user controlled computing device [e.g., a phone (e.g., smart phone) or computer].

6. The method of any one of the preceding embodiments, wherein the combination selection is received from the user via a graphical user interface (e.g., on an app or website) (e.g., on a user controlled computing device).

7. The method of any one of the preceding embodiments, wherein reserving the fantasy entry comprises freezing one or more current characteristics (e.g., price) of picks of the fantasy entry (e.g., wherein the fantasy entry is graded and/or settled at a subsequent time based on the one or more current characteristics as frozen even if the one or more current characteristics for the selections varied between (i) the reserving and (ii) the grading and/or settlement and/or if the fantasy entry were only made after resolving the one or more predictions).

8. The method of any one of the preceding embodiments, wherein reserving the fantasy entry comprises setting, by the processor, a maximum entry amount limit for the fantasy entry and a minimum entry amount limit for the fantasy entry.

9. The method of any one of the preceding embodiments, comprising creating, by the processor, a fantasy entry slip comprising a maximum entry amount limit and a minimum entry amount limit (e.g., wherein reserving the fantasy entry comprises the creating).

10. The method of embodiment 8 or embodiment 9, wherein the minimum entry amount limit has been predetermined (e.g., is fixed or based on an overall entry amount selection for the combination selection).

11. The method of any one of embodiments 8-10, wherein reserving the fantasy entry comprises updating (e.g., causing a hold to be placed on) [e.g., debiting (e.g., temporarily)] (e.g., and receiving), by the processor, the account of the user by a reservation amount equal to the minimum entry amount limit for the fantasy entry.

12. The method of any one of embodiments 8-11, wherein reserving the fantasy entry comprises updating (e.g., causing a hold to be placed on) [e.g., debiting (e.g., temporarily)] (e.g., and receiving), by the processor, the account of the user by a reservation amount of at least the minimum entry amount limit for the fantasy entry [e.g., and any remainder amount of an overall entry amount selected in the combination selection (e.g., wherein the remainder amount is an amount remaining of an overall entry amount after accounting for any fee amounts (e.g., for entering into the one or more event contracts and/or reserving the fantasy entry), an event contract amount, and the minimum entry amount limit)].

13. The method of embodiment 12, wherein updating by the reservation amount is caused to occur automatically in response to receiving the combination selection.

14. The method of any one of embodiment 8-13, wherein the maximum entry amount limit has been determined based on the one or more predictions and the fantasy entry.

15. The method of any one of embodiments 8-14, comprising determining, by the processor, the maximum entry amount limit based on the one or more predictions and the fantasy entry.

16. The method of any one of embodiments 8-15, wherein an overall entry amount selection has been received for the combination selection and the maximum entry amount limit has been determined based on the overall entry amount selection.

17. The method of any one of embodiments 8-16, wherein an overall entry amount selection has been received for the combination selection and the method comprises determining, by the processor, the maximum entry amount limit based on the overall entry amount selection.

18. The method of any one of embodiments 8-17, wherein an overall entry amount selection has been received for the combination selection, the user can receive a maximum payout amount based on the overall entry amount selection [e.g., that has been predetermined (e.g., set)], and the maximum entry amount limit is an amount that will result in the user receiving the maximum payout amount if the fantasy entry resolves (e.g., settles and/or grades) in favor of the user.

19. The method of any one of embodiments 8-18, wherein the one or more predictions resolve against the user and the method comprises, based on a user setting, automatically updating (e.g., causing a hold to be placed on) [e.g., debiting (e.g., temporarily)] (e.g., and receiving), by the processor, the account of the user by a fantasy entry amount such that the fantasy entry is funded to the maximum entry amount limit.

20. The method of embodiment 19, wherein the fantasy entry amount is equal to the maximum entry amount limit less the minimum entry amount limit.

21. The method of any one of embodiments 8-20, wherein the one or more predictions resolve against the user and the method comprises, based on a user setting, automatically updating (e.g., causing a hold to be placed on) [e.g., debiting (e.g., temporarily)] (e.g., and receiving), by the processor, the account of the user by a fantasy entry amount such that the fantasy entry is funded more than the minimum entry amount limit (e.g., and less than the maximum entry amount limit).

22. The method of any one of embodiments 8-21, wherein at least one of the one or more event contracts have been terminated and/or sold by the user prior to resolving (e.g., settling) the one or more event contracts and the method comprises, based on a user setting, updating (e.g., causing a hold to be placed on) [e.g., debiting (e.g., temporarily)] (e.g., and receiving), by the processor, the account of the user by a fantasy entry amount such that the fantasy entry is funded to the maximum entry amount limit.

23. The method of embodiment 22, wherein the fantasy entry amount is equal to the maximum entry amount limit less any payout amount received from the termination and/or selling of the at least one of the one or more event contracts.

24. The method of any one of the preceding embodiments, comprising determining, by the processor, based on a user setting, that the account of the user does not have a sufficient amount to additionally (e.g., fully) fund the fantasy entry and cancelling the fantasy entry.

25. The method of embodiment 24, wherein the account of the user does not have a sufficient amount to additionally (e.g., fully) fund the fantasy entry due to the one or more predictions resolving against the user (e.g., in favor of a counterparty to the one or more event contracts).

26. The method of any one of embodiments 19-25, wherein the user setting is received in the combination selection.

27. The method of any one of embodiments 19-26, wherein the user setting is specific to the combination selection.

28. The method of any one of embodiments 19-27, wherein the user setting is a (e.g., changeable) default setting for all combination selections for the user.

29. The method of any one of the preceding embodiments, wherein the one or more event contracts are entered into in a manner compliant with regulations for futures contracts in one or more jurisdictions (e.g., in a CFTC-compliant manner).

30. The method of any one of the preceding embodiments, wherein the one or more event contracts are administered (e.g., settled) by a (e.g., the) DCM.

31. The method of any one of the preceding embodiments, wherein communicating with the second computing device comprises causing, by the processor, purchase (e.g., buying) of the one or more event contracts (e.g., via the DCM) for the user.

32. The method of embodiment 31, wherein communicating with the second computing device comprises transmitting a fee amount to the DCM for facilitating the purchasing of the one or more event contracts.

33. The method of any one of the preceding embodiments, wherein communicating with the second computing device comprises transmitting an event contract amount to the DCM for purchasing the one or more event contracts.

34. The method of embodiment 33, wherein an overall entry amount selection has been received for the combination selection, the user can receive a maximum payout amount based on the overall entry amount selection [e.g., that has been predetermined (e.g., set)], and the event contract amount is an amount that will result in the user receiving the maximum payout amount if the one or more predictions and the fantasy entry resolve (e.g., settle and/or grade) in favor of the user.

35. The method of any one of the preceding embodiments, wherein an overall entry amount selection has been received for the combination selection, the user can receive a maximum payout amount based on the overall entry amount selection [e.g., that has been predetermined (e.g., set)], and the one or more event contracts are of a number and amount such that the user will receive the maximum payout amount if the one or more predictions and the fantasy entry resolve (e.g., settle and/or grade) in favor of the user.

36. The method of any one of the preceding embodiments, wherein communicating with the second computing device is performed using an API (e.g., of the DCM).

37. The method of any one of the preceding embodiments, wherein communicating with the second computing device comprises:

in response to receiving the combination selection, receiving, by the processor, from the account of the user a prediction payout amount for the one or more event contracts and, optionally, a fee amount for facilitating (e.g., purchasing of) the one or more event contracts; and transmitting, by the processor, the prediction payout amount and, optionally, the fee amount to the second computing device.

38. The method of any one of the preceding embodiments, comprising receiving, by the processor, a command from the user to terminate and/or sell at least one of the one or more event contracts, wherein communicating with the second computing device comprises causing the termination and/or selling of the at least one of the one or more event contracts.

39. The method of embodiment 40, comprising, receiving, by the processor, from the second computing device a payout amount for the at least one of the one or more event contracts that is based on the termination and/or selling.

40. The method of embodiment 39, comprising updating (e.g., causing a hold to be placed on) [e.g., debiting (e.g., temporarily)] (e.g., and receiving), by the processor, the account of the user by the payout amount.

41. The method of any one of the preceding embodiments, comprising:

automatically updating (e.g., crediting), by the processor, the account of the user by a prediction payout amount for the one or more event contracts upon settlement of the one or more event contracts (e.g., as determined and/or received by communication, by the processor, with the second computing device); and subsequently, automatically updating (e.g., causing a hold to be placed on) [e.g., debiting (e.g., temporarily)] (e.g., and receiving), by the processor, the account of the user to fund the fantasy entry (e.g., to a maximum entry amount limit).

42. The method of embodiment 41, wherein updating the account to fund the fantasy entry comprises updating the account by the prediction payout amount.

43. The method of embodiment 41 or embodiment 42, wherein updating the account to fund the fantasy entry comprises updating the account by an amount of at least the prediction payout amount.

44. The method of any one of the preceding embodiments, receiving, by the processor, a prediction payout amount for the one or more event contracts via the second computing device [e.g., and automatically updating (e.g., crediting), by the processor the account by the prediction payout amount].

45. The method of embodiment 44, comprising settling, by the processor, the fantasy entry, wherein settling the fantasy entry occurs after receiving the prediction payout amount (e.g., automatically upon updating the account by the prediction payout amount).

46. The method of any one of the preceding embodiments, comprising:

receiving, by the processor, a prediction payout amount for the one or more event contracts via the second computing device;

automatically updating (e.g., crediting), by the processor, the account with the prediction payout amount; and subsequently automatically updating (e.g., causing a hold to be placed on) [e.g., debiting (e.g., temporarily)], by the processor, the account by the prediction payout amount in order to fund the fantasy entry.

47. The method of any one of the preceding embodiments, comprising:

receiving, by the processor, a prediction payout amount for the one or more event contracts via the second computing device; and automatically updating (e.g., crediting), by the processor, the account by the prediction payout amount before settling the fantasy entry (e.g., and/or before the fantasy entry is funded).

48. The method of any one of the preceding embodiments, comprising:

receiving, by the processor, from the second computing device a prediction payout amount for the one or more event contracts;

updating (e.g., crediting), by the processor, the account by the prediction payout amount; and subsequently automatically updating, by the processor, the account by the prediction payout amount in order to fund the fantasy entry (e.g., thereby funding the fantasy entry).

49. The method of any one of the preceding embodiments, comprising receiving, by the processor, from the second computing device, a resolution of the one or more predictions.

50. The method of embodiment 49, wherein the resolution is in favor of the user and the method comprises updating (e.g., causing a hold to be placed on) [e.g., debiting (e.g., temporarily)], by the processor, the account of the user with a prediction payout amount corresponding to the one or more predictions [e.g., before funding (e.g., further funding) the fantasy entry].

51. The method of any one of the preceding embodiments, comprising receiving, by the processor, from the second computing device, a prediction payout amount for the one or more event contracts.

52. The method of embodiment 51, comprising updating (e.g., causing a hold to be placed on) [e.g., debiting (e.g., temporarily)], by the processor, the account of the user with the prediction payout amount [e.g., before funding (e.g., further funding) the fantasy entry].

53. The method of any one of the preceding embodiments, comprising resolving (e.g., grading and/or settling), by the processor, the fantasy entry.

54. The method of any one of the preceding embodiments, wherein an overall entry amount selection has been received for the combination selection, the user can receive a maximum payout amount based on the overall entry amount selection [e.g., that has been predetermined (e.g., set)], the one or more predictions and the fantasy entry have been resolved (e.g., settled and/or graded) in favor of the user, and determining the payout amount comprises determining that the payout amount is equal to the maximum payout amount.

55. The method of any one of the preceding embodiments, wherein the one or more predictions (e.g., the one or more event contracts) have been resolved (e.g., settled) in favor of the user, the fantasy entry has been resolved (e.g., settled and/or graded) against the user and determining the payout amount comprises determining that the payout amount is zero.

56. The method of any one of the preceding embodiments, wherein the fantasy entry has been resolved (e.g., settled and/or graded) against the user (e.g., whether or not the one or more predictions resolve for or against the user) and determining the payout amount comprises determining that the payout amount is zero.

57. The method of any one of the preceding embodiments, wherein an overall entry amount selection has been received for the combination selection, the user can receive a maximum payout amount based on the overall entry amount selection [e.g., that has been predetermined (e.g., set)], the fantasy entry has been funded by an amount less than an amount to receive the maximum payout amount, the fantasy entry resolved (e.g., settled and/or graded) in favor of user (e.g., whether or not the one or more predictions has been resolved for or against the user), and determining the payout amount comprises determining that the payout amount is between zero and the maximum payout amount.

58. The method of any one of the preceding embodiments, wherein the fantasy entry has been funded in an amount less than a maximum entry amount limit and at least a minimum entry amount limit, and determining the payout amount comprises determining that the payout amount is between zero and a maximum payout amount for the combination selection.

59. The method of any one of the preceding embodiments, wherein the fantasy entry has a minimum entry amount limit, the fantasy entry resolved (e.g., settled and/or graded) in favor of the user and the one or more predictions resolved (e.g., settled) against the user, and determining the payout amount comprises determining that the payout amount is based on the minimum entry amount limit.

60. The method of any one of the preceding embodiments, wherein reserving the fantasy entry comprises updating (e.g., causing a hold to be placed on) [e.g., debiting (e.g., temporarily)], by the processor, a reservation amount from the account of the user.

61. The method of any one of the preceding embodiments, wherein the fantasy entry is funded at least in part by a prediction payout amount for the one or more event contracts.

62. The method of any one of the preceding embodiment, wherein the fantasy entry is funded at least in part by the account.

63. The method of any one of embodiments 1-61, wherein the fantasy entry is funded only by proceeds to the user from the one or more event contracts.

64. The method of any one of embodiments 1-61, wherein the one or more event contracts are resolved (e.g., settled) in favor of a counterparty to the user and the fantasy entry is funded only by the account.

65. The method of any one of embodiments 1-61, wherein the one or more predictions are resolved in favor of a counterparty to the user and the fantasy entry is funded only by the account.

66. The method of any one of the preceding embodiments, wherein the account always has a non-negative balance.

67. The method of any one of the preceding embodiments, wherein an overall entry amount selection has been received for the combination selection for an overall entry amount to be funded from the account of the user.

68. The method of any one of the preceding embodiments, wherein an overall entry amount selection has been received for the combination selection and the method comprises updating (e.g., causing a hold to be placed on) [e.g., debiting (e.g., temporarily)], by the processor, the account of the user by an overall entry amount corresponding to the overall entry amount selection upon receiving the combination selection.

69. The method of any one of the preceding embodiments, wherein an overall entry amount selection has been received for the combination selection and the method comprises receiving, by the processor, an overall entry amount corresponding to the overall entry amount selection from the account of the user.

70. The method of any one of the preceding embodiments, comprising locking, by the processor, the fantasy entry (e.g., by locking a fantasy entry slip thereby prohibiting any further changes).

71. The method of embodiment 70, wherein the locking of the fantasy entry occurs automatically upon an earliest initiation of any event corresponding to picks in the fantasy entry.

72. The method of embodiment 70 or embodiment 71, wherein the locking of the fantasy entry occurs automatically upon a temporally first pick in the fantasy entry going live.

73. The method of any one of the preceding embodiments, wherein the fantasy entry becomes uncancellable automatically upon an earliest initiation of any event corresponding to picks in the fantasy entry.

74. The method of any one of the preceding embodiments, wherein the fantasy entry becomes uncancellable automatically upon a temporally first pick in the fantasy entry going live.

75. The method of any one of the preceding embodiments, comprising:

receiving, by the processor, a fantasy entry cancellation request from the user (e.g., prior to an earliest initiation of any event corresponding to picks in the fantasy entry) (e.g., prior to a temporally first pick in the fantasy entry going live); and cancelling, by the processor, the fantasy entry, wherein determining the amount comprises assigning, by the processor, no value for the fantasy entry (e.g., and a reservation amount for the fantasy entry is forfeited).

76. The method of any one of the preceding embodiments, wherein the fantasy entry is cancelled when proceeds to the user from an outcome of the one or more event contracts are less than an amount to fund the fantasy entry (e.g., based on user input received) (e.g., automatically and unavoidably).

77. The method of any one of the preceding embodiments, wherein the communicating and the reserving occur in parallel (e.g., simultaneously).

78. The method of any one of the preceding embodiments, wherein the communicating and the reserving both occur automatically by the processor upon receiving the combination selection.

79. The method of any one of the preceding embodiments, wherein the communicating and the reserving are both automatically initiated by the processor upon receiving the combination selection.

80. The method of any one of the preceding embodiments, comprising settling, by the processor, the fantasy entry after the one or more predictions have been resolved.

81. The method of embodiment 80, wherein the fantasy entry has been graded before the one or more predictions have been resolved.

82. The method of any one of the preceding embodiments, comprising settling, by the processor, the fantasy entry after the one or more event contracts have been settled.

83. The method of embodiment 82, wherein the fantasy entry has been graded before the one or more event contracts have been settled.

84. The method of any one of the preceding embodiments, comprising:

receiving, by the processor, from the second computing device, a resolution of the one or more predictions; and subsequently, settling, by the processor, the fantasy entry.

85. The method of any one of the preceding embodiments, comprising settling, by the processor, the fantasy entry after the one or more event contracts have been settled.

86. The method of any one of the preceding embodiments, comprising:

receiving, by the processor, from the second computing device, a prediction payout amount for the one or more event contracts; and subsequently, settling, by the processor, the fantasy entry.

87. The method of any one of the preceding embodiments, comprising updating (e.g., crediting), by the processor, the account of the user based on the outcome of the one or more event contracts and the fantasy entry.

88. The method of any one of the preceding embodiments, comprising updating (e.g., crediting), by the processor, the account based on the payout amount.

89. The method of any one of the preceding embodiments, comprising receiving, by the processor, from the second computing device, a prediction payout amount for the one or more event contracts as a result of the one or more event contracts resolving (e.g., settling) in favor of the user.

90. The method of any one of the preceding embodiments, comprising creating, by the processor, a prediction slip for the one or more prediction selections and a fantasy entry slip for the fantasy entry selection.

91. The method of embodiment 90, wherein the prediction slip and the fantasy entry slip are separate data structures.

92. The method of embodiment 90 or embodiment 91, wherein reserving the fantasy entry comprises creating the fantasy entry slip.

93. The method of any one of embodiments 90-92, wherein the fantasy entry slip comprises a maximum entry amount limit and a minimum entry amount limit.

94. The method of any one of embodiments 90-93, wherein the fantasy entry slip comprises data (e.g., a variable) indicative of a current funding amount (e.g., an absolute or relative amount, e.g., relative to a maximum entry amount limit) for the fantasy entry.

95. The method of any one of embodiments 90-94, comprising automatically updating, by the processor, the fantasy entry slip to fund (e.g., fully fund) the fantasy entry upon settlement of the one or more event contracts based on communication, by the processor, with the second computing device (e.g., based on receiving a prediction payout amount from the second computing device as proceeds for the one or more event contracts).

96. The method of any one of embodiments 90-95, wherein the prediction slip is processed independently of the fantasy entry slip.

97. The method of any one of embodiments 90-96, wherein no data related to the one or more predictions is present in the fantasy entry slip.

98. The method of any one of embodiments 90-97, wherein the prediction slip is processed before the fantasy entry slip.

99. The method of any one of the preceding embodiments, wherein the fantasy entry comprises two picks corresponding to different athletes on different teams.

100. The method of any one of the preceding embodiments, wherein the fantasy entry comprises two or more fantasy picks (e.g., three, four, five, six, seven, or eight fantasy picks) [e.g., wherein the fantasy entry is for a (e.g., full) fantasy roster].

101. The method of any one of the preceding embodiments, comprising automatically validating, by the processor, the fantasy entry after receiving the combination selection and prior to reserving the fantasy entry (e.g., and prior to communicating with the second computing device).

102. The method of embodiment 101, wherein the validating comprises checking the fantasy entry for a number of players, a number of teams, duplicate projections (e.g., taking a main and alt line for a same appearance), a number of picks per appearance, one or more fee characteristics, one or more pool characteristics, or a combination thereof.

103. The method of any one of the preceding embodiments, wherein the method is compliant with regulations for futures contracts in one or more jurisdictions (e.g., in a CFTC-compliant manner).

104. A method of processing a combination selection comprising one or more prediction selections and a fantasy entry selection from a user to determine a payout amount to the user, the method comprising:

receiving a combination selection of a user, the combination selection comprising one or more prediction selections corresponding to one or more predictions and a fantasy entry selection corresponding to a fantasy entry;

communicating with a third party (e.g., a designated contract market (DCM)) such that the third party enters the user into one or more event contracts corresponding to the one or more predictions;

reserving the fantasy entry; and determining a payout amount by which to update an account of the user based on an outcome of the one or more event contracts and the fantasy entry.

105. The method of embodiment 104, wherein the fantasy entry is reserved before the one or more predictions are resolved and/or before the one or more event contracts settle.

106. The method of embodiment 104 or embodiment 105, wherein the fantasy entry is resolved (e.g., graded and/or settled) after the one or more event contracts settle.

107. The method of any one of embodiments 104-106, wherein the fantasy entry is graded before the one or more event contracts settle.

108. The method of any one of embodiments 104-107, comprising grading the fantasy entry before the one or more event contracts settle.

109. The method of any one of embodiments 104-108, wherein the fantasy entry is settled after the one or more event contracts settle.

110. The method of any one of embodiments 104-109, comprising settling the fantasy entry after the one or more event contracts settle.

111. The method of any one of embodiments 104-110, comprising funding the fantasy entry with a prediction payout amount received from the third party for the one or more event contracts.

112. The method of embodiment 111, wherein funding the fantasy entry comprises updating the account with the prediction payout amount from the third party and subsequently automatically updating the account by the prediction payout amount (e.g., withdrawing the prediction payout amount).

113. The method of any one of embodiments 104-112, comprising receiving a prediction payout amount for the one or more event contracts from the third party and updating the account with the prediction payout amount before settling the fantasy entry.

114. The method of any one of embodiments 104-113, comprising:

receiving from the third party a prediction payout amount for the one or more event contracts;

updating (e.g., crediting) the account by the prediction payout amount; and subsequently automatically updating (e.g., placing a hold on) [e.g., debiting (e.g., temporarily)], the account by the prediction payout amount (e.g., subsequently automatically withdrawing the prediction payout amount from the account) in order to fund the fantasy entry (e.g., thereby funding the fantasy entry).

115. A method of processing a combination selection comprising one or more prediction selections and a fantasy entry selection from a user to determine a payout amount to the user, the method comprising:

receiving a combination selection of a user, the combination selection comprising one or more prediction selections corresponding to one or more predictions and a fantasy entry selection corresponding to a fantasy entry; and processing the combination selection to determine a payout amount for the user, wherein processing the combination selection comprises separately processing a portion of the combination selection corresponding to the one or more predictions and a portion of the combination selection corresponding to the fantasy entry.

116. The method of embodiment 115, comprising:

determining a prediction payout amount corresponding to the one or more predictions and updating an account of the user with the prediction payout amount; and subsequently, determining a fantasy entry payout amount corresponding to the fantasy entry and updating the account of the user with the fantasy entry payout amount.

117. The method of 115 or 116, wherein processing the portion of the combination selection corresponding to the one or more predictions comprises entering into one or more event contracts via a third party (e.g., a designated contract market (DCM)) [e.g., wherein the one or more event contracts are entered into in a manner compliant with regulations for futures contracts in one or more jurisdictions (e.g., in a CFTC-compliant manner)].

118. The method of embodiment 117, wherein the one or more event contracts are processed by the third party.

119. The method of any one of embodiments 115-118, wherein processing the portion of the combination selection corresponding to the fantasy entry comprises funding the fantasy entry at least partially with a payout amount corresponding to the one or more predictions.

120. The method of any one of embodiments 115-119, wherein the payout amount is determined based on a combined outcome of the one or more predictions and the fantasy entry.

121. The method of any one of embodiments 104-120, comprising updating an account of the user with the payout amount.

122. The method of any one of embodiments 104-120, wherein the method is compliant with regulations for futures contracts in one or more jurisdictions (e.g., in a CFTC-compliant manner).

123. A method of processing a combination selection comprising one or more prediction selections and a sweepstakes fantasy entry selection from a user to determine a payout amount to the user, the method comprising:

receiving, by a processor of a first computing device (e.g., a first server), a combination selection of a user, the combination selection comprising one or more prediction selections corresponding to one or more predictions and a sweepstakes fantasy entry selection corresponding to a sweepstakes fantasy entry [e.g., a valid sweepstakes fantasy entry, e.g., valid in one or more jurisdictions (e.g., a jurisdiction of the user and/or a jurisdiction of the first computing device)];

communicating, by the processor, with an externally controlled second computing device (e.g., an externally controlled second server) such that the user is entered into one or more event contracts corresponding to the one or more predictions via the second computing device;

reserving, by the processor, the sweepstakes fantasy entry; and determining, by the processor, a payout amount (e.g., of money, of currency, of digital coins, of credits) by which to update an account (e.g., wallet) of the user based on an outcome of the one or more event contracts and the sweepstakes fantasy entry.

124. The method of embodiment 123, wherein the payout amount is an amount in a fantasy-entity-specific denominated amount [e.g., of credits or digital coins specific to a fantasy sports entity (e.g., company or organization)].

125. The method of embodiment 123 or embodiment 124, wherein the payout amount is an amount of credits or digital coins specific to a fantasy sports entity (e.g., company or organization).

126. The method of any one of embodiments 123-125, wherein the one or more event contracts settle in a non-fantasy-entity-specific denominated amount (e.g., of a currency).

127. The method of any one of embodiments 123-126, comprising, upon settling of the one or more event contracts:

receiving, by the processor, a prediction payout amount for the one or more event contracts via the seconding computing device;

updating, by the processor, an account (e.g., the account for the payout amount or a different account) of the user by the prediction payout amount; and automatically purchasing, by the processor, an amount, wherein the amount is fantasy-sports-entity-specific denominated [e.g., is an amount of credits or digital coins specific to a fantasy sports entity (e.g., company or other organization)].

128. The method of embodiment 127, wherein the sweepstakes fantasy is funded in the fantasy-entity-specific denominated amount.

129. The method of embodiment 127 or embodiment 128, wherein the prediction payout amount is a non-fantasy-sports-entity-specific denominated amount (e.g., of a currency).

130. The method of any one of embodiments 127-129, comprising funding the sweepstakes fantasy entry using the fantasy-sports-entity-specific denominated amount.

131. A method of facilitating a user making a combination selection comprising one or more prediction selections and a fantasy entry selection and receiving a payout amount for the combination selection, the method comprising:

providing, by a processor of a computing device (e.g., a user phone or a user-accessible website), a combination selection selected (e.g., via a graphical user interface) by a user, the combination selection comprising one or more prediction selections corresponding to one or more predictions and a fantasy entry selection corresponding to a fantasy entry; and receiving, by the processor, an indication (e.g., data) (e.g., notification) of a payout amount (e.g., of money, of currency, of digital coins, of credits) for the user corresponding to a combined outcome of the one or more predictions and the fantasy entry [e.g., by which an account (e.g., wallet) of the user will be updated].

132. The method of embodiment 131, comprising transmitting, by the processor, the combination selection to a second computing device (e.g., a second server).

133. The method of embodiment 131 or embodiment 132, comprising initiating, by the processor, a transfer of a transfer amount corresponding to the payout amount to a user controlled second account [e.g., to a bank account, a crypto account, or an investment (e.g., brokerage) account].

134. The method of embodiment 133, wherein the account is a first account for an app by which the user makes the combination selection.

135. The method of embodiment 133 or embodiment 134, wherein the second account is a bank account, a crypto account, or an investment (e.g., brokerage) account.

136. The method of any one of embodiments 133-135, wherein the transfer amount is denominated in a currency (e.g., a fiat currency or a cryptocurrency).

137. The method of any one of embodiments 131-136, comprising providing, by the processor, (e.g., with the combination selection) [e.g., to the second computing device (e.g., that is controlled by a fantasy sports entity (e.g., company)] a user setting indicative of a user desire that, if the one or more predictions resolve against the user, the fantasy entry will be funded to a maximum entry amount limit for the fantasy entry [e.g., that the account of the user will be automatically updated (e.g., causing a hold to be placed on) [e.g., debiting (e.g., temporarily)] (e.g., and receiving), by a processor, by a fantasy entry amount such that the fantasy entry is funded to a maximum entry amount limit].

138. The method of any one of embodiments 131-137, comprising providing, by the processor, (e.g., with the combination selection) [e.g., to the second computing device (e.g., that is controlled by a fantasy sports entity (e.g., company)] a user setting indicative of a user desire that, if the one or more predictions resolve against the user, the fantasy entry will be funded more than a minimum entry amount limit for the fantasy entry [e.g., that the account of the user will be automatically updated (e.g., causing a hold to be placed on) [e.g., debiting (e.g., temporarily)] (e.g., and receiving), by a processor, by a fantasy entry amount such that the fantasy entry is funded more than a minimum entry amount limit].

139. The method of any one of embodiments 131-138, wherein at least one of the one or more event contracts have been terminated and/or sold by the user prior to resolving (e.g., settling) the one or more event contracts and the method comprises providing, by the processor, (e.g., with the combination selection) [e.g., to the second computing device (e.g., that is controlled by a fantasy sports entity (e.g., company)] a user setting indicative of a user desire that, accordingly, the fantasy entry will be funded to a maximum entry amount limit for the fantasy entry [e.g., that the account of the user will be automatically updated (e.g., causing a hold to be placed on) [e.g., debiting (e.g., temporarily)] (e.g., and receiving), by a processor, by a fantasy entry amount such that the fantasy entry is funded to a maximum entry amount limit].

140. The method of embodiment 139, wherein the fantasy entry is funded by an amount is equal to the maximum entry amount limit less any payout amount received from the termination and/or selling of the at least one of the one or more event contracts.

141. The method of any one of 137-140, comprising providing, by the processor, a user setting such that if the account of the user does not have a sufficient amount to additionally (e.g., fully) fund the fantasy entry, the fantasy entry is automatically cancelled.

142. The method of embodiment 141, wherein the account of the user does not have a sufficient amount to additionally (e.g., fully) fund the fantasy entry due to the one or more predictions resolving against the user (e.g., in favor of a counterparty to the one or more event contracts).

143. The method of any one of embodiments 137-142, wherein the user setting is provided in the combination selection.

144. The method of any one of embodiments 137-143, wherein the user setting is specific to the combination selection.

145. The method of any one of embodiments 137-143, wherein the user setting is a (e.g., changeable) default setting for all combination selections for the user.

146. The method of any one of embodiments 131-145, comprising providing, by the processor, a fantasy entry cancellation request from the user (e.g., prior to an earliest initiation of any event corresponding to picks in the fantasy entry) (e.g., prior to a temporally first pick in the fantasy entry going live), wherein the payout amount is based on the cancellation of the fantasy entry.

147. The method of any one of embodiments 131-146, comprising:

providing, by the processor, a fantasy entry cancellation request from the user; and receiving, by the processor, in response, an indication (e.g., data) (e.g., notification) that the fantasy entry has become uncancellable.

148. The method of any one of embodiments 131-147, comprising receiving, by the processor, an indication (e.g., data) (e.g., notification) that the fantasy entry has become uncancellable.

149. The method of embodiment 147 or embodiment 148, wherein the fantasy entry has become uncancellable automatically upon an earliest initiation of any event corresponding to picks in the fantasy entry.

150. The method of any one of embodiments 147-149, wherein the fantasy entry has become uncancellable automatically upon a temporally first pick in the fantasy entry going live.

151. The method of any one of embodiments 131-150, wherein the payout amount has been determined using a method according to any one of embodiments 1-103.

152. A method of facilitating making a combination selection comprising one or more prediction selections and a fantasy entry selection by a user using a graphical user interface, the method comprising:

> providing (e.g., rendering and displaying), by a processor of a computing device [e.g., a user phone (e.g., smart phone) or computer (e.g., via a website)], via a graphical user interface, selection widgets (e.g., buttons) (e.g., selectable icons) corresponding to a set of possible picks, wherein the set comprises one or more predictions and one or more fantasy picks; and > receiving, by the processor, from a user, via the graphical user interface (e.g., via the selection widgets of the graphical user interface), a combination selection comprising one or more prediction selections corresponding to one or more predictions and a fantasy entry selection corresponding to a fantasy entry comprising (e.g., of) a plurality of fantasy picks, wherein the one or more prediction selections and/or the fantasy entry selection comprises one or more selections corresponding to the set of possible picks.

153. The method of embodiment 152, wherein the set of possible picks correspond to a common one sports team or two sports teams [e.g., that are to next play each other (e.g., before playing any other team)] (e.g., correspond to athletes on the team(s)).

154. The method of embodiment 152 or embodiment 153, wherein the set of possible picks correspond to a common single sports game or event (e.g., tournament) (e.g., correspond to athletes on the team(s) playing in the game).

155. The method of any one of embodiments 152-154, comprising providing (e.g., rendering and displaying), by the processor, via the graphical user interface, second selection widgets (e.g., buttons) (e.g., selectable icons) corresponding to a second set of possible picks different from the set of possible picks, wherein the second set comprises one or more predictions and one or more fantasy picks.

156. The method of embodiment 155, wherein the second set of possible picks correspond to a common one sports team or two sports teams [e.g., that are to next play each other (e.g., before playing any other team)] (e.g., correspond to athletes on the team(s)) different from the common one sports team or two sports teams for the set of possible picks.

157. The method of embodiment 155 or embodiment 156, wherein the second set of possible picks correspond to a common single sports game or event (e.g., tournament) (e.g., correspond to athletes on the team(s) playing in the game) different from the common single sports game or event (e.g., tournament) for the set of possible picks.

158. The method of any one of embodiments 155-157, wherein the combination selection comprises one or more selections corresponding to the second set of possible picks.

159. The method of any one of embodiments 155-158, wherein the one or more prediction selections and/or the fantasy entry selection comprises one or more selections corresponding to the second set of possible picks.

160. The method of any one of embodiments 152-159, comprising transmitting, by the processor, the combination selection to a second computing device [e.g., controlled by a fantasy sports entity (e.g., company or organization)].

161. The method of any one of embodiments 152-160, comprising providing (e.g., rendering and displaying), by the processor, via the graphical user interface, one or more user setting widgets (e.g., button(s)) (e.g., selectable icon(s)) for selecting one or more user settings applicable to the combination selection.

162. The method of any one of embodiments 152-161, comprising transmitting, by the processor, a user setting selection corresponding to a funding rule for the fantasy entry (e.g., to additionally fund the fantasy entry depending on an outcome of one or more predictions corresponding to the one or more prediction selections) (e.g., to additionally fund the fantasy entry depending on an outcome of one or more predictions corresponding to the one or more prediction selections).

163. The method of any one of embodiments 152-160, comprising transmitting, by the processor, a user setting selection corresponding to a rule to conditionally cancel the fantasy entry.

164. The method of embodiment 162 or embodiment 163, comprising receiving, by the processor, via the graphical user interface (e.g., via the one or more user setting widgets of the graphical user interface), a selection of the user setting.

165. The method of any one of embodiments 162-164, wherein the user setting selection is transmitted in the combination selection.

166. The method of any one of embodiments 162-165, wherein the user setting selection is specific to the combination selection.

167. The method of any one of embodiments 162-166, wherein the user setting selection is a (e.g., changeable) default setting for all combination selections for the user.

168. The method of any one of embodiments 152-167, comprising providing (e.g., rendering and displaying), by the processor, via the graphical user interface, an overall entry amount selection widget for inputting an overall entry amount selection corresponding to the combination selection.

169. The method of embodiment 168, comprising receiving, via the graphical user interface (e.g., via the overall entry amount selection widget of the graphical user interface), the overall entry amount selection.

170. The method of embodiment 168 or embodiment 169, comprising transmitting, by the processor, (e.g., to the fantasy sports entity controlled computing device) the overall entry amount selection in the combination selection.

171. The method of any one of embodiments 152-170, comprising providing (e.g., rendering and displaying), by the processor, indication of a payout amount for the combination selection based on a current overall entry amount selection (e.g., currently input via the overall entry amount selection widget) (e.g., that has been input via the overall entry amount selection widget).

172. The method of embodiment 171, comprising determining (e.g., calculating), by the processor, the payout amount.

173. The method of any one of embodiments 152-172, comprising providing (e.g., rendering and displaying), by the processor, via the graphical user interface, a summary of selections received via selection widgets (e.g., and an overall entry amount selected via an overall entry amount selection widget) and a submission widget (e.g., button) (e.g., selectable icon) that submits the combination selection when selected.

174. The method of embodiment 173, wherein the submission widget is disabled if a set of fantasy entry selections cannot be used to form a fantasy entry (e.g., only includes players from a single team).

175. The method according to any one of embodiments 152-174, comprising determining, by the processor, whether the fantasy entry is valid.

176. The method according to any one of embodiments 152-175, wherein selecting the submission widget causes automatic transmission, by the processor, of the combination selection (e.g., to a computing device controlled by a fantasy sports entity).

177. A method of facilitating a user combination selection comprising one or more prediction selections and a fantasy entry selection, the method comprising:

> providing (e.g., rendering and displaying), by a processor of a computing device [e.g., a user phone (e.g., smart phone) or computer (e.g., via a website)], via a graphical user interface, selection widgets (e.g., buttons) (e.g., selectable icons) corresponding to a set of possible picks, wherein the set comprises one or more predictions and one or more fantasy picks.

178. The method of embodiment 177, comprising receiving, by the processor, from a user, via the graphical user interface (e.g., via the selection widgets of the graphical user interface), a selection comprising (i) one or more prediction selections corresponding to one or more predictions from to the set of possible picks or (ii) a fantasy entry selection corresponding to a fantasy entry comprising (e.g., of) a plurality of fantasy picks from the set of possible picks.

179. The method of embodiment 178, comprising receiving, by the processor, from a user, via the graphical user interface (e.g., via the selection widgets of the graphical user interface), a selection comprising (i) one or more prediction selections corresponding to one or more predictions from to the set of possible picks and (ii) a fantasy entry selection corresponding to a fantasy entry comprising (e.g., of) a plurality of fantasy picks from the set of possible picks.

180. The method of embodiment 178, comprising receiving, by the processor, from a user, via the graphical user interface, a combination selection comprising at least one prediction selection corresponding to at least prediction and at least one fantasy entry selection corresponding to a fantasy entry.

181. The method of any one of embodiments 152-180, wherein the method is compliant with regulations for futures contracts in one or more jurisdictions (e.g., in a CFTC-compliant manner).

182. The method of any one of embodiments 152-181, wherein ones of the selection widgets for one or more predictions picks and one or more fantasy picks of the set of possible picks are provided via the graphical user interface together.

183. The method of any one of embodiments 152-182, wherein ones of the selection widgets for one or more predictions picks and one or more fantasy picks of the set of possible picks are provided via the graphical user interface at a same time.

184. The method of any one of embodiments 152-183, wherein ones of the selection widgets for one or more predictions picks and one or more fantasy picks of the set of possible picks are provided via the graphical user interface at a same time such that a user can view the ones of the selections widgets simultaneously.

185. The method of any one of embodiments 152-184, wherein ones of the selection widgets for one or more predictions picks and one or more fantasy picks of the set of possible picks are provided via the graphical user interface together such that a user can view the ones of the selections widgets simultaneously.

186. One or more non-transitory computer readable media comprising instructions stored thereon, wherein the instructions, when executed by a processor, cause the processor to perform operations comprising a method according to any one of the preceding embodiments.

187. A system comprising:

> a processor of a computing device; and
> a memory having instructions stored thereon, wherein the instructions, when executed by the processor, cause the processor to perform operations comprising a method according to any one of the preceding embodiments.

188. A system comprising:

> one or more user computing devices for making combination selections, the combination selections each comprising one or more respective prediction selections for one or more respective predictions and a respective fantasy entry selection for a respective fantasy entry; and
> a (e.g., fantasy sports entity) first computing device (e.g., server) for:
>> (i) receiving the combination selections from the one or more user computing devices,
>> (ii) communicating with a second (e.g., externally controlled) computing device to process one or more respective event contracts for the one or more respective predictions via the second computing device; and
>> (iii) processing the respective fantasy entry.

189. A system comprising:

> a graphical user interface (e.g., in an app) stored in a memory of each of one or more user computing devices for making combination selections, the combination selections each comprising one or more respective prediction selections for one or more respective predictions and a respective fantasy entry selection for a respective fantasy entry; and
> a first (e.g., fantasy sports entity) computing device (e.g., server) for:
>> (i) receiving the combination selections from the one or more user computing devices,
>> (ii) communicating with a second (e.g., externally controlled) computing device to process one or more respective event contracts for the one or more respective predictions; and
>> (iii) processing the respective fantasy entry.

190. The system of embodiment 188 or embodiment 189, wherein the processing comprises entering into (e.g., purchasing), selling, settling, or a combination thereof the one or more respective event contracts.

191. The system of any one of embodiments 188-190, wherein the first (e.g., fantasy sports entity) computing device does not process event contracts.

192. The system of any one of embodiments 188-191, wherein the externally controlled computing device is controlled by a designated contract market (DCM).

193. The system of any one of embodiments 188-192, wherein, for each combination selection of the combination selections, the first (e.g., fantasy sports entity) computing device is operable to update an account of a respective user who made the combination selection based on an outcome of the respective one or more predictions and the respective fantasy entry for the combination selection.

194. The system of any one of embodiments 188-193, wherein processing the respective fantasy entry comprises reserving the respective fantasy entry.

195. The system of embodiment 194, wherein the system is operable to reserve the respective fantasy entry before the one or more respective predictions are resolved and/or before the one or more respective event contracts settle.

196. The system of any one of embodiments 188-195, wherein the system is operable to resolve (e.g., grade and/or settle) the respective fantasy entry after the one or more respective event contracts settle.

197. The system of any one of embodiments 188-196, wherein the respective fantasy entry is graded before the one or more respective event contracts settle.

198. The system of any one of embodiments 188-197, wherein the system is operable to grade the respective fantasy entry before the one or more respective event contracts settle.

199. The system of any one of embodiments 188-198, wherein the respective fantasy entry is settled after the one or more respective event contracts settle.

200. The system of any one of embodiments 188-199, wherein the system is operable to settle the respective fantasy entry after the one or more respective event contracts settle.

201. The system of any one of embodiments 188-200, wherein the system is operable to fund the respective fantasy entry with a prediction payout amount received from the second computing device for the one or more respective event contracts.

202. The system of embodiment 201, wherein funding the respective fantasy entry comprises updating the account with the prediction payout amount from the second computing device and subsequently automatically updating the account by the prediction payout amount (e.g., withdrawing the prediction payout amount).

203. The system of any one of embodiments 188-202, wherein the system is operable to receive a prediction payout amount for the one or more respective event contracts from the second computing device and update the account with the prediction payout amount before settling the respective fantasy entry.

204. The system of any one of embodiments 188-203, wherein the system is operable to:
  receive from the second computing device a prediction payout amount for the one or more respective event contracts;
  update (e.g., credit) the account by the prediction payout amount; and
  subsequently automatically update (e.g., place a hold on) [e.g., debit (e.g., temporarily)] the account by the prediction payout amount (e.g., subsequently automatically withdraw the prediction payout amount from the account) in order to fund the respective fantasy entry (e.g., thereby funding the respective fantasy entry).

205. The system of any one of embodiments 187-204, wherein the system is compliant with regulations for futures contracts for one or more jurisdictions (e.g., is CFTC-compliant).

206. The system of any one of embodiments 188-205, wherein the one or more user computing devices, the first (e.g., fantasy sports entity) computing device, and the second (e.g., externally controlled) computing device are communicatively coupled to perform a method according to any one of embodiments 1-103.

207. A system comprising:
  a user computing devices for providing combination selections of a user, each of the combination selections corresponding to one or more predictions and a fantasy entry; and
  a first computing device for receiving the combination selections and, for each of the combination selections, processing the combination selection to determine a payout amount for the user, wherein processing the combination selection comprises separately processing a portion of the combination selection corresponding to the one or more predictions and a portion of the combination selection corresponding to the fantasy entry.

208. The system of embodiment 208, wherein separately processing the portion of the combination selection corresponding to the fantasy entry comprises reserving the fantasy entry.

209. The system of embodiment 209, wherein reserving the fantasy entry comprises updating an account of the user.

210. The system of any one of embodiments 207-209, wherein processing the portion of the combination selection corresponding to the one or more predictions comprises communicating with an externally controlled second computing device using the first computing device.

211. The system of embodiment 210, wherein the externally controlled second computing device is controlled by a designated contract market (DCM).

212. The system of any one of embodiments 207-211, wherein processing the portion of the combination selection corresponding to the one or more predictions comprises communicating with a third party via the first computing device.

213. The system of embodiment 212, wherein the third party is a DCM.

214. The system of any one of embodiments 207-214, wherein processing the combination selections comprises, for each of the combination selections:
  determining a prediction payout amount corresponding to the one or more predictions and updating an account of the user with the prediction payout amount; and
  subsequently, determining a fantasy entry payout amount corresponding to the fantasy entry and updating the account of the user with the fantasy entry payout amount.

215. The system of embodiment 214, wherein the fantasy entry payout amount is based on the prediction payout amount.

216. The system of any one of embodiments 207-215, wherein processing the portion of the combination selection corresponding to the one or more predictions comprises entering into one or more event contracts via a third party.

217. The system of embodiment 216, wherein the third party is a designated contract market (DCM).

218. The system of embodiment 216 or embodiment 217, wherein the one or more event contracts are entered into in a manner compliant with regulations for futures contracts in one or more jurisdictions (e.g., in a CFTC-compliant manner)].

65

219. The system of any one of embodiments 216-218, wherein the one or more event contracts are processed by the third party.

220. The system of any one of embodiments 216-219, wherein the processing of the one or more event contracts comprises purchasing, selling, settling, or a combination thereof the one or more event contracts.

221. The system of any one of embodiments 207-220, wherein processing the portion of the combination selection corresponding to the fantasy entry comprises funding the fantasy entry at least partially with a payout amount corresponding to the one or more predictions.

222. The system of any one of embodiments 207-221, wherein the first computing device is operable to determine the payout amount based on a combined outcome of the one or more predictions and the fantasy entry.

223. The system of any one of embodiments 207-222, wherein the first computing device does not process event contracts.

224. The system of any one of embodiments 207-223, wherein the first computing device is for updating an account of the user with the payout amount.

225. The system of any one of embodiments 207-224, wherein the system is compliant with regulations for futures contracts in one or more jurisdictions (e.g., in a CFTC-compliant manner).

226. The system of any one of embodiments 207-225, wherein the first computing device is operable to reserve the fantasy entry before the one or more predictions are resolved.

227. The system of any one of embodiments 207-226, wherein processing the portion of the combination selection corresponding to the one or more predictions comprises entering the user into one or more event contracts and the first computing device is operable to reserve the fantasy entry before the one or more event contracts settle.

228. The system of embodiment 227, wherein entering the user into one or more event contracts comprises purchasing the one or more event contracts.

229. The system of any one of embodiments 207-228, wherein processing the portion of the combination selection corresponding to the one or more predictions causes the user to be entered into one or more event contracts and the first computing device is operable to determine the payout amount based on an outcome of the fantasy entry after the one or more event contracts are resolved.

230. The system of embodiment 229, wherein entering the user into one or more event contracts comprises purchasing the one or more event contracts.

231. The system of any one of embodiments 207-230, wherein the first computing device is operable to receive a prediction payout amount for one or more event contracts corresponding to the one or more predictions and update the account with the prediction payout amount before settling the respective fantasy entry.

232. The system of embodiment 231, wherein the prediction payout amount is received from an externally controlled second computing device.

233. The system of embodiment 232, wherein the second computing device handles processing of event contracts and the first computing device does not process event contracts.

234. The system of any one of embodiments 207-233, wherein processing the portion of the combination selection corresponding to the one or more predictions causes the user to be entered into one or more event contracts and the first computing device is operable to grade and/or settle the fantasy entry after receiving a prediction payout amount for the one or more event contracts.

235. The system of any one of embodiments 207-234, wherein processing the portion of the combination selection corresponding to the one or more predictions causes the user to be entered into one or more event contracts and the first computing device is operable to receive a prediction payout amount for the one or more event contracts and automatically subsequently determine a fantasy entry payout amount for the fantasy entry based on an outcome of the fantasy entry.

236. The system of any one of embodiments 207-235, wherein the first computing device is operable to receive a prediction payout amount corresponding to the one or more predictions from an externally controlled second computing device and subsequently determine a fantasy entry payout amount for the fantasy entry based on an outcome of the fantasy entry and the prediction payout amount.

In this application, unless otherwise clear from context or otherwise explicitly stated, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; (iv) the terms "about" and "approximately" may be understood to permit standard variation as would be understood by those of ordinary skill in the relevant art; and (v) where ranges are provided, endpoints are included. It is contemplated that systems, devices, methods, and processes of the disclosure encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems according to certain embodiments of the present disclosure that consist essentially of, or consist of, the recited components, and that there are processes and methods according to certain embodiments of the present disclosure that consist essentially of, or consist of, the recited processing steps.

It should be understood that the order of steps or order for performing certain action is immaterial so long as operability is not lost. Moreover, two or more steps or actions may be conducted in parallel (e.g., simultaneously).

Headers have been provided for the convenience of the reader and are not intended to be limiting with respect to the claimed subject matter.

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. The disclosure has been described in detail with particular reference to certain embodiments thereof, but it will be understood that variations and modifications can be effected within the spirit and scope of the claimed invention.

What is claimed is:

1. A system comprising:

a user computing device for providing combination selections of a user made by the user via a graphical user interface, each of the combination selections corresponding to one or more predictions and a fantasy entry; and a first computing device for receiving the combination selections from the user computing device and, for each of the combination selections, processing the combination selection to determine a payout amount for the user and updating an account of the user by the payout amount, wherein processing the combination selection comprises separately processing (i) a portion of the combination selection corresponding to the one or more predictions by communicating with an externally controlled second computing device of a designated contract market (DCM) such that the user is entered into one or more event contracts corresponding to the one or more predictions via the second computing device and (ii) a portion of the combination selection corresponding to the fantasy entry, wherein processing the portion of the combination selection corresponding to the fantasy entry comprises reserving the fantasy entry before the one or more event contracts settle, wherein the payout amount is determined based on an outcome of the one or more event contracts and the fantasy entry, and wherein the account, updated by the payout amount, is viewable by the user via the graphical user interface.

2. The system of claim 1, wherein processing the combination selections comprises, for each of the combination selections:

determining a prediction payout amount corresponding to the one or more predictions and updating the account of the user with the prediction payout amount; and subsequently, determining a fantasy entry payout amount corresponding to the fantasy entry and updating the account of the user with the fantasy entry payout amount.

3. The system of claim 2, wherein the fantasy entry payout amount is based on the prediction payout amount.

4. The system of claim 1, wherein the one or more event contracts are entered into in a CFTC-compliant manner.

5. The system of claim 1, wherein the one or more event contracts are processed by the DCM.

6. The system of claim 1, wherein processing the portion of the combination selection corresponding to the one or more predictions comprises purchasing, selling, settling, or a combination thereof the one or more event contracts.

7. The system of claim 1, wherein processing the portion of the combination selection corresponding to the fantasy entry comprises funding the fantasy entry at least partially with a payout amount corresponding to the one or more predictions.

8. The system of claim 1, wherein the system is compliant with CFTC regulations for futures contracts.

9. The system of claim 1, wherein the first computing device is operable to reserve the fantasy entry before the one or more predictions are resolved.

10. The system of claim 1, wherein the first computing device is operable to determine the payout amount based on an outcome of the fantasy entry after the one or more event contracts are resolved.

11. The system of claim 1, wherein the first computing device is operable to receive a prediction payout amount for the one or more event contracts corresponding to the one or more predictions and update the account with the prediction payout amount before settling the respective fantasy entry.

12. The system of claim 11, wherein the prediction payout amount is received from the externally controlled second computing device.

13. The system of claim 1, wherein the first computing device is operable to grade and/or settle the fantasy entry after receiving a prediction payout amount for the one or more event contracts.

14. The system of claim 1, wherein the first computing device is operable to receive a prediction payout amount for the one or more event contracts and automatically subsequently determine a fantasy entry payout amount for the fantasy entry based on an outcome of the fantasy entry.

15. The system of claim 1, wherein the first computing device is operable to receive a prediction payout amount corresponding to the one or more predictions from the externally controlled second computing device and subsequently determine a fantasy entry payout amount for the fantasy entry based on the outcome of the fantasy entry and the prediction payout amount.

*    *    *    *    *